US008751283B2

(12) United States Patent
Bobak et al.

(10) Patent No.: US 8,751,283 B2
(45) Date of Patent: *Jun. 10, 2014

(54) DEFINING AND USING TEMPLATES IN CONFIGURING INFORMATION TECHNOLOGY ENVIRONMENTS

(75) Inventors: Mythili K. Bobak, Lagrangeville, NY (US); Tim A. McConnell, Lexington, KY (US); Michael D. Swanson, Springfield, OR (US); Brian O. Wood, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 939 days.

This patent is subject to a terminal disclaimer.

(21) Appl. No.: 11/965,845

(22) Filed: Dec. 28, 2007

(65) Prior Publication Data
US 2009/0171705 A1 Jul. 2, 2009

(51) Int. Cl.
*G06Q 10/00* (2012.01)
*G06F 9/44* (2006.01)
*G06Q 10/06* (2012.01)
*G06Q 10/10* (2012.01)
*H04L 12/24* (2006.01)

(52) U.S. Cl.
CPC ...... *G06Q 10/0633* (2013.01); *G06Q 10/06316* (2013.01); *G06Q 10/067* (2013.01); *G06Q 10/103* (2013.01); *G06F 8/10* (2013.01); *H04L 41/0843* (2013.01); *H04L 41/0879* (2013.01)
USPC ......... 705/7.27; 705/7.26; 705/348; 705/301; 717/104; 717/105

(58) Field of Classification Search
CPC .................... G06Q 10/0633; G06Q 10/06316; G06Q 10/067; G06Q 10/103; G06F 8/10; H04L 41/0843; H04L 41/0846; H04L 41/084; H04L 41/0879
USPC ......... 705/7.27, 7.26, 348, 301; 717/104, 105
See application file for complete search history.

(56) References Cited

U.S. PATENT DOCUMENTS

| 4,979,105 | A | 12/1990 | Daly et al. |
| 5,023,873 | A | 6/1991 | Stevenson et al. ............. 371/8.2 |
| 5,386,561 | A | 1/1995 | Huynh et al. |

(Continued)

FOREIGN PATENT DOCUMENTS

WO WO 99/10814 3/1999 ............. G06F 13/00

OTHER PUBLICATIONS

Liu et al., "Modeling Business Contexture and Behavior Using Business Artifacts", Jun. 2007, CAiSE, LNCS 4495, pp. 324-339.*

(Continued)

*Primary Examiner* — Justin M Pats
*Assistant Examiner* — Ivan R Goldberg
(74) *Attorney, Agent, or Firm* — Dennis Jung, Esq.; Blanche E. Schiller, Esq.; Heslin Rothenberg Farley & Mesiti P.C.

(57) ABSTRACT

Templates are provided and used in an Information Technology (IT) environment. A template represents a pattern of resources and resource relationships of the IT environment. Templates are applied to automatically generate recommendations of programmatic representations of artifacts of the IT environment. The artifacts include Recovery Segments, Redundancy Groups, Business Resilience Manager deployment configurations and/or resource pairing represented by relationship data stores, as examples.

20 Claims, 36 Drawing Sheets

(56) References Cited

U.S. PATENT DOCUMENTS

| | | |
|---|---|---|
| 5,452,452 A | 9/1995 | Gaetner et al. |
| 5,481,694 A | 1/1996 | Chao et al. .................. 395/439 |
| 5,530,802 A | 6/1996 | Fuchs et al. |
| 5,537,542 A | 7/1996 | Eilert et al. |
| 5,604,863 A | 2/1997 | Allen et al. |
| 5,631,831 A | 5/1997 | Bird et al. |
| 5,652,908 A | 7/1997 | Douglas et al. |
| 5,734,837 A * | 3/1998 | Flores et al. .................... 705/7 |
| 5,790,780 A | 8/1998 | Brichta et al. |
| 5,797,005 A | 8/1998 | Bahls et al. |
| 5,797,129 A | 8/1998 | Rohan |
| 5,826,080 A | 10/1998 | Dworzecki |
| 5,887,168 A | 3/1999 | Bahls et al. |
| 6,012,044 A | 1/2000 | Maggioncalda et al. |
| 6,012,152 A | 1/2000 | Douik et al. |
| 6,041,306 A * | 3/2000 | Du et al. ...................... 705/8 |
| 6,125,442 A | 9/2000 | Maves et al. |
| 6,336,138 B1 * | 1/2002 | Caswell et al. ............. 709/223 |
| 6,385,613 B1 | 5/2002 | Grewell et al. .................. 707/8 |
| 6,393,386 B1 | 5/2002 | Zager et al. |
| 6,393,485 B1 | 5/2002 | Chao et al. .................. 709/231 |
| 6,408,277 B1 | 6/2002 | Nelken |
| 6,449,688 B1 | 9/2002 | Peters et al. ................. 711/112 |
| 6,480,944 B2 | 11/2002 | Bradshaw et al. |
| 6,625,751 B1 | 9/2003 | Starovic et al. |
| 6,732,118 B2 | 5/2004 | Hermann et al. |
| 6,785,768 B2 | 8/2004 | Peters et al. ................. 711/112 |
| 6,862,696 B1 | 3/2005 | Voas et al. |
| 6,874,010 B1 | 3/2005 | Sargent |
| 6,934,247 B2 | 8/2005 | Bhattal et al. ................ 370/216 |
| 6,954,786 B1 | 10/2005 | Vered et al. |
| 6,983,321 B2 | 1/2006 | Trinon et al. |
| 6,983,362 B1 | 1/2006 | Kidder et al. |
| 7,032,186 B1 * | 4/2006 | Gasser et al. ................. 715/853 |
| 7,039,827 B2 | 5/2006 | Meyer et al. |
| 7,047,337 B2 | 5/2006 | Armstrong et al. |
| 7,058,947 B1 | 6/2006 | Raja et al. |
| 7,111,297 B1 | 9/2006 | Sankaranarayan et al. |
| 7,197,749 B2 | 3/2007 | Thornton et al. |
| 7,243,267 B2 | 7/2007 | Klemm et al. |
| 7,281,018 B1 * | 10/2007 | Begun et al. ...................... 1/1 |
| 7,313,573 B2 | 12/2007 | Leung et al. |
| 7,325,161 B1 | 1/2008 | Rakic et al. |
| 7,395,537 B1 | 7/2008 | Brown et al. |
| 7,409,356 B1 * | 8/2008 | Geddes et al. ................ 705/7.25 |
| 7,437,611 B2 | 10/2008 | Agarwal et al. |
| 7,463,648 B1 | 12/2008 | Eppstein et al. |
| 7,490,265 B2 * | 2/2009 | Baskey et al. .................... 714/15 |
| 7,499,954 B2 | 3/2009 | Cherkauer et al. |
| 7,509,529 B2 | 3/2009 | Colucci et al. |
| 7,523,359 B2 | 4/2009 | Richards et al. |
| 7,529,981 B2 | 5/2009 | Childress et al. |
| 7,536,585 B1 | 5/2009 | Keeton et al. |
| 7,568,019 B1 | 7/2009 | Bhargava et al. |
| 7,587,483 B1 | 9/2009 | Florissi et al. |
| 7,610,512 B2 | 10/2009 | Gerber |
| 7,620,953 B1 | 11/2009 | Tene et al. |
| 7,627,728 B1 | 12/2009 | Roeck et al. |
| 7,650,341 B1 | 1/2010 | Oratovsky et al. |
| 7,661,033 B2 | 2/2010 | Challener et al. |
| 7,707,173 B2 | 4/2010 | Nanavati et al. |
| 7,707,451 B2 | 4/2010 | Buskens et al. |
| 7,730,363 B2 | 6/2010 | Takezawa et al. |
| 7,743,001 B1 | 6/2010 | Vermeulen et al. |
| 7,747,730 B1 | 6/2010 | Harlow |
| 7,752,310 B2 | 7/2010 | Kageyama |
| 7,774,457 B1 | 8/2010 | Talwar et al. |
| 7,774,458 B2 | 8/2010 | Trinon et al. |
| 7,818,421 B2 | 10/2010 | Machida |
| 7,865,582 B2 | 1/2011 | Santos et al. |
| 7,917,814 B2 | 3/2011 | Hu et al. |
| 7,933,872 B2 | 4/2011 | Kulkarni et al. |
| 7,934,119 B2 | 4/2011 | Takamoto et al. |
| 7,937,706 B2 | 5/2011 | Casotto |
| 7,958,393 B2 | 6/2011 | Bobak et al. |
| 7,962,590 B1 | 6/2011 | Or et al. |
| 8,051,106 B2 | 11/2011 | Bird |
| 8,065,554 B2 | 11/2011 | Herscovitz et al. |
| 8,086,758 B1 | 12/2011 | Allan et al. |
| 8,260,893 B1 | 9/2012 | Bandhole et al. |
| 2001/0056398 A1 | 12/2001 | Scheirer |
| 2001/0056554 A1 | 12/2001 | Chrabaszcz |
| 2002/0022952 A1 | 2/2002 | Zager et al. |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078130 A1 | 6/2002 | Thornton et al. |
| 2002/0078381 A1 | 6/2002 | Farley et al. |
| 2002/0091991 A1 | 7/2002 | Castro |
| 2002/0194045 A1 | 12/2002 | Shay et al. |
| 2002/0198727 A1 | 12/2002 | Ann et al. |
| 2003/0051186 A1 | 3/2003 | Boudnik et al. |
| 2003/0056013 A1 | 3/2003 | Laschkewitsch et al. |
| 2003/0078823 A1 | 4/2003 | Yoshioka et al. |
| 2003/0084100 A1 | 5/2003 | Gahan et al. |
| 2003/0093672 A1 * | 5/2003 | Cichowlas .................... 713/168 |
| 2003/0135384 A1 | 7/2003 | Nguyen |
| 2003/0135609 A1 | 7/2003 | Carlson et al. |
| 2003/0139956 A1 | 7/2003 | Guenther et al. |
| 2003/0200482 A1 | 10/2003 | Sullivan |
| 2003/0212580 A1 | 11/2003 | Shen |
| 2003/0212685 A1 | 11/2003 | Rakotoarivelo et al. |
| 2003/0236677 A1 | 12/2003 | Casati et al. |
| 2004/0034553 A1 | 2/2004 | Cole et al. |
| 2004/0054690 A1 * | 3/2004 | Hillerbrand et al. ........ 707/104.1 |
| 2004/0078373 A1 * | 4/2004 | Ghoneimy et al. ............. 707/10 |
| 2004/0111702 A1 * | 6/2004 | Chan ............................ 717/113 |
| 2004/0119752 A1 | 6/2004 | Beringer et al. |
| 2004/0143470 A1 | 7/2004 | Myrick et al. |
| 2004/0158777 A1 | 8/2004 | Bae et al. |
| 2004/0162741 A1 * | 8/2004 | Flaxer et al. ...................... 705/7 |
| 2004/0181476 A1 | 9/2004 | Smith et al. |
| 2004/0186905 A1 | 9/2004 | Young et al. |
| 2004/0193476 A1 | 9/2004 | Aerdts |
| 2004/0199768 A1 | 10/2004 | Nail |
| 2004/0210452 A1 | 10/2004 | Aboujaoude et al. |
| 2004/0243699 A1 * | 12/2004 | Koclanes et al. ............. 709/224 |
| 2005/0015641 A1 | 1/2005 | Alur et al. |
| 2005/0027835 A1 * | 2/2005 | Raikar et al. .................. 709/222 |
| 2005/0033600 A1 * | 2/2005 | Geddes et al. .................... 705/1 |
| 2005/0043977 A1 | 2/2005 | Ahern et al. |
| 2005/0049906 A1 | 3/2005 | Leymann et al. |
| 2005/0060662 A1 | 3/2005 | Soares et al. |
| 2005/0071470 A1 | 3/2005 | O'Brien et al. |
| 2005/0086091 A1 | 4/2005 | Trumbly et al. |
| 2005/0091351 A1 | 4/2005 | Badovinatz et al. |
| 2005/0096949 A1 | 5/2005 | Aiber et al. |
| 2005/0119905 A1 | 6/2005 | Wong et al. |
| 2005/0125768 A1 | 6/2005 | Wong et al. |
| 2005/0172306 A1 | 8/2005 | Agarwal et al. |
| 2005/0177406 A1 | 8/2005 | Facciorusso et al. |
| 2005/0198244 A1 * | 9/2005 | Eilam et al. .................. 709/223 |
| 2005/0228707 A1 | 10/2005 | Hendrickson |
| 2005/0228852 A1 | 10/2005 | Santos et al. |
| 2005/0235248 A1 * | 10/2005 | Victoria et al. ............... 717/102 |
| 2005/0262242 A1 | 11/2005 | Byers et al. |
| 2006/0004265 A1 | 1/2006 | Pulkkinen et al. |
| 2006/0010234 A1 | 1/2006 | Reedy et al. |
| 2006/0020866 A1 | 1/2006 | Lo et al. |
| 2006/0037022 A1 | 2/2006 | Byrd et al. |
| 2006/0041505 A1 | 2/2006 | Enyart |
| 2006/0064335 A1 * | 3/2006 | Goldszmidt et al. ............. 705/7 |
| 2006/0074731 A1 * | 4/2006 | Green et al. ...................... 705/8 |
| 2006/0074736 A1 * | 4/2006 | Shukla et al. ..................... 705/8 |
| 2006/0074993 A1 | 4/2006 | Pulamarasetti et al. |
| 2006/0106626 A1 * | 5/2006 | Jeng et al. ........................ 705/1 |
| 2006/0111921 A1 | 5/2006 | Chang et al. |
| 2006/0112383 A1 * | 5/2006 | Chang et al. .................. 717/168 |
| 2006/0117221 A1 | 6/2006 | Fisher et al. |
| 2006/0123022 A1 | 6/2006 | Bird |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1 | 7/2006 | Trinon et al. |

(56) References Cited

U.S. PATENT DOCUMENTS

| | | | |
|---|---|---|---|
| 2006/0179136 A1 | 8/2006 | Loboz et al. | |
| 2006/0190368 A1 | 8/2006 | Kesterman | |
| 2006/0190583 A1 | 8/2006 | Whalen | |
| 2006/0190775 A1 | 8/2006 | Aggarwal et al. | |
| 2006/0218558 A1 | 9/2006 | Torii et al. | |
| 2006/0224702 A1 | 10/2006 | Schmidt et al. | |
| 2006/0236061 A1 | 10/2006 | Koclanes | |
| 2006/0245354 A1* | 11/2006 | Gao et al. | 370/230 |
| 2006/0245369 A1 | 11/2006 | Schimmelpfeng et al. | |
| 2006/0248546 A1 | 11/2006 | Andreev et al. | |
| 2006/0259526 A1 | 11/2006 | Booz et al. | |
| 2006/0287875 A1 | 12/2006 | Reddy et al. | |
| 2006/0293942 A1 | 12/2006 | Chaddha et al. | |
| 2007/0011331 A1 | 1/2007 | Morimotto et al. | |
| 2007/0027734 A1 | 2/2007 | Hughes | |
| 2007/0038490 A1 | 2/2007 | Joodi | |
| 2007/0038492 A1 | 2/2007 | Ryan et al. | |
| 2007/0061385 A1 | 3/2007 | Clark et al. | |
| 2007/0067296 A1 | 3/2007 | Malloy et al. | |
| 2007/0079097 A1 | 4/2007 | Karnowski et al. | |
| 2007/0100712 A1 | 5/2007 | Kilpatrick et al. | |
| 2007/0112847 A1 | 5/2007 | Dublish et al. | |
| 2007/0143166 A1* | 6/2007 | Leymann et al. | 705/8 |
| 2007/0150571 A1 | 6/2007 | Haga et al. | |
| 2007/0165525 A1 | 7/2007 | Kageyama | |
| 2007/0179826 A1* | 8/2007 | Cutlip et al. | 705/7 |
| 2007/0198678 A1 | 8/2007 | Dieberger et al. | |
| 2007/0198789 A1 | 8/2007 | Clark et al. | |
| 2007/0234408 A1 | 10/2007 | Burch et al. | |
| 2007/0266029 A1* | 11/2007 | Baskey et al. | 707/10 |
| 2007/0271219 A1 | 11/2007 | Agarwal et al. | |
| 2007/0276885 A1 | 11/2007 | Valiyaparambil et al. | |
| 2007/0286219 A1 | 12/2007 | Knop et al. | |
| 2007/0294406 A1 | 12/2007 | Suer et al. | |
| 2007/0300204 A1 | 12/2007 | Andreev et al. | |
| 2008/0005739 A1 | 1/2008 | Sadiq et al. | |
| 2008/0016335 A1 | 1/2008 | Takahashi et al. | |
| 2008/0052719 A1 | 2/2008 | Briscoe et al. | |
| 2008/0063423 A1 | 3/2008 | Matoba | |
| 2008/0140495 A1 | 6/2008 | Bhamidipaty et al. | |
| 2008/0147452 A1 | 6/2008 | Renz et al. | |
| 2008/0215909 A1 | 9/2008 | Bretschneider et al. | |
| 2008/0294777 A1* | 11/2008 | Karve et al. | 709/226 |
| 2008/0295100 A1 | 11/2008 | Ainsworth | |
| 2008/0317217 A1 | 12/2008 | Bernardini et al. | |
| 2009/0037363 A1 | 2/2009 | Kozlov et al. | |
| 2009/0077210 A1 | 3/2009 | Musman et al. | |
| 2009/0113383 A1* | 4/2009 | Delima et al. | 717/105 |
| 2009/0125751 A1 | 5/2009 | Dawson et al. | |
| 2009/0150456 A1 | 6/2009 | Balasubramanian et al. | |
| 2009/0150887 A1 | 6/2009 | Sanghvi et al. | |
| 2009/0171703 A1 | 7/2009 | Bobak et al. | |
| 2009/0171704 A1 | 7/2009 | Bobak et al. | |
| 2009/0171706 A1 | 7/2009 | Bobak et al. | |
| 2009/0171707 A1 | 7/2009 | Bobak et al. | |
| 2009/0171708 A1 | 7/2009 | Bobak et al. | |
| 2009/0171730 A1 | 7/2009 | Bobak et al. | |
| 2009/0171731 A1 | 7/2009 | Bobak et al. | |
| 2009/0171732 A1 | 7/2009 | Bobak et al. | |
| 2009/0171733 A1 | 7/2009 | Bobak et al. | |
| 2009/0172149 A1 | 7/2009 | Bobak et al. | |
| 2009/0172460 A1 | 7/2009 | Bobak et al. | |
| 2009/0172461 A1 | 7/2009 | Bobak et al. | |
| 2009/0172470 A1 | 7/2009 | Bobak et al. | |
| 2009/0172668 A1 | 7/2009 | Bobak et al. | |
| 2009/0172669 A1 | 7/2009 | Bobak et al. | |
| 2009/0172670 A1 | 7/2009 | Bobak et al. | |
| 2009/0172671 A1 | 7/2009 | Bobak et al. | |
| 2009/0172674 A1 | 7/2009 | Bobak et al. | |
| 2009/0172682 A1 | 7/2009 | Bobak et al. | |
| 2009/0172687 A1 | 7/2009 | Bobak et al. | |
| 2009/0172688 A1 | 7/2009 | Bobak et al. | |
| 2009/0172689 A1 | 7/2009 | Bobak et al. | |
| 2009/0172769 A1 | 7/2009 | Bobak et al. | |
| 2009/0249337 A1 | 10/2009 | Vasilevsky et al. | |
| 2010/0280863 A1 | 11/2010 | Wilcock et al. | |
| 2011/0004564 A1 | 1/2011 | Rolia et al. | |

OTHER PUBLICATIONS

Liu, "Modeling Business Contexture and Behavior Using Business Artifacts", Liu et al., Jun. 2007, CAiSE, LNCS 4495, pp. 324-339.*
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," http://www.parasoft.com/jsp/products/home.jsp?product=BPEL.
Office Action for U.S. Appl. No. 11/966,495 dated Oct. 29, 2009.
Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
"BPEL Project", http://www.eclipse.org/bpel/.
"Factor Analysis Using SAS Proc Factor", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developers Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "Java and JMX—Building Manageable Systems," Jan. 2003; ISBN 0672324083; pp. 54-64.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.
Office Action for U.S. Appl. No. 11/965,855 dated Apr. 30, 2010.

(56) References Cited

OTHER PUBLICATIONS

Final Office Action for U.S. Appl. No. 11/966,495 dated May 14, 2010.
Final Office Action for U.S. Appl. No. 11/965,897 dated Sep. 17, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13 (in Office Action for U.S. Appl. No. 11/965,926—no further date information available.).
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Final Office Action for U.S. Appl. No. 11/965,922 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Final Office Action for U.S. Appl. No. 11/965,926 dated Jul. 19, 2011.
Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,922 dated Apr. 20, 2012.
Crawford, C. H. et al., "Toward an on Demand Service-Oriented Architecture," IBM Systems Journal, vol. 44, No. 1, 2005, pp. 81-107.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Final Office Action for U.S. Appl. No. 11/965,889 dated Jan. 11, 2013, pp. 1-15.
Final Office Action for U.S. Appl. No. 11/965,899 dated Jan. 29, 2013, pp. 1-17.
Final Office Action for U.S. Appl. No. 11/965,862 dated Apr. 4, 2013, pp. 1-19.
Office Action for U.S. Appl. No. 11/965,838 dated Apr. 30, 2013, pp. 1-30.
Office Action for U.S. Appl. No. 11/965,894 dated May 8, 2013, pp. 1-9.
Office Action for U.S. Appl. No. 12/975,520 dated Jul. 18, 2012.
Final Office Action for U.S. Appl. No. 11/965,906 dated Jul. 23, 2012.
Office Action for U.S. Appl. No. 11/965,899 dated Aug. 28, 2012.
Final Office Action for U.S. Appl. No. 11/965,922 dated Aug. 28, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.
Office Action for U.S. Appl. No. 11/965,902 dated Nov. 16, 2012.
Final Office Action for U.S. Appl. No. 11/965,838 dated Aug. 9, 2013, pp. 1-19.
Office Action for U.S. Appl. No. 11/965,926 dated Aug. 14, 2013, pp. 1-29.
Office Action for U.S. Appl. No. 11/965,922 dated Aug. 14, 2013, pp. 1-35.
Office Action for U.S. Appl. No. 11/965,899 dated Aug. 28, 2013, pp. 1-20.
Notice of Allowance for U.S. Appl. No. 11/965,917 dated Aug. 28, 2013, pp. 1-25.
Notice of Allowance for U.S. Appl. No. 11/965,862 dated Sep. 16, 2013, pp. 1-15.
Hunter, Erwin L., "Recovery from Software Faults in the EWSD Digital Switching System," IEEE International Conference on Communications, May 1994, pp. 1784-1788.
Notice of Allowance for U.S. Appl. No. 11/965,894 dated Nov. 7, 2013, pp. 1-16.
Final Office Action for U.S. Appl. No. 11/965,922 dated Dec. 27, 2013, pp. 1-65.
Charfi, Anis and Mira Mezini, "Aspect-Oriented Workflow Languages," Oct. 2006, pp. 183-200.
Charfi, Anis and Mira Mezini, "Aspect-Oriented Web Service Composition with A04BPEL," 2004 (no further date information available), pp. 168-182.
Lassen, Kristian Bisgaard and Wil M.P. van der Aalst, "WorkflowNet2BPEL4WS: A Tool for Translating Unstructured Workflow Processes to Readable BPEL," Oct. 2006, pp. 127-144.
Karastoyanova, Dimka et al., "Extending BPEL for Run Time Adaptability," Sep. 2005, pp. 15-26.
Mayer, Philip and Daniel Lubke, "Towards a BPEL Unit Testing Framework," Jul. 2006, pp. 33-42.
Notice of Allowance for U.S. Appl. No. 11/965,926 dated Dec. 31, 2013, pp. 1-28.
Notice of Allowance for U.S. Appl. No. 12/975,520 dated Jan. 17, 2014, pp. 1-19.

\* cited by examiner

| EVENT LOG | 602 | 604 | 606 |
|---|---|---|---|
| ! | MESSAGE | RESOURCE | DATE |
| ! | CONTAINMENT REGION HAS RECOVERED | CONTAINMENT1 | APR 18, 2006 10:50:52.193 |
| X | CONTAINMENT REGION CREATED FOR RESOURCE FAILURE | CONTAINMENT1 | APR 18, 2006 10:50:52.103 |
| ! | CONTAINMENT REGION HAS RECOVERED | CONTAINMENT3 | APR 18, 2006 10:50:51.982 |
| X | DETECTED DYNAMIC MEMBERSHIP CHANGE: ACTIVE POLICY REC'D | RECOVERYSEGMENT2 | APR 18, 2006 10:12:25.696 |
| X | THIS RESOURCE HAS ENTERED AN UNRECOVERABLE STATE AND REC... | RECOVERY MANAGER2 | APR 18, 2006 10:12:25.696 |
| X | THIS RESOURCE HAS ENTERED AN UNRECOVERABLE STATE AND REC... | RECOVERY MANAGER1 | APR 18, 2006 10:12:14.770 |
| X | ACTIVATION OF POLICY XYZ HAS FAILED | RECOVERY SEGMENT1 | APR 18, 2006 10:12:14.760 |
| ! | DETECTED DYNAMIC MEMBERSHIP CHANGE ACTIVE POLICY REC'D | RECOVERY SEGMENT2 | APR 18, 2006 10:10:25.696 |

? THE RESOURCE "CDRM1 RECOVERY" HAS ENTERED AN UNRECOVERABLE STATE THAT REQUIRES YOUR INPUT. DO YOU WANT TO OPEN THE RESOURCE NOW?

[YES] [NO]

RS DEFINITION TEMPLATE EXAMPLE

WEB APPLICATION SERVER RECOVERY SEGMENT DEFINITION TEMPLATE EXAMPLE

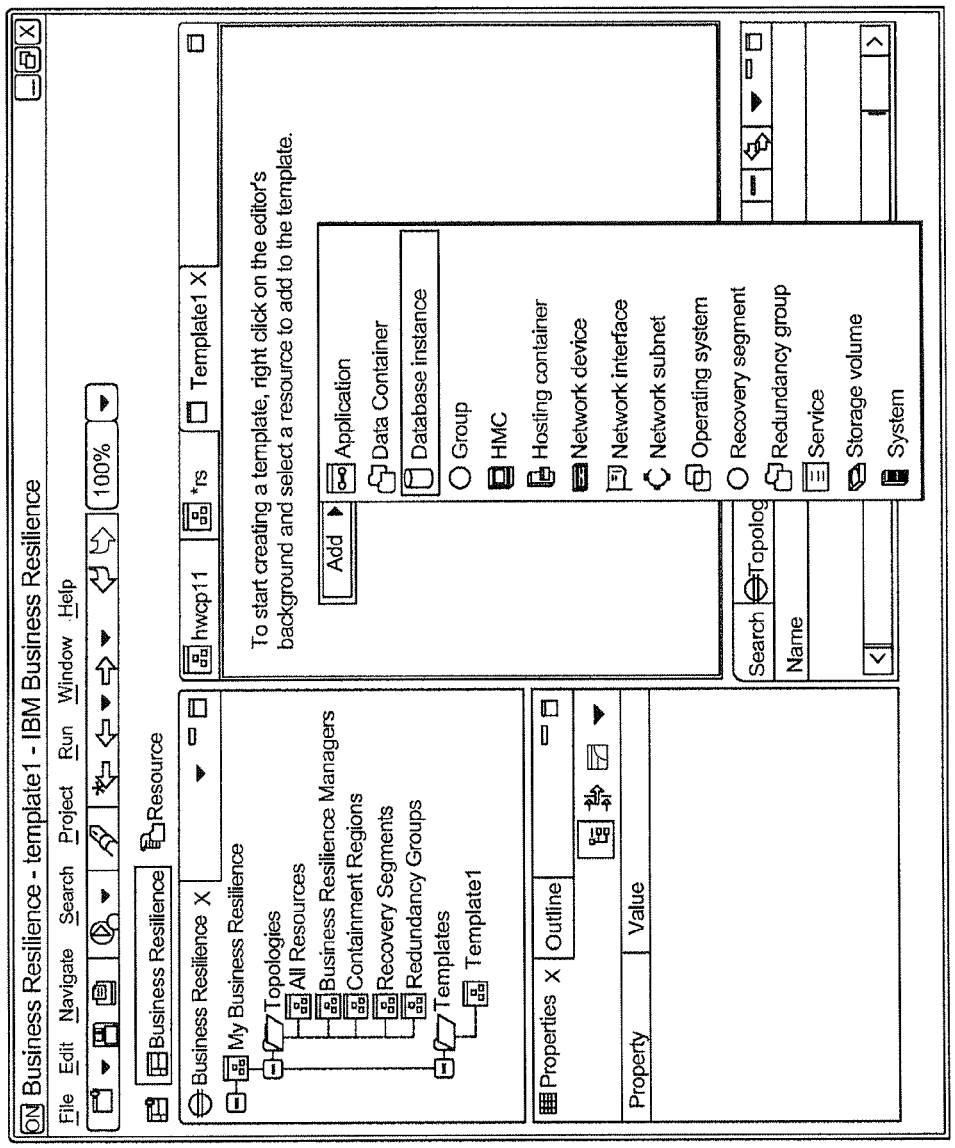
FIG. 13 DEFINE RECOVERY SEGMENT TEMPLATE EXAMPLE

RS DEFINITION TEMPLATE PATTERN MATCHING

DEFINING RS DEFINITION TEMPLATE

APPLYING RG DEFINITION TEMPLATES

RG DEFINITION TEMPLATE PATTERN MATCHING ALGORITHM

APPLYING RESOURCE PAIRING DEFINITION TEMPLATES

RESOURCE PAIRING DEFINITION TEMPLATE PATTERN MATCHING

| DEPLOYMENT_INFORMATION |
| --- |
| DEPLOY_INFO_ID : INTEGER |
| OS : VARCHAR(1024) |
| WAS : VARCHAR(1024) |
| BRAD : VARCHAR(1024) |
| SERVER : VARCHAR(1024) |
| TS_UPDATE : TIMESTAMP |

FIG. 21

APPLYING DEPLOYMENT TEMPLATES FOR RS AND BRM

DETERMINING RELEVANT DEPLOYMENT TEMPLATES FOR A SELECTED BRM

DEPLOYMENT TEMPLATES FOR RS AND BRM PATTERN MATCHING

DEFINING AND USING TEMPLATES IN CONFIGURING INFORMATION TECHNOLOGY ENVIRONMENTS

TECHNICAL FIELD

This invention relates, in general, to managing customer environments to provide support for business resiliency, and in particular, to using templates to configure resources of the environment to be managed.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability that facilitates management of an IT environment. In particular, a need exists for a capability that improves the configuration of the environment, and thus, enables efficient management of that environment. As one example, a need exists for a capability that provides automation in configuring resources of the environment.

The shortcomings of the prior art are overcome and additional advantages are provided through the provision of a computer-implemented method to facilitate configuration of an IT environment. The method includes, for instance, obtaining a template for an IT environment, the template representing a pattern of resources and resource relationships of the IT environment; and applying the template to automatically generate a recommendation of a programmatic representation of an artifact of the IT environment.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

FIG. 13 depicts one example of defining a Recovery Segment template, in accordance with an aspect of the present invention;

FIG. 21 depicts one example of a deployment information table, in accordance with an aspect of the present invention;

DETAILED DESCRIPTION OF THE INVENTION

Figure 1:
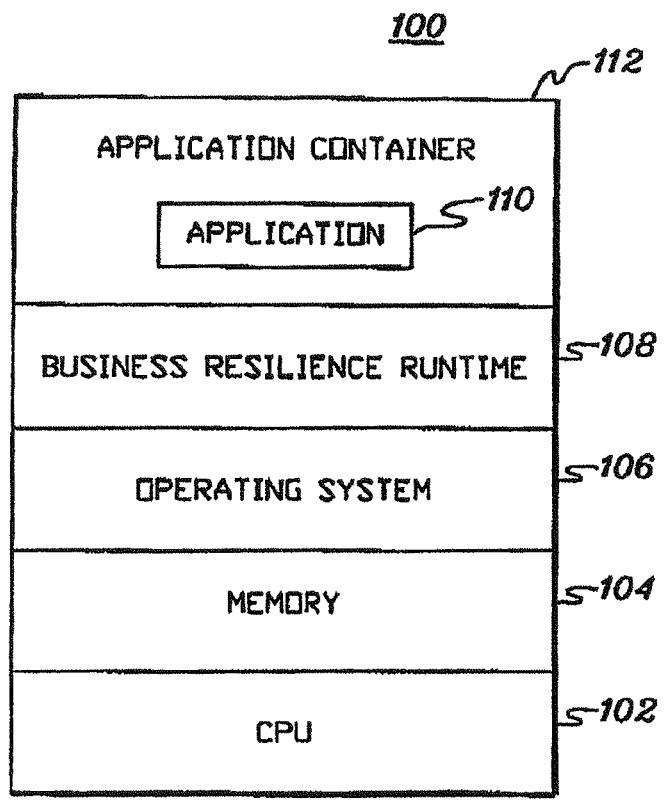
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).

2. Ability to group together mixed resource types (servers, storage, applications, subsystems, network, etc.) into logical groupings aligned with business processes requirements for availability.

3. Ability to share resources across logical groups of resources; ability to nest these logical group definitions, with specifications for goal policy accepted and implemented at each level.

4. Pre-specified recommendations for resource groupings, with customization possible, and pattern matching customer configuration with vendor or customer provided groupings/relationships—to avoid requiring customers to start from scratch for definitions.

5. Ability to group together redundant resources with functional equivalence—use during validation when customer has less redundancy than required to meet the Recovery Time Objective (RTO) goal; in recovery to select an alternate resource for one that has failed.

6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.

7. Ability to relate the redundancy capability of relevant resources to the availability status of a business application.

8. Allow customers to configure when recovery actions can be delegated to lower level resources, particularly since resource sharing is becoming more relevant in many customer environments.

9. Include customer or vendor best practices for availability as prespecified workflows, expressed in a standards based manner, that can be customized.

10. Ability to specify quantitative business goals for the recovery of logical groupings of resources, effecting both how the resources are preconfigured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.

11. Decomposition of the overall quantified RTO goal to nested logical groups; processing for shared groups having different goals.

12. Ability to configure redundancy groupings and co-location requirements with resources from other vendors, using a representation for resources (which may be, for example, standards based), with ability to clearly identify the vendor as part of the resource definition.

13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.

14. Specification of statistical thresholds for acceptability of using historical information; customer specification directly of expected operation times and directive to use customer specified values.

15. Environments are matched to IT operations and time of day, with automatic processing under a new system environment at time boundaries—no automatic internal adjustment of RTO is to be allowed, rather changed if the customer has specified that a different RTO is needed for different system environments.

16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?

What is the longest component of that recovery time?

Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?

18. Ability to incorporate operations from any vendors' resources for pre-conditioning or recovery workflows, including specification of which pre-conditioning operations have effect on recoveries, which operations have dependencies on others, either within vendor resources or across resources from multiple vendors.

19. Customer ability to modify pre-conditioning workflows, consistent with supported operations on resources.

20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.

21. Ability to divide pre-conditioning work between long running and immediate, nondisruptive short term actions.

22. Impact only the smallest set of resources required during recovery, to avoid negative residual or side effects for attempting to recover a broader set of resources than what is actually impacted by the failure.

23. Choosing recovery operations based on determination of which recovery actions address the minimal impact, to meet goal, and then prepare for subsequent escalation in event of failure of initial recovery actions.

24. Choosing a target for applications and operating systems (OS), based on customer co-location specifications, redundancy groups, and realtime system state.

25. Ability for customer to indicate specific effect that recovery of a given business process can have on another business process—to avoid situations where lower priority workloads are recovered causing disruption to higher priority workloads; handling situations where resources are shared.

26. Ability to prioritize ongoing recovery processing over configuration changes to an availability system, and over any other administration functions required for the availability system.

27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).

28. Allow for possible non-responsive resources or underlying infrastructure that does not have known maximum delays in response time in determining recovery actions, while not going beyond the allotted recovery time.

29. Allow customer to change quantified business recovery goals/targets without disruption to the existing recovery capability, with appropriate labeling of version of the policy to facilitate interaction with change management systems.

30. Allow customers to change logical groupings of resources that have assigned recovery goals, without disruption to the existing recovery capability, with changes versioned to facilitate interaction with change management systems.

31. Ability to specify customizable human tasks, with time specifications that can be incorporated into the goal achievement validation so customers can understand the full time involved for a recovery and where focusing on IT and people time is critical to reducing RTO.

32. There is a requirement/desire to implement dynamically modified redundancy groupings for those resources which are high volume—automatic inclusion based on a specified set of characteristics and a matching criteria.

33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.

Correlation and identification of dependencies between business functions and the supporting IT resources.

Impact analysis of failures affecting business functions, across resources used within the business functions, including the applications and data.

Isolation of failure scope to smallest set of resources, to ensure that any disruptive recovery actions effect only the necessary resources.

2. Rapid granular and graceful degradation of IT service.

Discontinuation of services based on business priorities.

Selection of alternate resources at various levels may include selection of hardware, application software, data, etc.

Notifications to allow applications to tailor or reduce service consumption during times of availability constraints.

3. Integration of availability management with normal business operations and other core business processes.

Policy controls for availability and planned reconfiguration, aligned with business objectives.

Encapsulation, integration of isolated point solutions into availability IT fabric, through identification of affected resources and operations initiated by the solutions, as well as business resiliency.

Goal based policy support, associated with Recovery Segments that may be overlapped or nested in scope.

Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
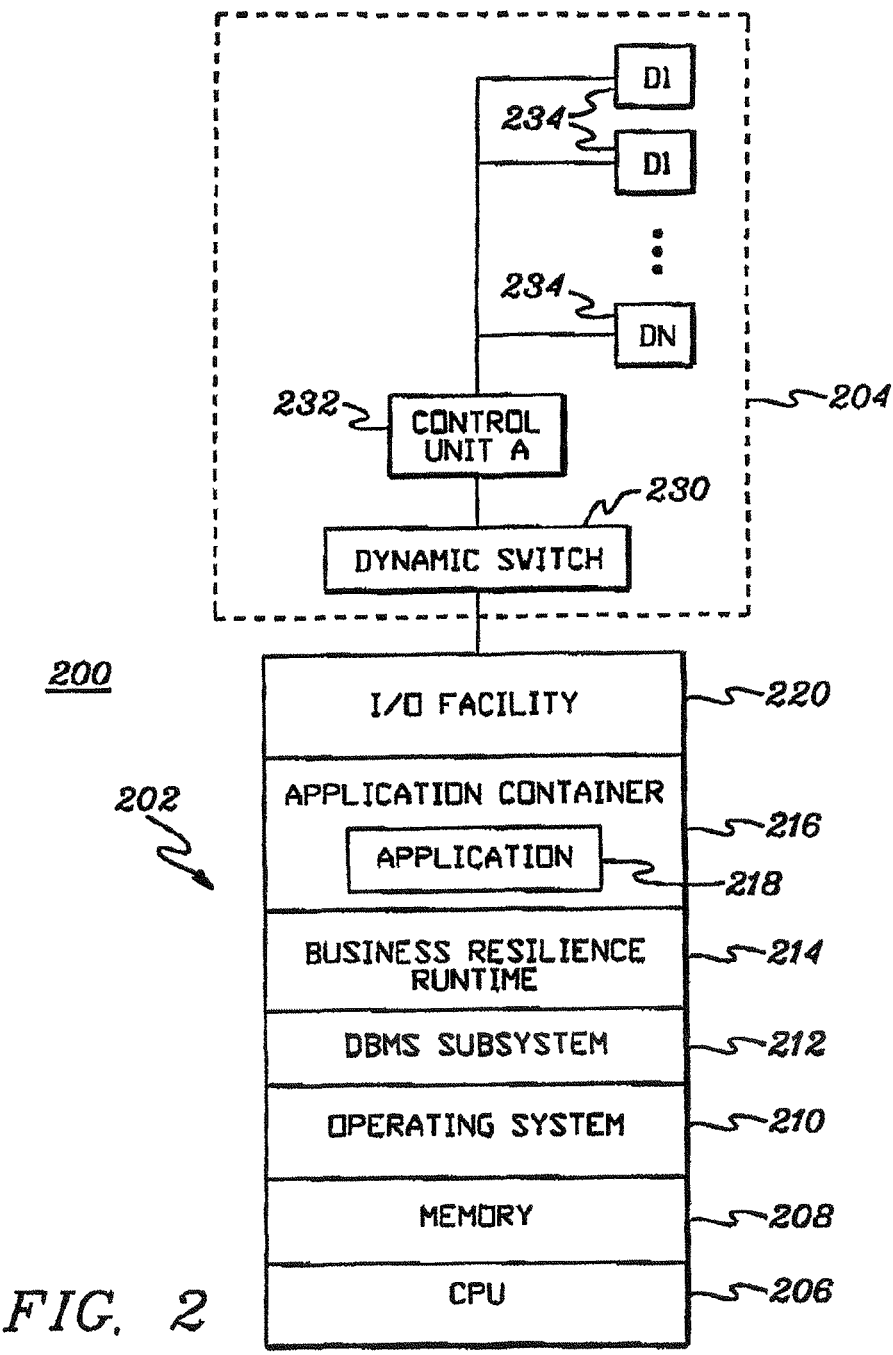
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
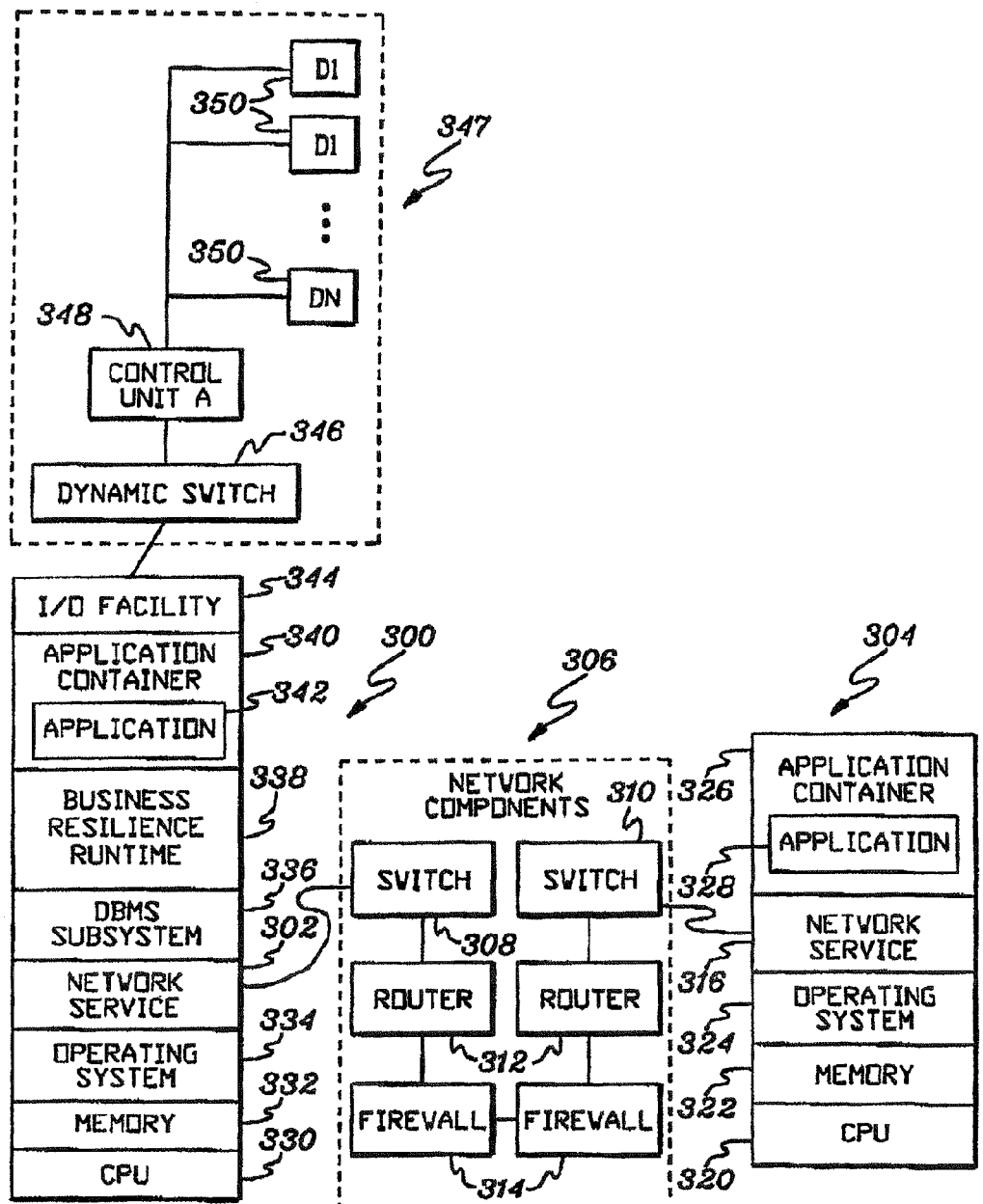
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs. As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
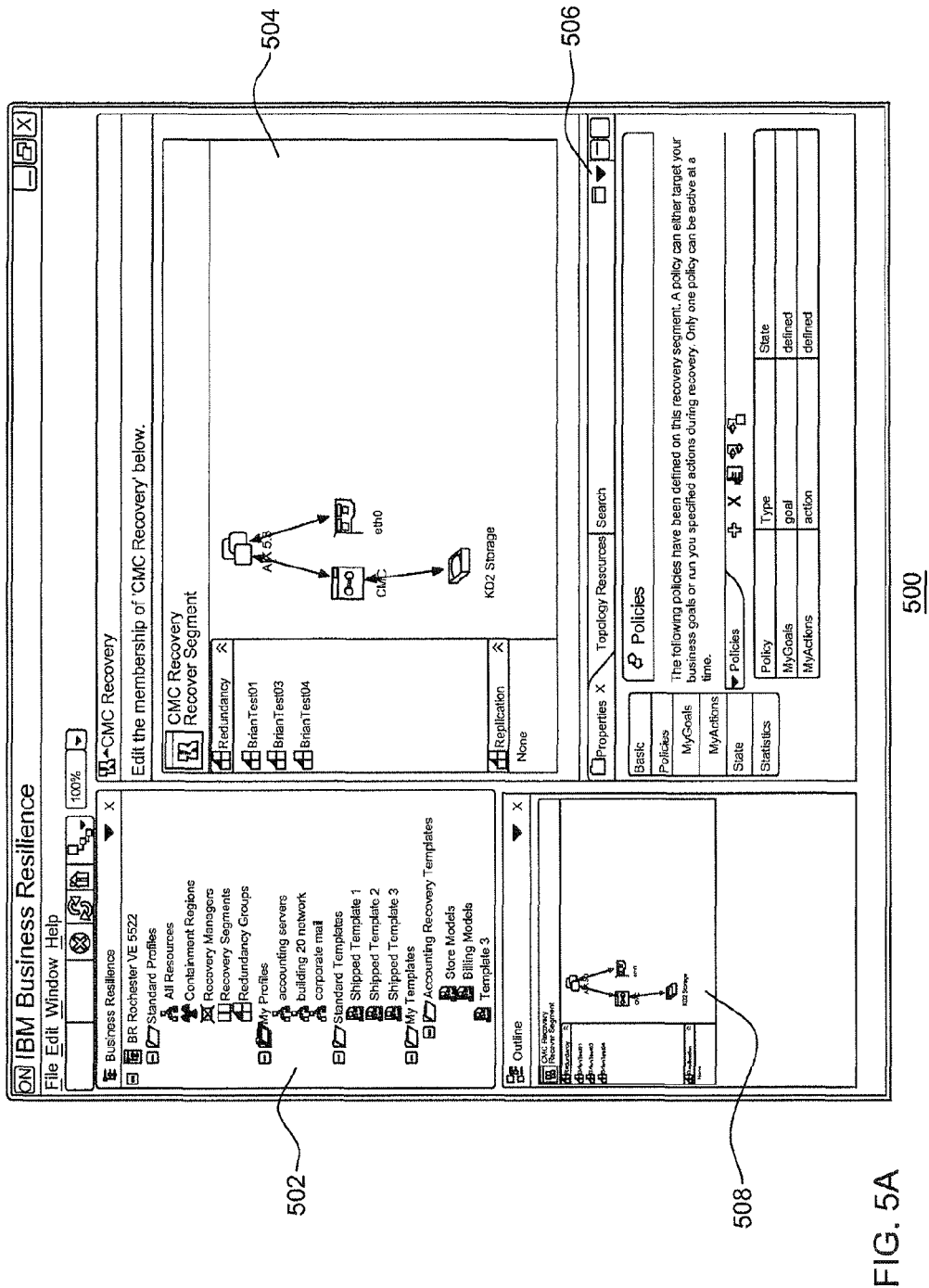
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
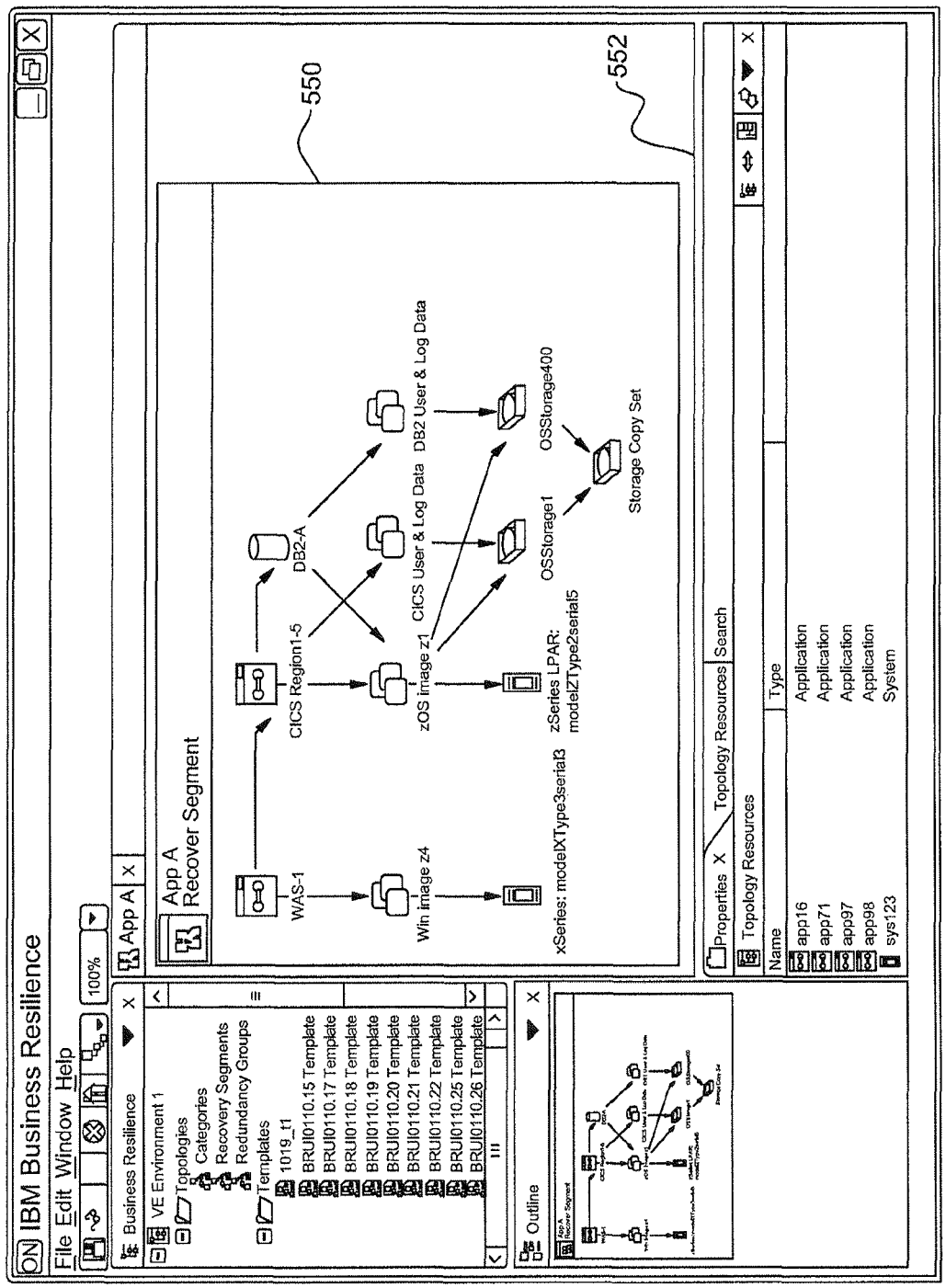
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
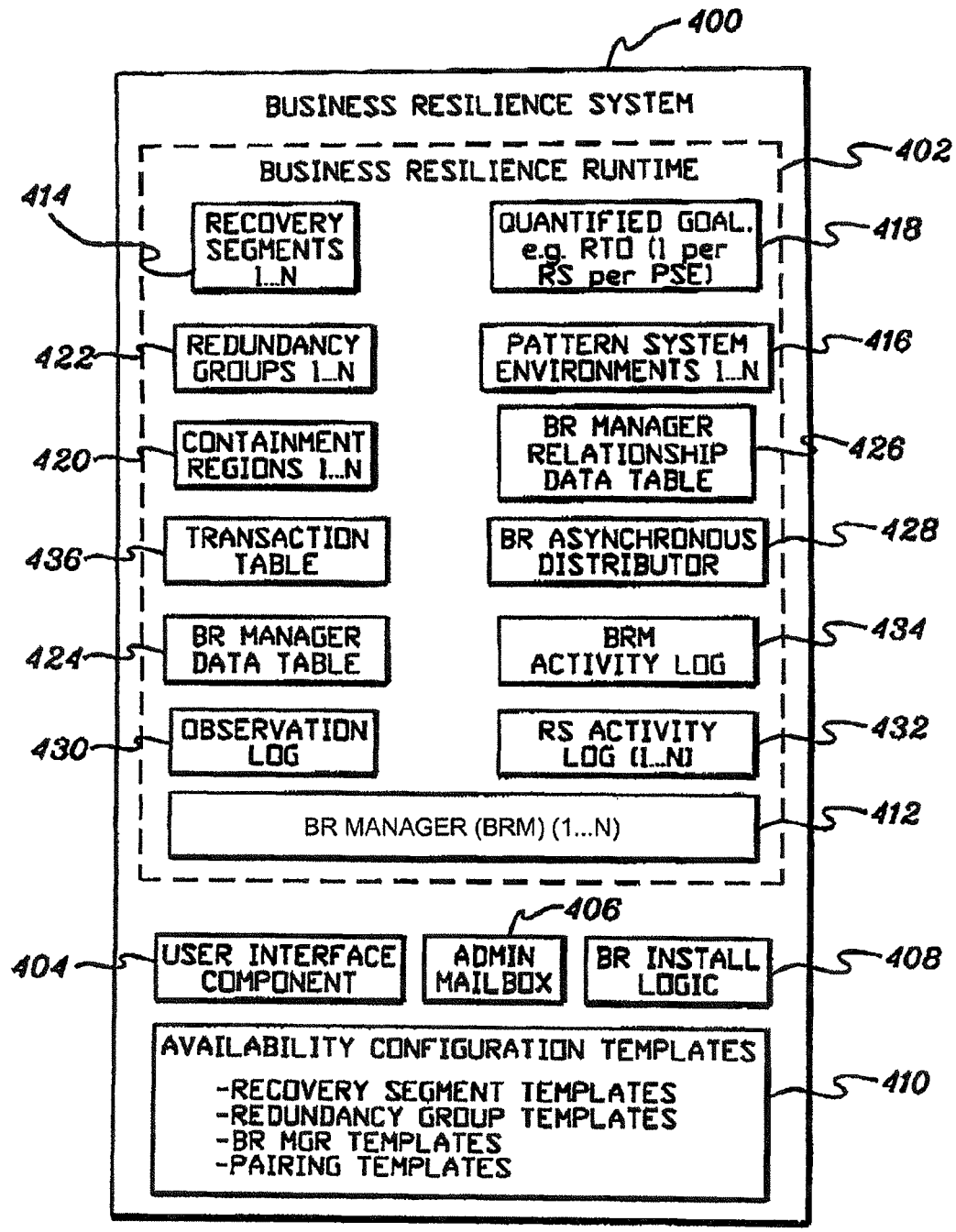
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
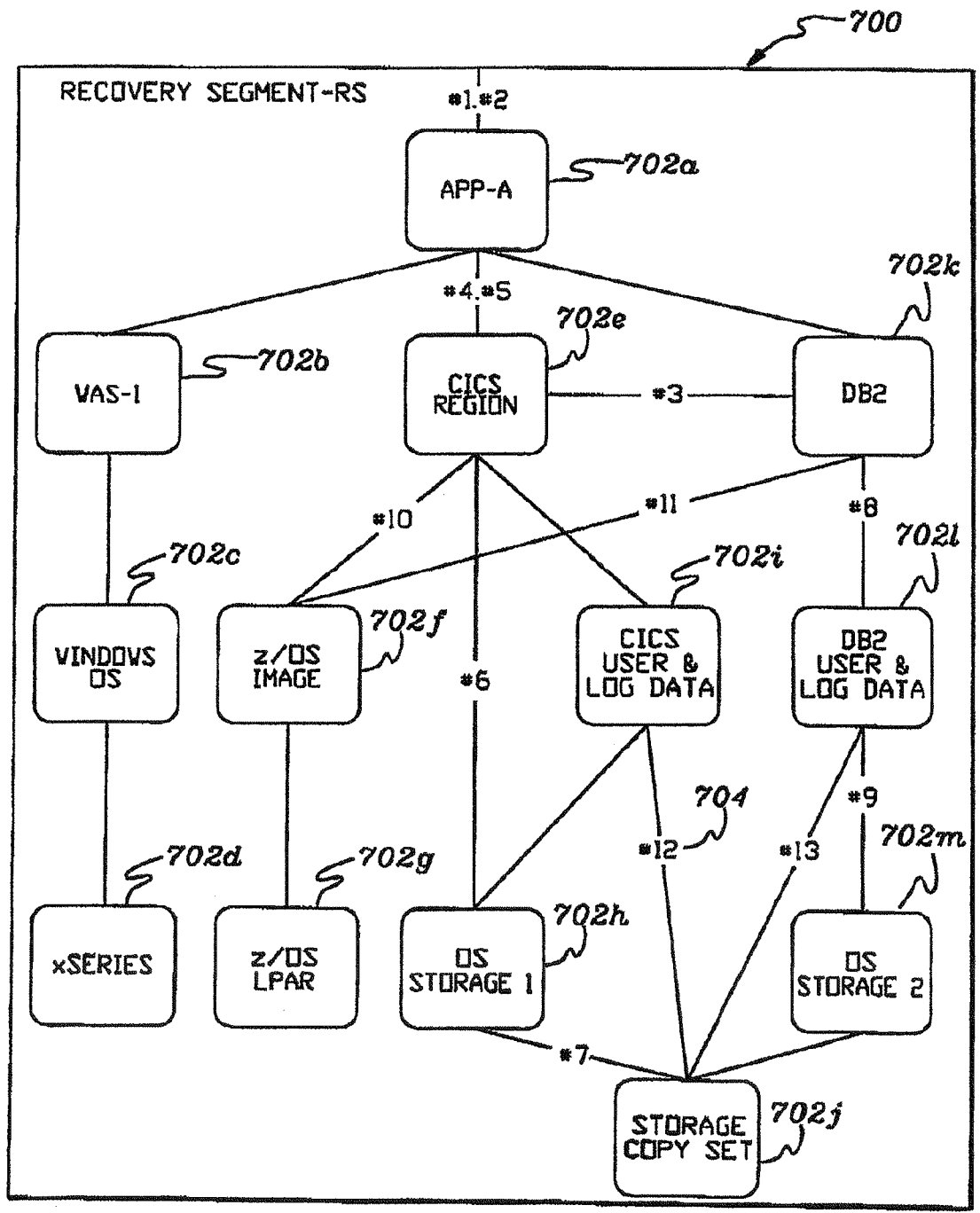
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
| --- | --- | --- | --- | --- |
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702h fails (goes Unavailable).

RS gets notified of state change event.

1st level state aggregation determines:
Storage Copy Set→Degraded
CICS User & Log Data→Degraded
DB2 User & Log Data→Degraded
DB2→Degraded
CICS→Unavailable
App-A→Unavailable
1st level state aggregation determines:
RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a prespecified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Toolingt Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo"

workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
  RS definition from representation of IT Resources;
  Goal (RTO) and action policy specification, validation and activation; and
  Tooling by Eclipse, as an example, to integrate with IT process management.
Rapid, flexible, administrative level:
Alteration of operation escalation rules;
Customization of workflows for preparatory and recovery to customer goals;
Customization of IT resource selection from RG based on quality of service (QoS);
Alteration of definition of IT resource and business application state (available, degraded, or unavailable);
Customization of aggregated state;
Modification of topology for RS and RG definition;
Selection of BR deployment configuration;
Alteration of IT resource recovery metrics;
Customization of generated Pattern System Environments; and
Specification of statistical tolerances required for system environment formation or recovery metric usage.
Extensible framework for customer and vendor resources:
IT resource definitions not specific to BR System; and
Industry standard specification of workflows, using, for instance, BPEL standards.
Adaptive to configuration changes and optimization:
IT resource lifecycle and relationships dynamically maintained;
System event infrastructure utilized for linkage of IT resource and BR management;
IT resource recovery metrics identified and collected;
IT resource recovery metrics used in forming Pattern System Environments;
Learned recovery process effectiveness applied to successive recovery events;
System provided measurement of eventing infrastructure timing;
Dynamic formation of time intervals for aggregation of related availability events to a root cause; and
Distribution of achieved recovery time over constituent resources.
Incremental adoption and coexistence with other availability offerings:
  Potential conflict of multiple managers for a resource based on IT representation;
  Workflows for recovery and preparatory reflect operations with meta data linked to existing operations;
  Advisory mode execution for preparatory and recovery workflows; and
  Incremental inclusion of resources of multiple types.
Support for resource sharing:
  Overlapping and contained RS;
  Merger of CR across RS and escalation of failure scope; and
  Preparatory and recovery workflows built to stringency requirements over multiple RS.

Extensible formalization of best practices based on industry standards:
  Templates and patterns for RS and RG definition;
  Preparatory and recovery workflows (e.g., BPEL) for customization, adoption; and
  Industry standard workflow specifications enabling integration across customer and multiple vendors.
Integration of business resilience with normal runtime operations and IT process automation:
  Option to base on IT system wide, open industry standard representation of resources;
  BR infrastructure used for localized recovery within a system, cluster and across sites; and
  Utilization of common system infrastructure for events, resource discovery, workflow processing, visualization.

Management of the IT environment is adaptively performed, as described herein and in a U.S. Patent Application "Adaptive Business Resiliency Computer System for Information Technology Environments," Ser. No. 11/966,495, Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. Patent Applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," Ser. No. 11/965,855, Bobak et al., which is hereby incorporated herein by reference in its entirety.

Definition of a RS may use a representation of resources in a topology graph as described in "Use of Graphs in Managing Computing Environments," Ser. No. 11/965,906, Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," Ser. No. 11/965,877, Bobak et al., which is hereby incorporated herein by reference in its entirety.

Specification of the availability state for individual resources, redundancy groups and Recovery Segments may be performed as described in "Use of Multi-Level State Assessment in Computer Business Environments," Ser. No. 11/965,832, Bobak et al., which is hereby incorporated herein by reference in its entirety.

Representations for the IT environment in which BR is to operate may be created from historical information captured during observation mode, as described in "Computer Pattern System Environment Supporting Business Resiliency," Ser. No. 11/965,851, Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," Ser. No. 11/965,874, Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," Ser. No. 11/966,619, Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," Ser. No. 11/965,978, Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," Ser. No. 11/965,894, Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," Ser. No. 11/965,951, Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," Ser. No. 11/965,930, Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," Ser. No. 11/965,838, Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computing Environment," Ser. No. 11/965,902, Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," Ser. No. 11/965,917, Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," Ser. No. 11/965,862, Bobak et al., which is hereby incorporated herein by reference in its entirety.

Formulation of a recovery plan is to uphold customer specification regarding the impact recovery operations can have between different business applications, as described in "Managing Execution Within a Computing Environment," Ser. No. 11/965,913, Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," Ser. No. 11/965,897, Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," Ser. No. 11/965,899, Bobak et al., which is hereby incorporated herein by reference in its entirety.

Use of provided templates representing best practices in defining the BR system, as described herein, in accordance with one or more aspects of the present invention.

Use of provided templates in formulation of workflows, as described in "Using Templates in a Computing Environment," Ser. No. 11/965,922, Bobak et al., which is hereby incorporated herein by reference in its entirety.

Making changes to the availability goals while supporting ongoing BR operation, as described in "Non-Disruptively Changing a Computing Environment," Ser. No. 11/965,926, Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," Ser. No. 11/965,889, Bobak et al., which is hereby incorporated herein by reference in its entirety.

Detecting and recovery for the BR system is performed non-disruptively, as described in "Managing Processing of a Computing Environment During Failures of the Environment," Ser. No. 11/965,872, Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
|---|---|---|
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network | Units in elapsed time |

-continued

| Resource Type | Property | Value Range |
|---|---|---|
| | connections | |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |

-continued

| Resource Type | Property | Value Range |
|---|---|---|
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |

-continued

| Resource Type | Property | Value Range |
|---|---|---|
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
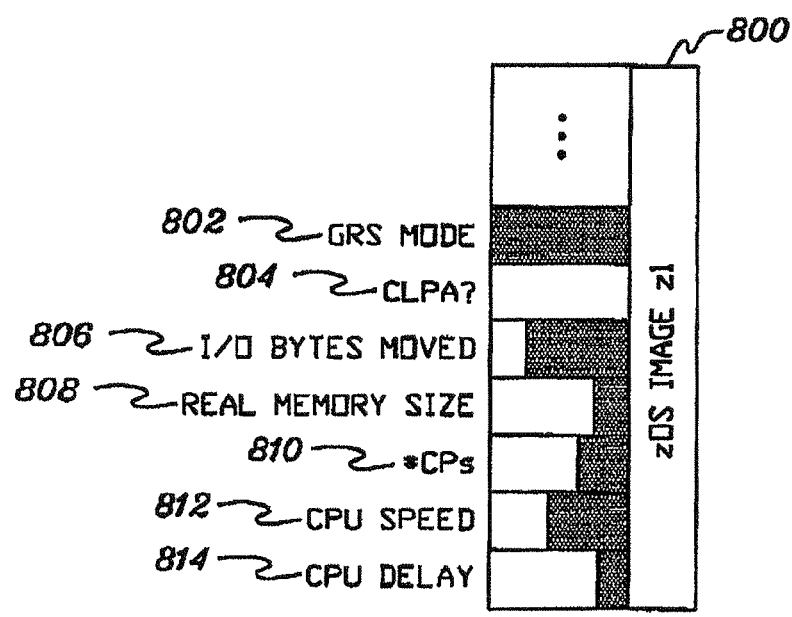
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
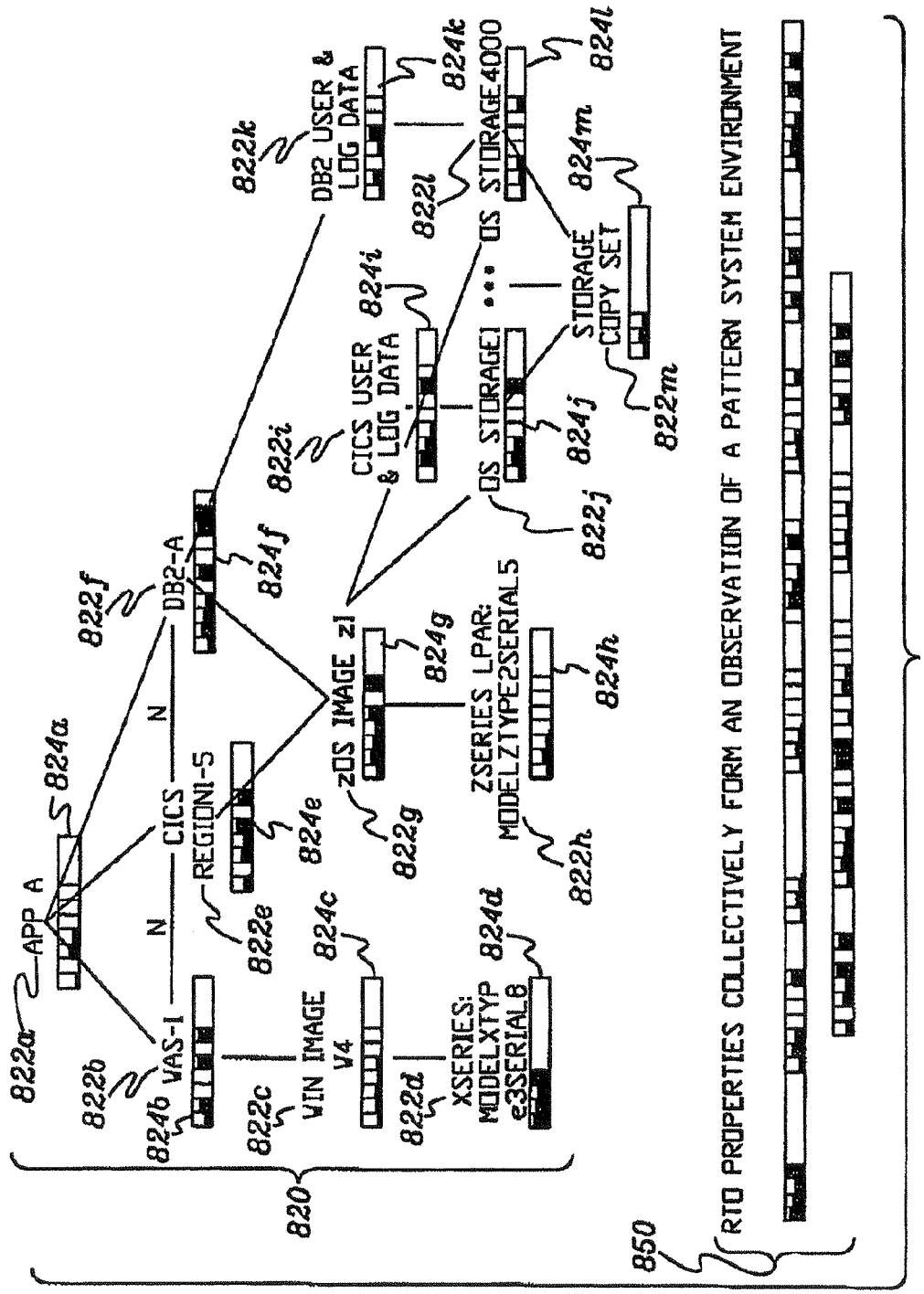
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.
Are present to understand impacts on managed resources.
No decomposed RTO is associated with an assessed resource.
They are resources on which resources managed by BR depend upon, but are not directly acted on for availability by BR.
They are resources removed (or not explicitly added) from the actively monitored set of resources by the BR admin during RS definition.
They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are

| Metric | Qualification |
| --- | --- |
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

The operational state of the resource at which the observed recovery time interval started.
The operational state of the resource at which the observed recovery time interval ended.
The operational states of the resource at which point it can unblock dependent resources (example: operational states at which a DB2 could unblock new work from CICS, at which it could allow processing of logs for transactions ongoing at time of failure . . . ).
Values of statistical thresholds to indicate sufficient observations for goal managing the resource (number of observations, max standard deviations, confidence level).

managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.
The RS subscribes to state change notifications for assessed resources (and possibly other notifiable properties).
Relationships between observed and managed resources are possible (and likely).

BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, templates are provided to customers for use in, for instance, defining, configuring and/or deploying IT resources in support of their IT environment. As an example, a template is a programmatic representation of a pattern of resources and relationships in the IT environment, and that pattern is used to, for instance, automatically group resources in a specified manner (e.g., as a RS or RG, etc.)

Configuration of IT resources for management, such as for availability management, has typically been done by manual identification of specific IT resources to be managed, manual configuration of deployment choices, and manual configuration of information about resources and relationships. The problem with this type of definition is that each specification needs to be explicitly configured, even when there are patterns for these configurations. There is a high potential for error in manual configurations for these situations, and testing costs for availability are traditionally very prohibitive.

In addition to configuration specifications, choosing operating system environments and hosting environments for deployment of runtime management components has typically been done through manual placement. The problem with this approach is the added labor cost of analyzing the characteristics of each qualifying environment compared with the characteristics of the individual product, for an appropriate deployment choice.

In accordance with an aspect of the present invention, templates are provided and used to facilitate the definition and deployment of IT management artifacts (e.g., Recovery Segments, Redundancy Groups, BRM deployment configurations, resource pairings represented by BRRD). Definition templates for defining the scope of business applications (e.g., for definition of Recovery Segments) are provided, as well as Redundancy Group Definition templates, and Resource Pairings Definition templates. Deployment templates are also provided to facilitate deployment of components of the IT management system (e.g., such as those for Recovery Segment and BR Manager) on one or more operating systems.

Via the usage of these templates, some level of advice, direction, or best practices is provided to the customer, so that components of the IT management system, such as those for Recovery Segment and BR Manager are defined, configured, and placed properly and efficiently for the environment that is to be managed for availability or other goal. For example, it is anticipated that "best practices" patterns for the placement of BRM's based on the Recovery Segments they have to manage exist, and can be used to discern and recommend the proper placement of a BRM or Recovery Segment. These patterns will also grow and evolve over time to become more sophisticated and significantly more helpful to customers and administrators during this step of IT management configuration.

The templates are programmatic expressions of patterns of IT resources and their inter-relationships. In one example, best practice templates are formed and shipped with the product, and then, at time of configuration or deployment, the IT topology is pattern-searched to detect instances of resources and relationships that match the pattern. In this manner, best practice templates and associated policies can be represented programmatically, applied consistently, and detected in a runtime environment so that recommendations for definition and deployment can be automatically generated (i.e., instead of manually). The time for configuration is reduced, and the likelihood of a consistent specification is increased, resulting in lower labor costs, greater consistency, and lower risk of errors. These templates may be also modified and tailored by the customer for their specific environment.

The templates also facilitate the consistent application of changes. For example:

A change in policy for resources associated with a RG would be consistently applied across all the RG's for that resource type.

A change in BR Manager or RS placement would be consistently applied across the environment.

A change to a pairing would be consistently reflected.

Described in further detail below are examples of the following: definition templates, deployment templates, modification of templates, extensibility to new templates, and vendor-specific templates. Within each of the definition and deployment categories, there are examples related to use of those templates for Business Resilience configuration and deployment.

Definition and Deployment Templates

Definition templates are applied during configuration time for specification of artifacts used for business resilience management. Instead of starting from a clean configuration environment each time, customers can select from a set of "best practices" templates shipped as part of BR to apply depending on their specific environment. Pattern matching searches a resource graph, which represents resources and relationships in a customer's IT environment, or other data structure to find instances that match the resource types included in the definition templates. Once instances are found, the information associated with the template is applied, resulting in matching of resource types from the template to resource instances of the same type in the customer IT topology. The result is presented to the customer for acceptance or modification in the BR UI space.

In the case of definition and deployment templates, the members of a template are resource types (not instances) and the relationship types (not instances) between those resource types. Resources may be represented in many ways including, for example, as CIM compliant resources.

A plurality of different kinds of definition and deployment templates are described herein. However, in other embodiments, there may be more, less or different templates than those described herein.

1—Recovery Segment Definition Templates

A Recovery Segment includes a representation of one or more IT resources and their inter-relationships, where the resources are of the same or different types. The resources and relationships may be represented in multiple ways, such as through CIM compliant resources. A Recovery Segment is a programmatic representation of a business application.

The Recovery Segment Definition templates are patterns of well-known and well-understood topologies of IT resources with common behavior, and are used to suggest formations of Recovery Segments that may be applicable and/or desirable for the customer's IT environment.

A resource graph may be formed reflecting the configuration of the IT resources, and that resource graph has relationships between these IT resources that form a DAG (Directed Acylic Graph). The pattern represented by the Recovery Segment Definition template is applied to the resource graph to recommend or deliver a definition of a Recovery Segment. The resulting definition recommendation can also be customized by, for instance, adding IT resource representations, removing IT resource representations, and/or adding, changing or removing relationships between IT resources. Likewise, specific behaviors and workflows (e.g., BPEL) may already be associated with the template, which can be customized after the template is applied.

Template selection capabilities are included as part of the BR Templates Eclipse plugin, as one example. The Eclipse plugin queries the BR template datastore for the persisted Recovery Segment Definition templates and parses them when necessary. These Recovery Segment templates are stored in the template datastore at BR installation time. During definition of the Recovery Segment, the template datastore is referenced to locate templates having resources and relationships of the same type as those in the Recovery Segment being created. It may also be desirable to categorize the templates in order to mitigate performance delays on the client (see examples below for DB2® and CICS®) when selecting templates to apply.

Pattern matching logic is included as part of each individual template. When a topology is rendered in the BR UI, the BR Administrator has the option to select specific templates in order to apply the pattern matching logic of each to the customer's topology to search for pattern matches. In a large topology, pattern matching may take a long time, so it may be desirable to provide a progress indicator to provide feedback to the customer.

When the pattern matching logic is finished, the BR Administrator is provided a list of the matched patterns. The BR Administrator is then able to select a particular pattern that was matched from that list and the nodes that were matched are highlighted on the UI. The Administrator can then easily perform any action on those nodes as provided by the UI. Thus, even for a large topology with the pattern matched numerous times, the BR Administrator can easily navigate the matches until a pattern looks like something for which they might want to define a Recovery Segment.

Examples of RS Definition Templates

Described below are two examples of RS Definition templates that may be offered as part of the use of definition templates for a Business Resilience configuration. It is not meant to be a complete list. There are variations on these templates that also include related, dependent resources, such as hosting OS, hosting Application Servers, etc.

Figure 9:
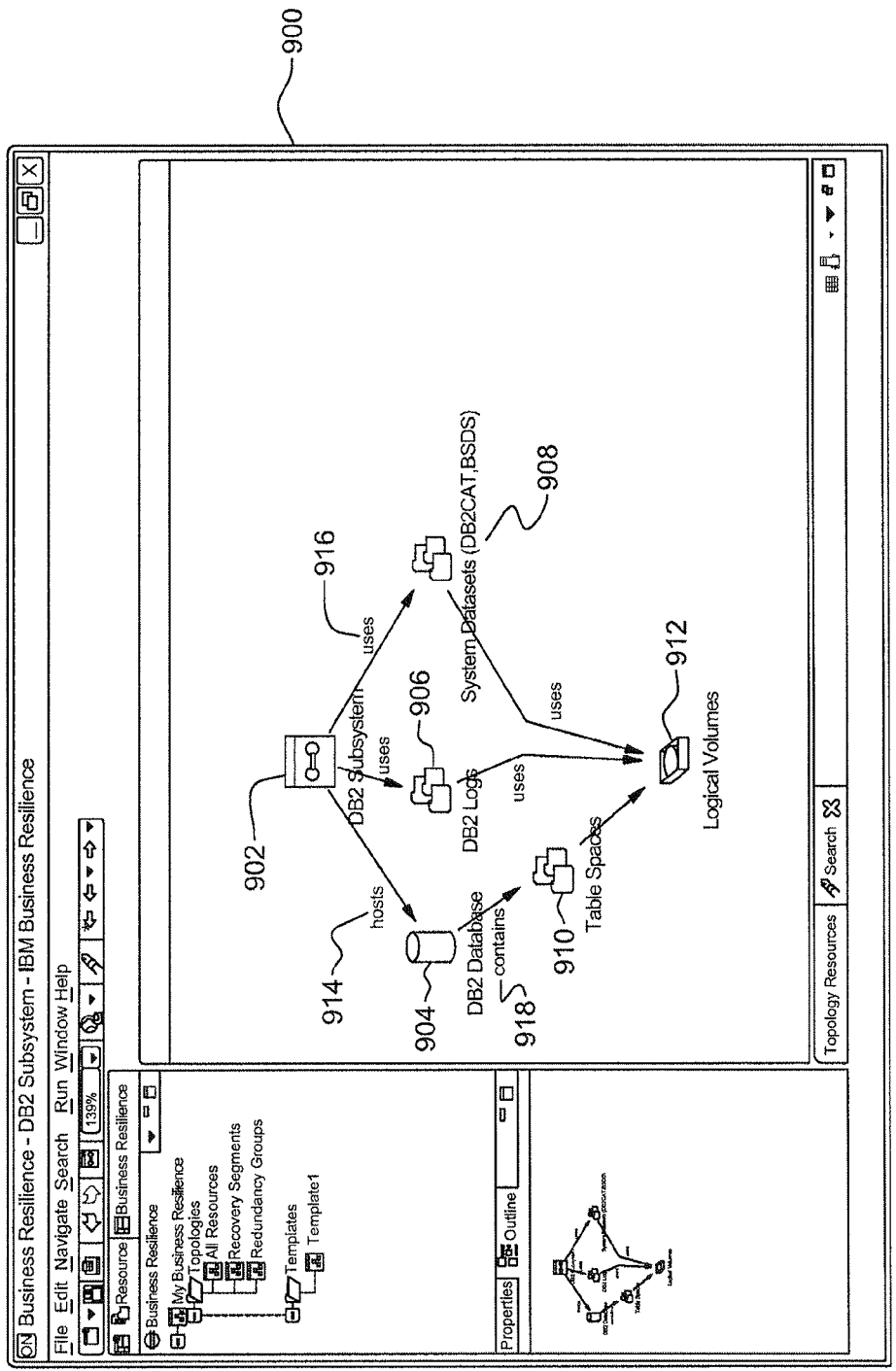
FIG. 9 depicts one example of a DB2® Recovery Segment template, in accordance with an aspect of the present invention.
Figure 10:
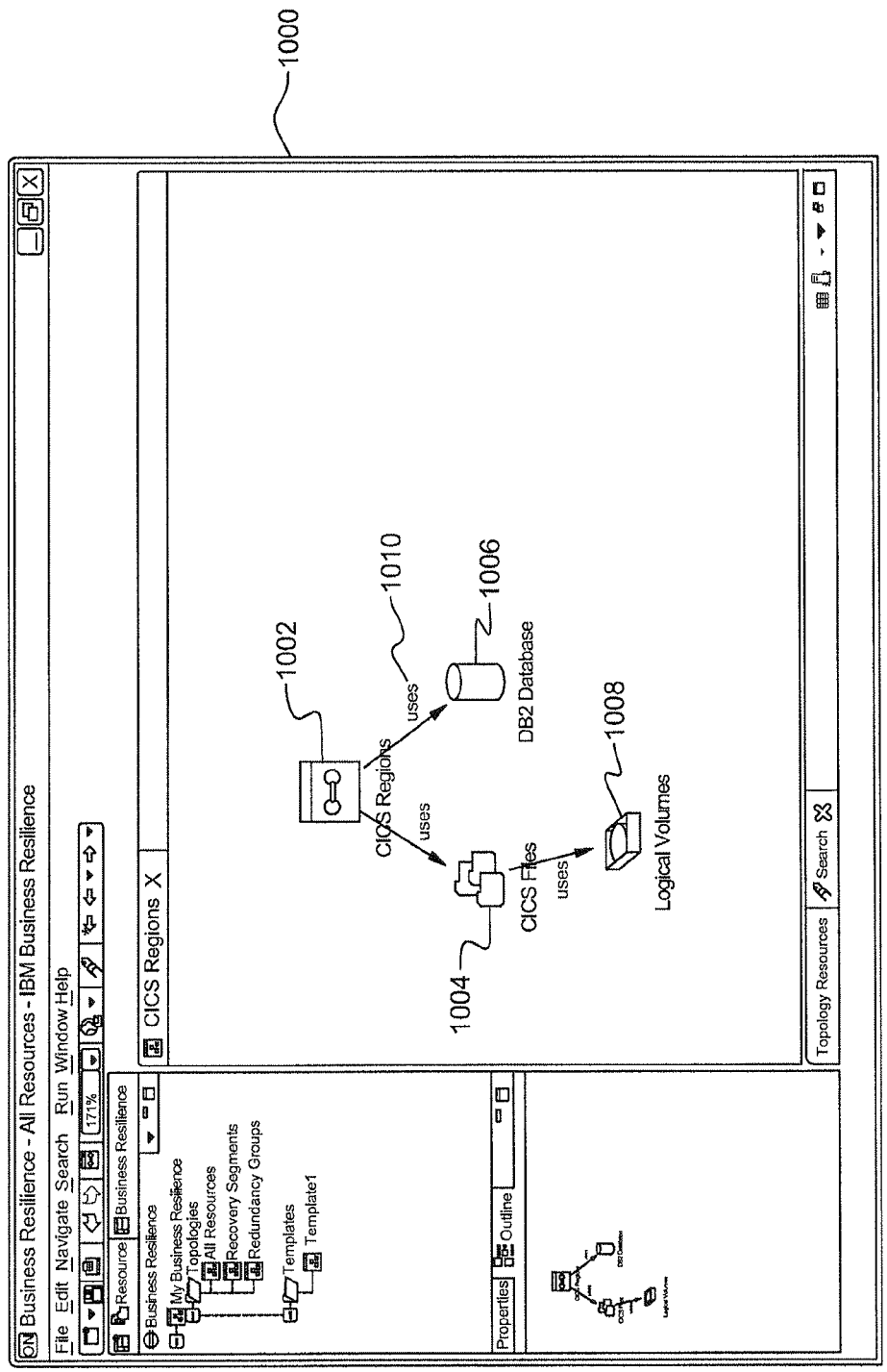
FIG. 10 depicts one embodiment of a CICS® Database Recovery Segment template, in accordance with an aspect of the present invention.

Referring to FIG. 9, one example of a DB2® Database Recovery Segment template is described. As one example, template 900 includes the following well-known and well-understood topology of resource and relationships, as examples:

Resource: DB2 Subsystem (902)
Resource: DB2 Database (904)
Resource: DB2 Logs (906)
Resource: System Datasets (908)
Resource: Table Spaces (910)
Resource: Logical Volume (912)
Relationship: hosts (914)
DB2 Subsystem "hosts" DB2 Database
Relationship: uses (916)
DB2 Subsystem "uses" DB2 Logs
DB2 Subsystem "uses" System Datasets
DB2 Logs "uses" Logical Volume
System Datasets "uses" Logical Volume
Tables Spaces "uses" Logical Volume
Relationship: contains (918)
DB2 Database "contains" Table Spaces Another example is described with reference to FIG. 10, which depicts a CICS® Recovery Segment template 1000. This template includes the following well-known and well-understood topology of resource and relationships, as examples:

Resource: CICS Regions (1002)
Resource: CICS Files (1004)
Resource: DB2 Subsystem (1006)
Resource: Logical Volume (1008)
Relationship: uses (1010)
CICS Regions "uses" CICS Files
CICS Regions "uses" DB2 Subsystem
CICS Files "uses" Logical Volume Modification to Existing RS Definition Templates Using the BR UI, customers can view existing RS Definition templates and derive new RS Definition templates from any of the predefined templates provided by, for instance, IBM® (i.e., BR), hardware or software vendors to specify availability best for their own products, and/or open-source providers.

The allowed template syntax is enforced during modification. In the implementation selected, some vendor provided templates (e.g., from IBM® or other vendors) are not allowed to be directly modified, rather these can be derived into other templates which can then be modified. Other implementations may allow direct modification of vendor provided templates. It is also recommended that customers follow a common naming convention to indicate what template is being derived from, so as to be able to easily find their customized templates when there are service updates to the vendor provided ones.

After the BR Administrator modifies an RS Definition template, they can search their environment's topology for matches of their template pattern. Each match is displayed in the Eclipse search view and when double clicked, opens an editor displaying the nodes comprising the match. The BR Administrator can then take the same actions on that selection that they could take upon any topology selection (such as creating a Recovery Segment).

An existing template may be displayed and altered in a manner similar to defining a template. Resource types (not instances) and relationship types (not instances) may be altered, added, and deleted, and recovery actions modified. Once the template is altered to their satisfaction, they have the option of saving it with either the existing name (if it is not one of the predefined templates shipped with BR) or a new name of their choice. Finally, altering a Recovery Segment template does not impact any instantiated Recovery Segments that were based on that template. The new template only affects new Recovery Segments created with the template.

RS Definition Template Editor

Figure 11:
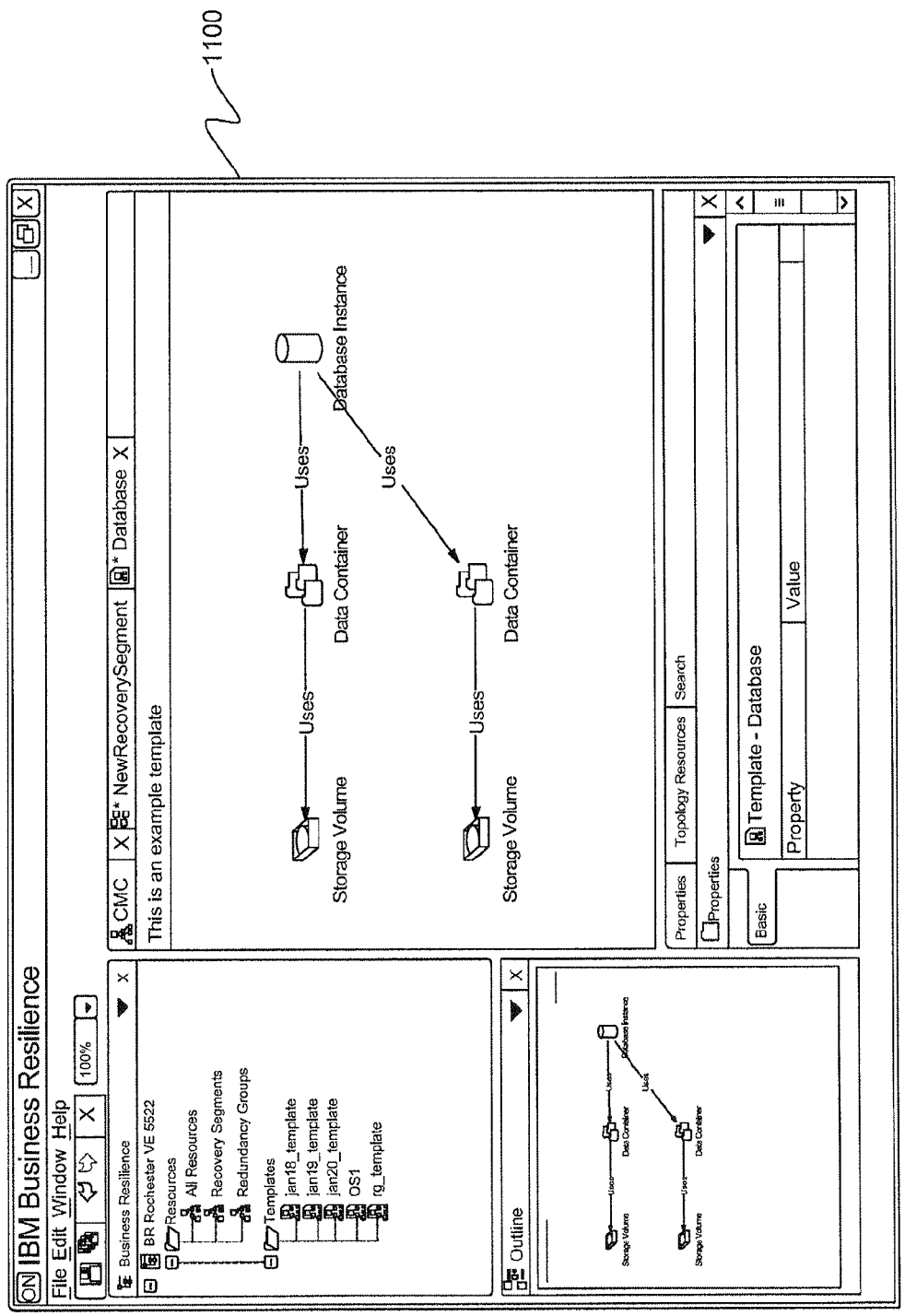
FIG. 11 depicts one example of a RS Definition template, in accordance with an aspect of the present invention.
Figure 12:
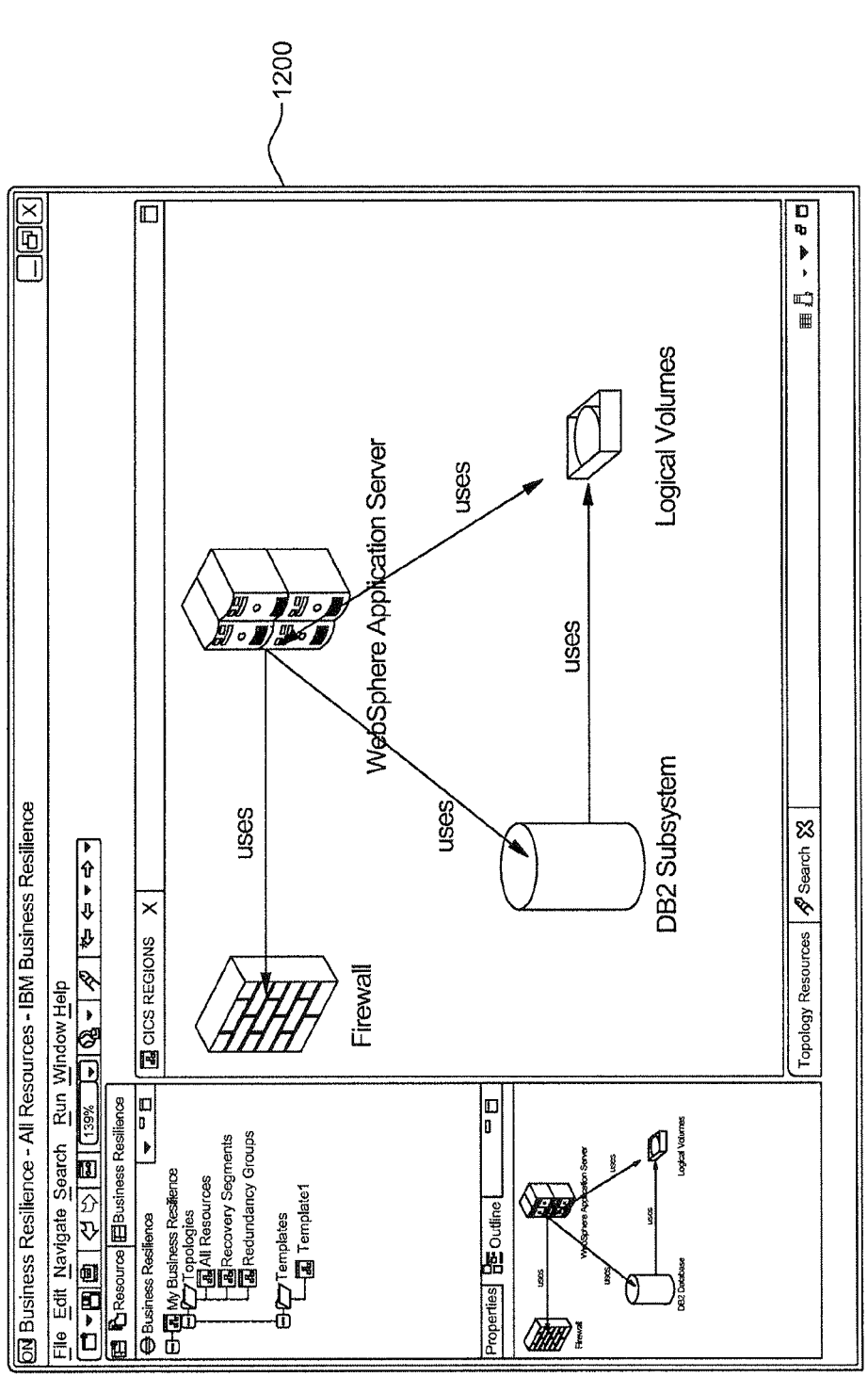
FIG. 12 depicts another example of a RS Definition template, in accordance with an aspect of the present invention.

A BR Administrator is able to display the templates already defined for BR by expanding the templates folder in the UI. Individual templates can then be opened in the template editor. An example of an opened template 1100 is depicted in FIG. 11. This is one example of a RS definition template. Another example of a RS definition template 1200 is depicted in FIG. 12.

It is also possible to match based on both resource types and property values. Thus, a template can be defined which considers running operating systems, versus all operating systems installed in a container; or one that considers active network elements, etc.

New RS Definition Templates

New RS Definition templates may be created by customers for their specific environment. All templates, whether shipped as part of BR, created and/or derived by customers, created by hardware and software vendors (to specify availability best practices for their own products), or provided by open-source providers, can then be executed with the pattern matching techniques in the BR UI space, and displayed from the BR UI. The templates are stored internally in the BR datastore and can be defined with the BR UI and the BR Templates Eclipse plugin.

A BR Administrator is able to define new templates by selecting the "New Template" action. For the RS Definition template, a set of resource types and their inter-relationship types that should be used for pattern searching are provided. Further customization of the pattern matching logic may be achieved through specification of resource property and property values. The BR Administrator is presented with a new template editor to define the new template. Resources and relationships can be added to the editor by right clicking, as depicted in FIG. 13.

Applying RS Definition Templates

One embodiment of the logic to apply RS definition templates is described with reference to FIGS. 14A-14B. As one example, this logic is performed by the UI component, and is invoked by the BR Administrator from the BR Templates Eclipse plugin to apply an existing set of RS Definition templates to a resource graph (reflecting the configuration of the IT resources). The resource graph has relationships between the IT resources that form a DAG. The pattern represented by the Recovery Segment Definition template is applied to the resource graph to recommend or deliver a definition of a Recovery Segment. The resulting definition recommendation can also be customized by, for instance, adding IT resource representations, removing IT resource representations, and/or adding, changing or removing relationships between IT resources. Likewise, specific behaviors and workflows (e.g., BPEL) may already be associated with the template, which can be customized after the template is applied.

The Recovery Segment Definition templates are persisted in the BR template datastore. Each template includes, for instance, pairs of starting and ending resource types and their joining relationship types that are to be found. It also indicates how these relationships are to be chained in order to satisfy the pattern matching. Specific resource property values may optionally be specified as well.

Figure 14A:
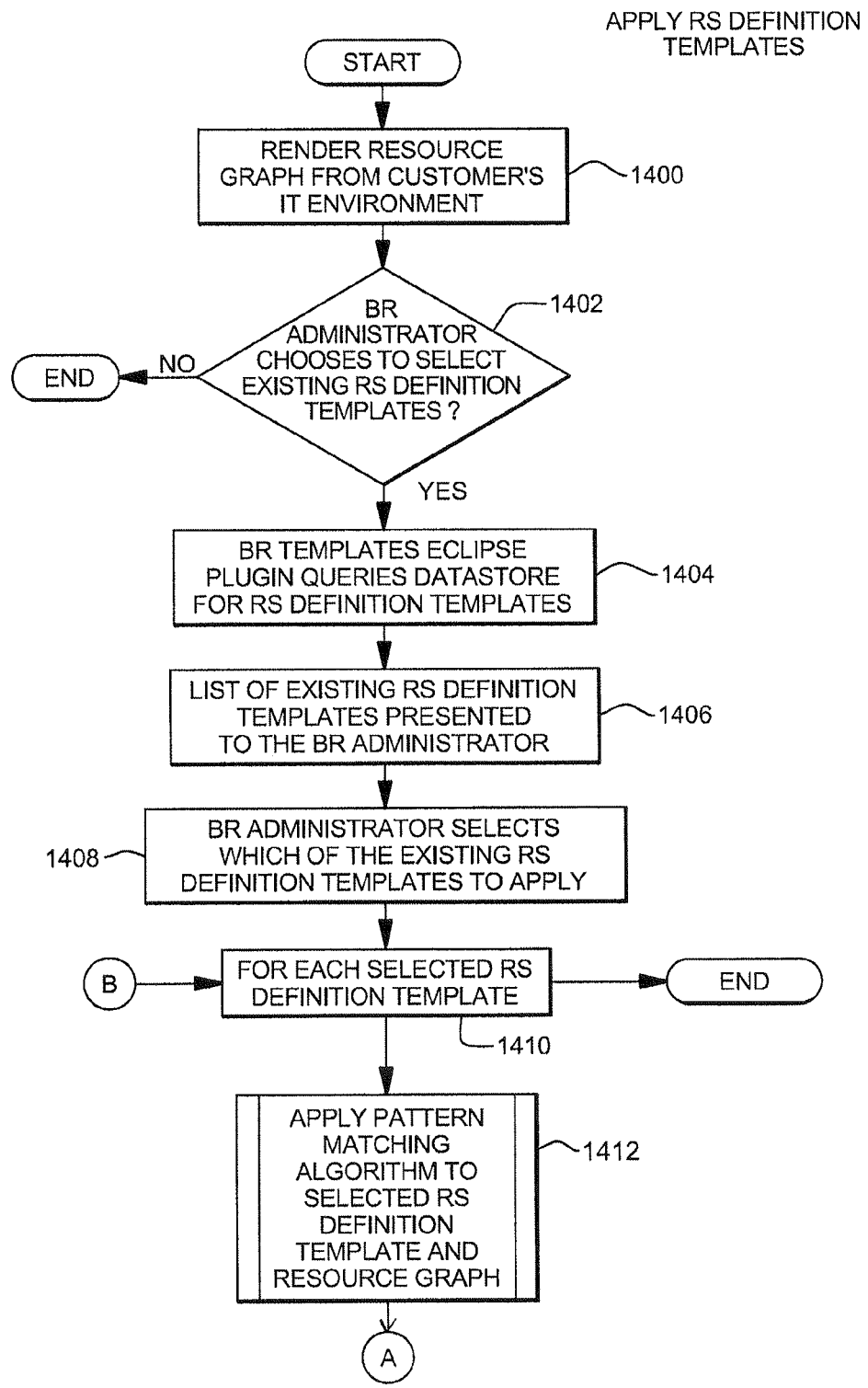
FIGS. 14A-14B depict one embodiment of the logic to apply RS Definition templates, in accordance with an aspect of the present invention.

Referring to FIG. 14A, the process for applying an existing RS Definition template is started by the BR Administrator by displaying the resource graph using the BR UI, STEP 1400.

When a resource graph is rendered using the BR UI, the BR Administrator has the option to select relevant RS Definition templates in order to look for pattern matching, INQUIRY 1402. If the administrator chooses not to select any existing templates, processing ends. Otherwise, processing continues.

The templates are categorized based on template type (e.g., definition, deployment, predefined, user-defined, etc.) in the BR UI to mitigate searching for large numbers of templates when dealing with large resource graphs. A progress indicator also provides feedback to the customer. The BR Templates plugin queries the BR template datastore searching for RS Definition templates, STEP 1404. Additionally, the BR UI counts the number of resource types and resource relationships which are in the resource graph and matches those two counts to similar counts for the Recovery Segment definition templates. Thus, the BR UI is then able to suggest that RS definition templates with resource/relationship types matching the greatest number of similar resource/relationship types in templates are most likely to be applicable.

The BR Administrator is presented with a list of existing and/or applicable RS Definition templates, STEP 1406.

At this point, the BR Administrator selects which of the existing templates to apply for pattern matching. They may choose specific RS Definition templates or all of them, STEP 1408.

For each selected RS Definition template, STEP 1410:

The pattern matching technique is applied to the selected RS Definition templates and the resource graph rendered from STEP 1400 above, STEP 1412. The application of the templates (pattern matching) also includes the resources which are dependent on the ones where the pattern is matched, as part of the recommended definition for the Recovery Segment. The pattern matching technique for the RS Definition template is described below.

Figure 14B:
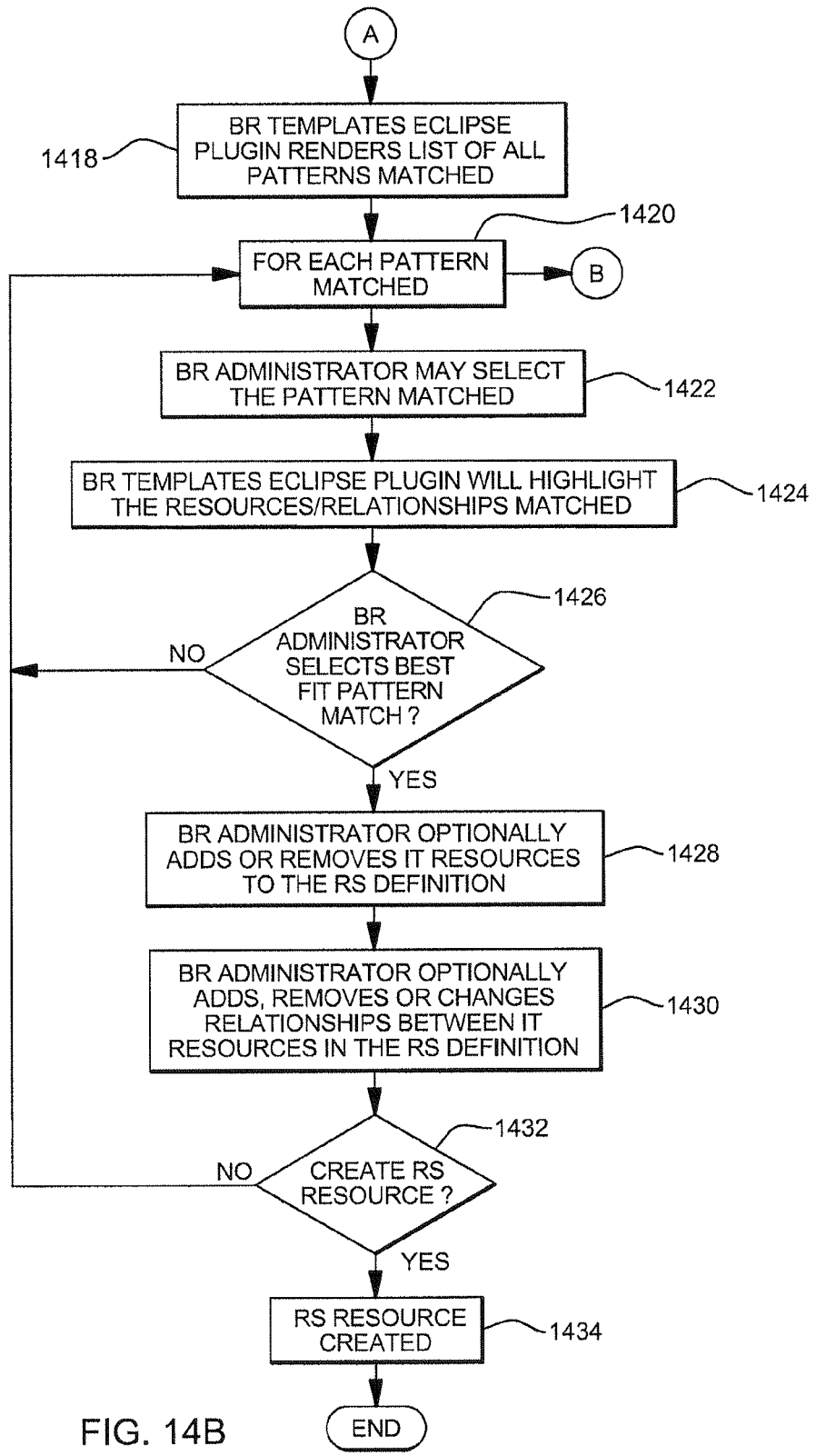

When the pattern matching technique is finished, the BR Administrator is presented with a list of the matched patterns, STEP 1418 (FIG. 14B). The BR Administrator is then able to select a particular pattern that was matched from that list, STEPs 1420, 1422, and the resources and relationships that were matched are highlighted, STEP 1424. The process can iterate multiple times to ensure that the definition is satisfactory.

The BR Administrator may then select which definition is the best fit for their environment, INQUIRY 1426, and optionally customizes the RS definition as desired by, for instance:

Adding or removing IT resources, STEP 1428;
Adding, removing, or changing relationships, STEP 1430.

Finally, the BR Administrator chooses whether to create the Recovery Segment resource based on the RS definition, INQUIRY 1432. If creation is not selected, the processing iterates to the next pattern matched, STEP 1420. Otherwise, the Recovery Segment resource is created (e.g., inserted into the Recovery Segment table of the BR datastore), STEP 1434, and the processing completes.

When the matched patterns have been processed, processing continues to STEP 1410 (FIG. 14A). When the selected RS Definition templates are processed, the processing completes.

RS Definition Template Pattern Matching

One embodiment of the logic for RS definition template pattern matching is described with reference to FIGS. 15A-15B. As one example, this logic is performed by the UI component, and invoked by the BR Administrator from the BR Templates Eclipse plugin to apply a selected RS Definition template to a resource graph (reflecting the configuration of the IT resources). Since the BR UI is Eclipse based, the search itself is performed as a background task in Eclipse and does not prevent other UI actions or tasks by the BR Administrator. The use of a well-known traversal technique (e.g., depth-first search) for traversing the resource graph and the RS template is assumed and not described in detail. Other implementations may use alternate graph traversal techniques.

For illustration purposes, these terms are utilized herein:

A cached topology denoted as $T_C$;
A template topology denoted as $T_T$;
A temporary mark that is used to temporarily mark or flag a topology node and/or relationship;
A pattern-matched mark that is used to mark or flag a topology node and/or relationship to be returned as a result of the technique.

Figure 15A:
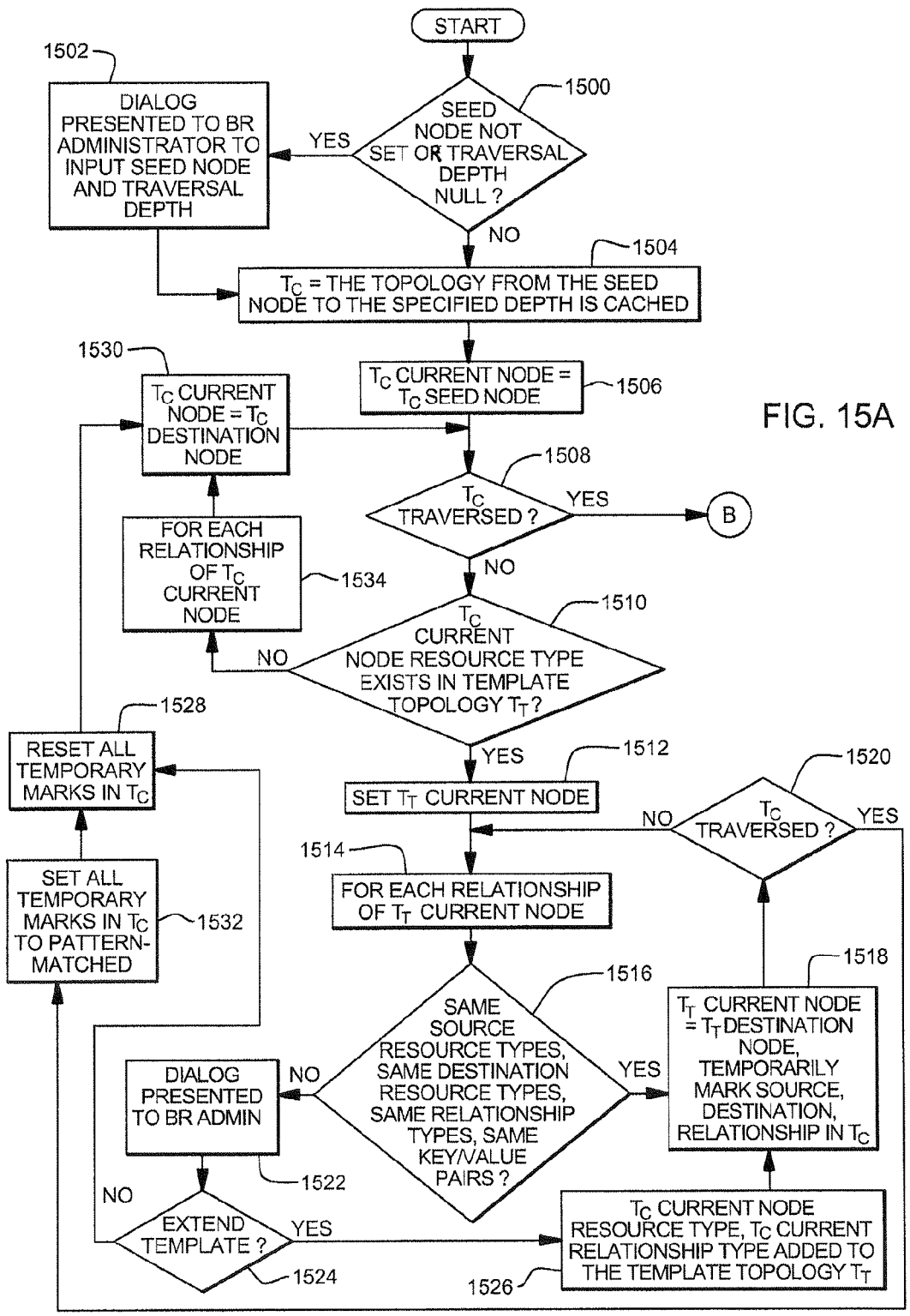
FIGS. 15A-15B depict one embodiment of the logic for RS Definition template pattern matching, in accordance with an aspect of the present invention.
Figure 15B:
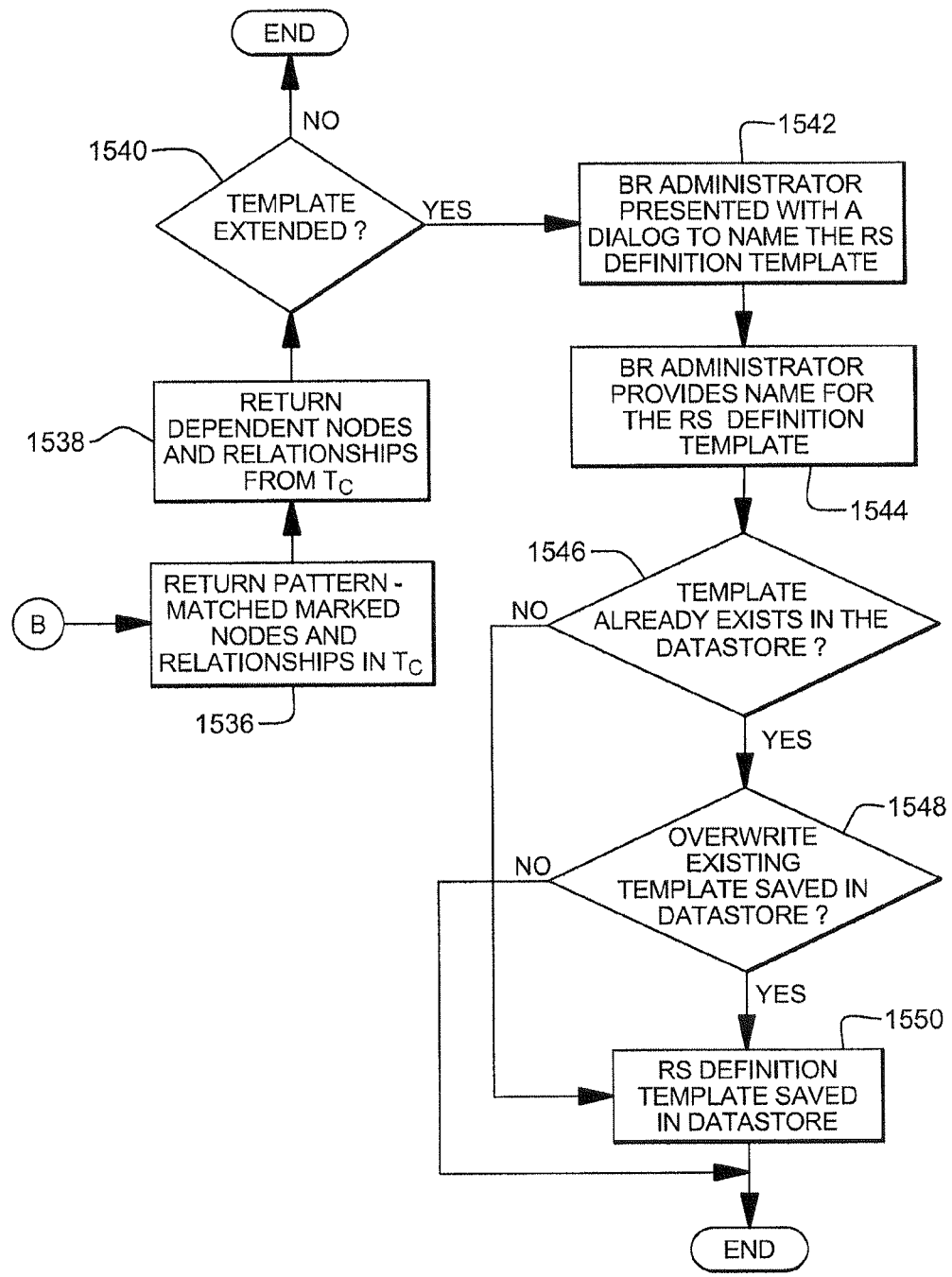

Referring to FIG. 15A, if a seed node is not set or the traversal depth is null, INQUIRY 1500, the pattern matching technique for the RS Definition template starts with an intermediate dialog from the BR Templates Eclipse plugin so that the BR Administrator can provide a seed node of the topology selected and a depth of traversals from that seed node, STEP 1502.

Thereafter, or if there is a seed or the traversal depth is not null, the selected topology is read from the seed node to the specified depth and that topology is cached, STEP 1504. That topology is denoted as $T_C$.

Starting from the seed node of the cached topology $T_C$, the logic traverses relationships searching for template matches using the following data, as examples:

The source node resource type;
The destination node resource type;
The relationship type between the source and destination nodes;
Property values on the source node.
Property values on the destination node.
Set current node to the seed node of the cached topology $T_C$, STEP 1506.

If the current node of the cached topology $T_C$ is not null, which means that the cached topology is still being traversed, INQUIRY 1508, the logic checks to see if the current node resource type exists in the template topology $T_T$, INQUIRY 1510:

If Yes, the current node of the template topology $T_T$ is set, STEP 1512, and the relationships of the $T_T$ current node are traversed, STEP 1514. While all data matches, INQUIRY 1516, both topologies continue to be traversed, STEP 1518, temporarily marking the nodes and relationships in the cached topology $T_C$ as pattern matched until there are no more nodes in the template topology $T_T$ to traverse, INQUIRY 1520.

Returning to INQUIRY 1516, if at any time there is not a match:
- The BR Administrator is presented with a dialog, STEP 1522, asking if they wish to extend the Recovery Segment definition template with the unmatched relationship and node, INQUIRY 1524.
- If the BR Administrator selects Yes, the current node of the cached topology $T_C$ and the current relationship type of the cached topology $T_C$ are added to the template topology $T_T$, STEP 1526, and the pattern matching continues, STEP 1518.
- If the BR Administrator selects No, INQUIRY 1524:
  - The set of temporary marked nodes and relationships in the cached topology $T_C$ is reset, STEP 1528.
  - The current node of the cached topology $T_C$ is adjusted and processing iterates, STEP 1530.

When the template topology $T_T$ is traversed, INQUIRY 1520:
- The set of temporary marked nodes and relationships in the cached topology $T_C$ is set to pattern-matched, STEP 1532.
- The set of temporary marked nodes and relationships in the cached topology $T_C$ is reset, STEP 1528.
- The current node of the cached topology $T_C$ is adjusted and processing iterates, STEP 1530.

Returning to INQUIRY 1510, if No, the relationships of the $T_C$ current node are traversed, STEP 1534, setting current node to the destination node of the cached topology $T_C$, STEP 1530, and processing iterates until there are no more nodes in the template to traverse.

When processing completes, INQUIRY 1508, the pattern-matched marked set of nodes and relationships is returned to the caller, STEP 1536 (FIG. 15B), so that they can be highlighted in the BR UI. In particular, in this example, returned is the matched list of resources and relationships from the template found in the customer topology, which is the recommended set to be formed into a RS.

The logic also includes the resources which are dependent on the ones where the pattern is matched, as part of the recommended definition for the Recovery Segment, STEP 1538.

If, during the execution, the BR Administrator had chosen to extend the existing Recovery Segment definition template, INQUIRY 1540, the BR Templates Eclipse plugin presents the BR Administrator with a new dialog to name the RS Definition template, STEP 1542.
- The BR Administrator provides a name for the template, STEP 1544.
- The BR Template Eclipse plugin determines if a template definition already exists with that name in the BR template datastore, INQUIRY 1546.
  - If Yes, the BR Templates Eclipse plugin asks the user if they wish to overwrite the existing definition, INQUIRY 1548.
    - If yes, the BR Templates Eclipse plugin saves the template in the BR template datastore, STEP 1550, and processing completes.
    - If no, processing completes.
  - If No, INQUIRY 1546, the BR Templates Eclipse plugin saves the template in the BR template datastore, STEP 1550, and processing completes.

Defining RS Definition Template

One embodiment of the logic to define a RS definition template is described with reference to FIGS. 16A-16D. As one example, this logic is performed by the UI component and invoked via the BR Administrator interfaces to define a new Recovery Segment Definition template. For the RS Definition template, a set of resource types and their inter-relationship types that are to be used for pattern searching are provided. The BR Administrator is presented with a new template editor to define the new template. Resources and relationships can be added to the editor by right-clicking in the template editor background. Properties can also be optionally set on the resources by selecting and then right-clicking on them to bring up the list of settable properties.

Figure 16A:
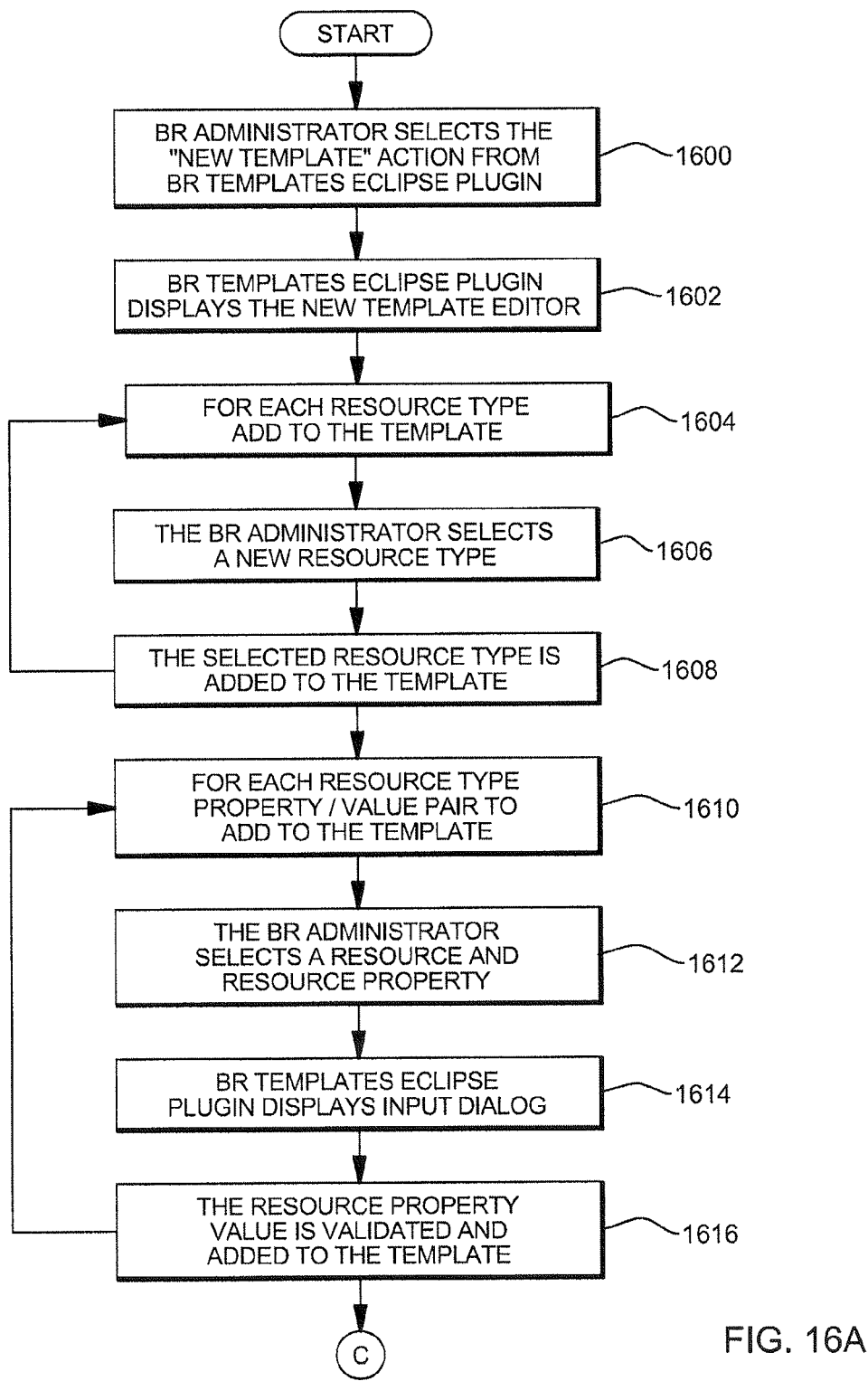
FIGS. 16A-16D depict one embodiment of the logic to define a RS Definition template, in accordance with an aspect of the present invention.
Figure 16B:
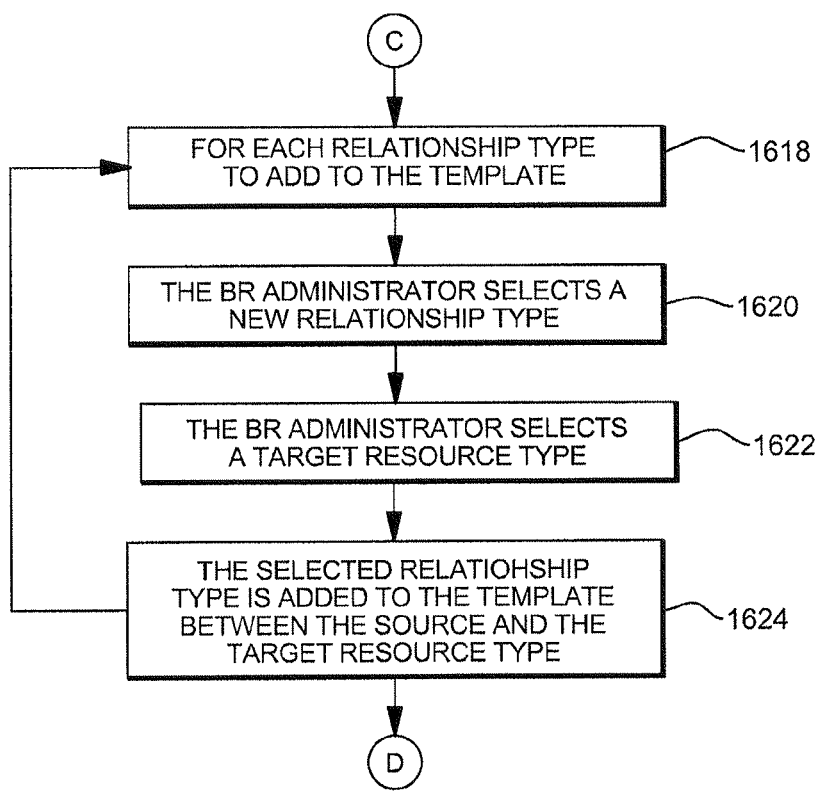
Figure 16C:
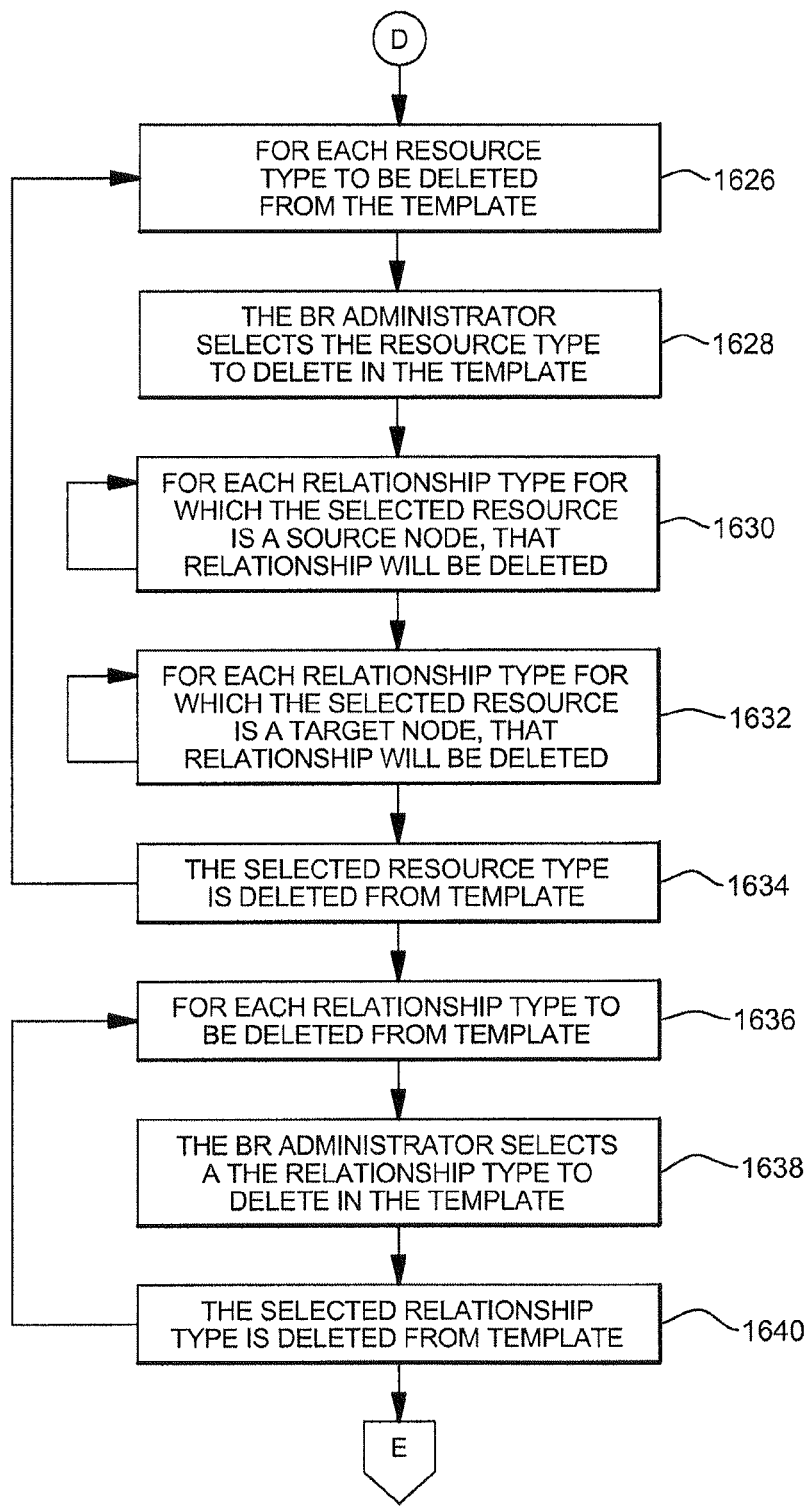

Referring to FIG. 16A, the process for defining a new RS Definition template is started by the BR Administrator by selecting the "New Template" action from the BR Templates Eclipse plugin, STEP 1600.

The BR Administrator is presented with a new template editor to define the new template, STEP 1602. An example is shown in FIG. 11, described above.

For each resource type to add to the template, STEP 1604:
- The BR Administrator right-clicks in the template editor background and selects a new resource type, STEP 1606.
- The selected resource type is added to the template, STEP 1608.

For each resource type property/value pair to add to the template, STEP 1610:
- The BR Administrator right-clicks on a resource type previously added to the template and selects a property of that resource type, STEP 1612.
- The template editor presents the BR Administrator with an input dialog to add the value for that selected property, STEP 1614.
- That property/value pair is validated and then added to the template, STEP 1616.

For each relationship type to add to the template, STEP 1618 (FIG. 16B):
- The BR Administrator right-clicks on a resource type previously added to the template (i.e., source node) and selects a new relationship type, STEP 1620.
- The BR Administrator selects a resource type previously added to the template (i.e., target node), STEP 1622.
- The selected relationship type is validated and then added to the template between the source node and the target node, STEP 1624.

For each resource type to delete from the template, STEP 1626 (FIG. 16C):
- The BR Administrator selects the resource type to delete in the template, STEP 1628.
- For each relationship type for which the selected resource is a source node, that relationship is deleted, STEP 1630.
- For each relationship type for which the selected resource is a target node, that relationship is deleted, STEP 1632.
- The selected resource type is deleted from the template, STEP 1634.

For each relationship type to delete from to the template editor, STEP 1636:
- The BR Administrator selects the relationship type to delete in the template, STEP 1638.
- The selected relationship type is deleted from the template, STEP 1640.

Figure 16D:
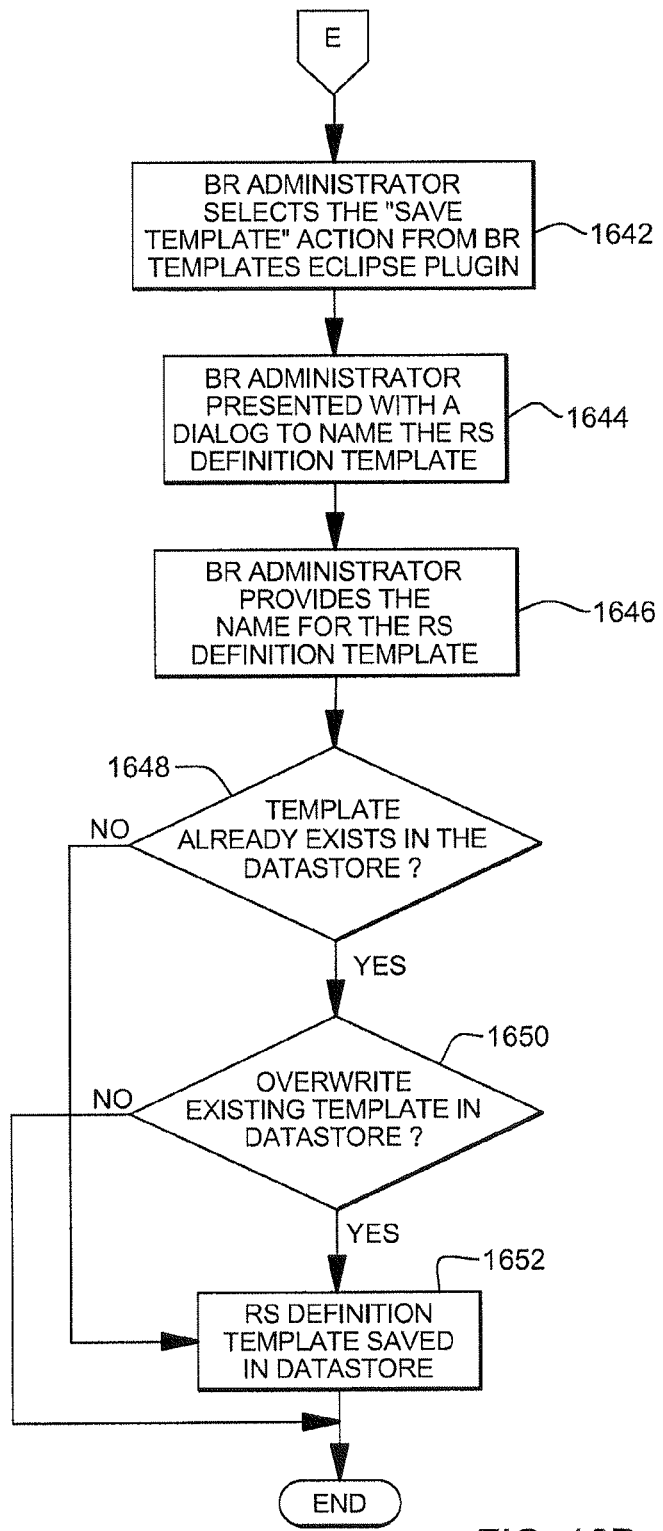

When the BR Administrator is finished updating the template, the administrator selects the "Save Template" action from the BR Templates Eclipse plugin, STEP 1642 (FIG. 16D).

The BR Templates Eclipse plugin presents the BR Administrator with a new dialog to name the RS Definition template, STEP 1644.

The BR Administrator provides a name for the template, STEP 1646.

The BR Template Eclipse plugin determines if a template definition already exists with that name in the BR template datastore, INQUIRY 1648.

If Yes, the BR Templates Eclipse plugin asks the user if they wish to overwrite the existing definition, INQUIRY 1650.

If yes, the BR Templates Eclipse plugin saves the template in the BR template datastore, STEP 1652, and processing completes.

If no, processing completes.

If No, INQUIRY 1648, the BR Templates Eclipse plugin saves the template in the BR template datastore, STEP 1652, and processing completes.

2—Redundancy Group Definition Templates

A Redundancy Group includes two or more resource representations of IT resources that provide equivalent functional capability. The resources may be represented in multiple ways, such as through CIM compliant resources.

The Redundancy Groups Definition templates are patterns of well-known and well-understood topologies of IT resources that provide equivalent functionality, common behavior, and are used to suggest, for instance:

Formations of Redundancy Groups that may be applicable and/or desirable for the customer's IT environment.

Recommendations for RG state. For example:

It is recommended to have multiple independent paths to a storage volume.

It is recommended to have multiple members of a data sharing group.

Etc.

There is a resource graph reflecting the configuration of the IT resources, and that resource graph has relationships between these IT resources that form a DAG. The pattern represented by the Redundancy Group Definition template is applied to the resource graph to recommend or deliver a definition of a Redundancy Group. The programmatic process of applying the template searches the resource graph for resources of the same type (and optionally with the same properties and the same type of relationships) which match the resources expressed in the template and suggest they could form an RG for the purposes of redundancy. The resulting definition recommendation can also be customized by, for instance, adding IT resource representations, removing IT resource representations, adding/removing properties, and/or adding, changing or removing relationships between IT resources.

Examples of RG Definition Templates

The following are examples of RG Definition templates that may be offered as part of the use of Definition templates for Business Resilience configuration. It is not meant to be a complete list.

1. Grouping of data sharing DB2® subsystems.
2. Grouping of operating systems in a Parallel Sysplex® cluster.
3. Grouping of Windows® Servers that can host a given application.
4. A set of DB2® databases connected to a web application server (e.g., WebSphere).
5. A set of DB2® databases connected to CICS region.

Modification to Existing RG Definition Templates

Using the BR UI, customers can view existing RG Definition templates and derive new RG Definition templates from any of the predefined templates provided by, for instance, IBM® (i.e., BR), hardware or software vendors to specify availability best practices for their own products, and/or open-source providers.

The allowed template syntax is enforced during modification. In the implementation selected, some vendor provided templates (e.g., from IBM® or other vendors) are not allowed to be directly modified, rather these can be derived into other templates which can then be modified. Other implementations may allow direct modification of vendor provided templates. It is also recommended that customers follow a common naming convention to indicate what template is being derived from, so as to be able to easily find their customized templates when there are service updates to the vendor provided ones.

After the BR Administrator modifies an RG Definition template, they can search their environment's topology for matches of their template pattern. Each match is displayed in the Eclipse search view and when double clicked, opens an editor displaying the nodes comprising the match. The BR Administrator can then take the same actions on that selection that they could take upon any topology selection (such as creating a Redundancy Group).

New RG Definition Templates

New RG Definition templates may be created by customers for their specific environment. The templates, whether shipped as part of BR, created and/or derived by customers, created by hardware and software vendors (to specify availability best practices for their own products), or provided by open-source providers, can then be executed with the pattern matching techniques in the BR UI space, and displayed from the BR UI. The templates are stored internally in the BR datastore and can be defined with the BR UI and the BR Templates Eclipse plugin.

A BR Administrator is able to define new templates by selecting the "New Template" action. Since all the resources in a RG are of the same type, for a RG Definition template, a resource type that is to be used for pattern matching is provided. Optionally, a property/value pair or relationship type expression on the resource to be matched to the resource graph may be provided.

Applying RG Definition Templates

One embodiment of the logic to apply RG definition templates is described with reference to FIGS. 17A-17B. As one example, this logic is performed by the UI component and invoked by the BR Administrator from the BR Templates Eclipse plugin to apply an existing set of RG Definition template to a resource graph (reflecting the configuration of the IT resources). The resource graph has relationships between the IT resources that form a DAG. The pattern represented by the Redundancy Group Definition template is applied to the resource graph to recommend or deliver a definition of a Redundancy Group. The resulting definition recommendation can also be customized by, for instance: adding IT resource representations; removing IT resource representations; adding, removing or changing property data; and/or adding, changing or removing relationships between IT resources.

The Redundancy Group Definition templates are persisted in the BR template datastore. Each template includes resource types and optionally their joining relationship types that are to be found. Specific resource property values may optionally be specified as well.

Figure 17A:
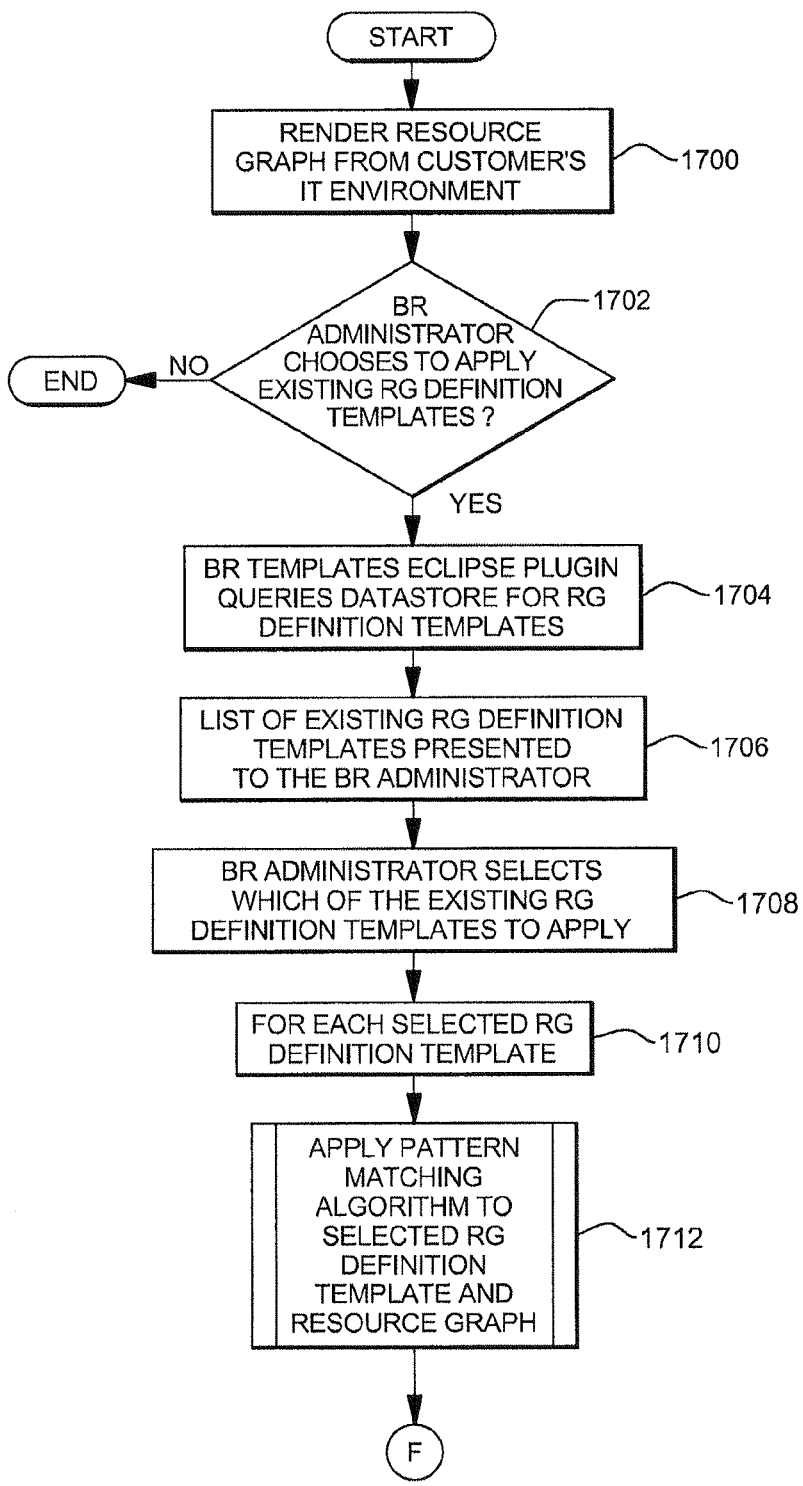
FIGS. 17A-17B depict one embodiment of the logic to apply RG Definition templates, in accordance with an aspect of the present invention.

Referring to FIG. 17A, the process for applying an existing RG Definition template is started by the BR Administrator by displaying the resource graph using the BR UI, STEP 1700.

When a resource graph is rendered using the BR UI, the BR Administrator has the option to apply relevant RG Definition templates in order to look for pattern matching, INQUIRY 1702. If the administrator chooses not to, processing ends. Otherwise, processing continues.

The templates are categorized based on template type (e.g., definition, deployment, predefined, user-defined, etc.) in the BR UI to mitigate searching for large numbers of templates when dealing with large resource graphs. A progress indicator also provides feedback to the customer. The BR Templates plugin queries the BR template datastore searching for the RG Definition templates, STEP 1704.

The BR Administrator is presented with a list of existing RG Definition templates, STEP 1706.

At this point, the BR Administrator selects which of the existing templates to apply for pattern matching. They may choose specific RG Definition templates or all of them, STEP 1708.

The pattern matching technique is applied to the selected RG Definition templates, STEP 1710, and the resource graph rendered from STEP 1700 above, STEP 1712. The pattern matching technique for the RG Definition template is described below.

Figure 17B:
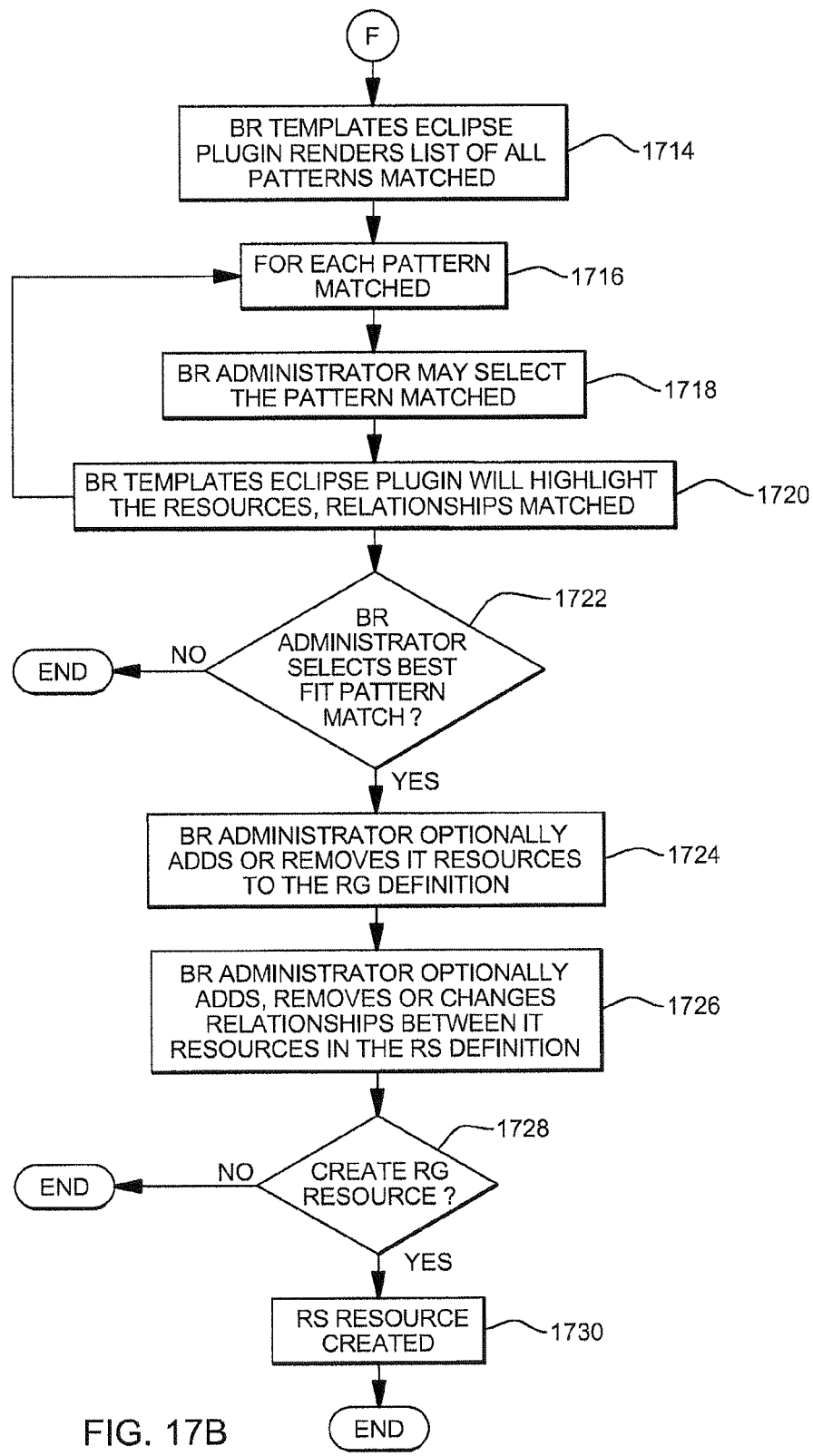

When the pattern matching technique is finished, the BR Administrator is presented with a list of the matched patterns, STEP 1714 (FIG. 17B). The BR Administrator is then able to select a particular pattern that was matched from that list, STEPs 1716, 1718, and the resource and possibly relationships that were matched are highlighted, STEP 1720. The process can iterate multiple times to ensure that the definition is satisfactory.

The BR Administrator may then select which definition is the best fit for their environment, INQUIRY 1722, and optionally, customizes the RG definition as desired by, for instance: adding or removing IT resources, STEP 1724; and/or adding, removing, or changing relationships or adding, removing properties, STEP 1726.

Finally, the BR Administrator chooses whether to create the Redundancy Group resource based on the RG definition, INQUIRY 1728. If yes, the Redundancy Group resource is created and given a name (i.e., inserted into the Redundancy_Group table of the BR datastore), STEP 1730, and the processing completes. If not, processing just completes.

RG Definition Template Pattern Matching

One embodiment of the logic for RG definition template pattern matching is described with reference to FIGS. 18A-18B. As an example, this logic is performed by the UI component and invoked by the BR Administrator from the BR Templates Eclipse plugin to apply a selected RG Definition template to a resource graph reflecting the configuration of the IT resources. Since the BR UI is Eclipse based, the search itself is performed as a background task in Eclipse and does not prevent other UI actions or tasks by the BR Administrator. The use of a well-known traversal technique (e.g., depth-first search) for traversing the two graphs is assumed and not described in detail. Other implementations may use alternate graph traversal techniques. The RG Definition template, which may be comprised of unconnected nodes should still be considered to be a graph (i.e., unconnected graphs).

For illustration purposes, these terms are utilized herein:
A cached topology denoted as $T_C$.
A template topology denoted as $T_T$.
A pattern-matched mark that is used to mark or flag a topology node and property values to be returned as a result of the technique.

Figure 18A:
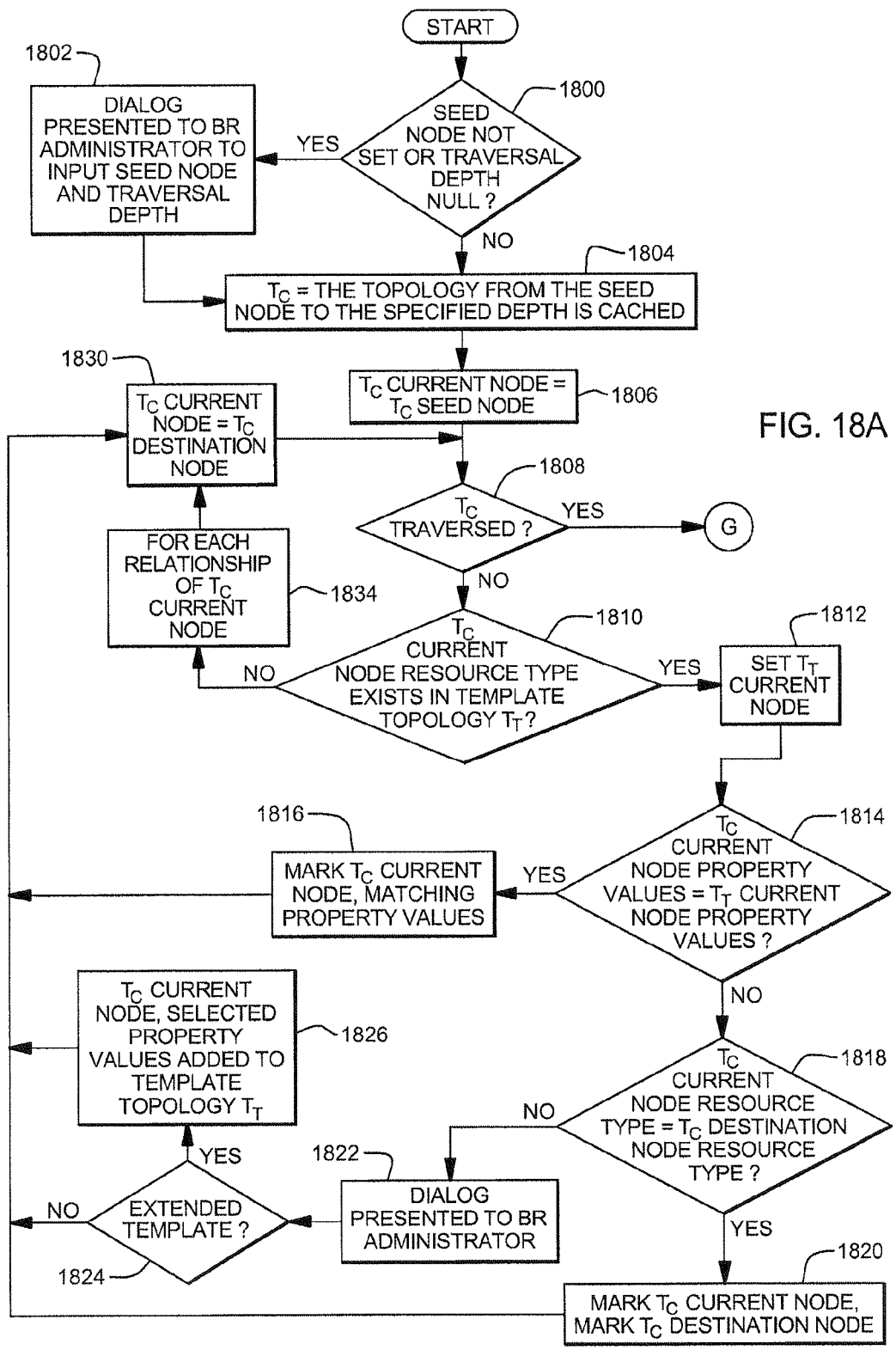
FIGS. 18A-18B depict one embodiment of the logic for RG Definition template pattern matching, in accordance with an aspect of the present invention.
Figure 18B:
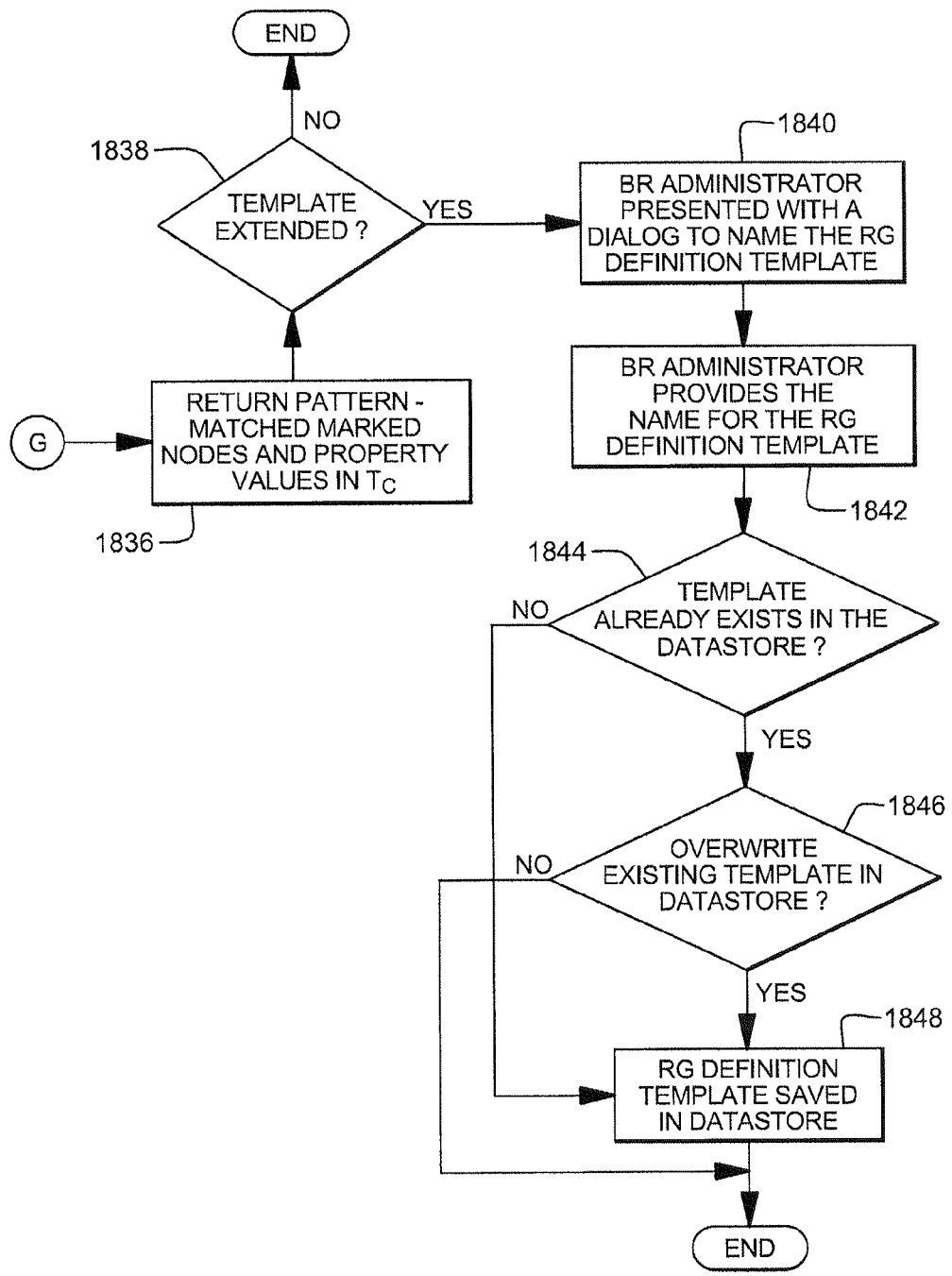

Referring to FIG. 18A, if a seed node is not set or the traversal depth is null, INQUIRY 1800, the pattern matching for the RG Definition template starts with an intermediate dialog from the BR Templates Eclipse plugin, so that the BR Administrator can provide a seed node of the topology selected and a depth of traversals from that seed node, STEP 1802.

Thereafter, or if there is a seed or the traversal depth is not null, the selected topology is read from the seed node to the specified depth and that topology is cached, STEP 1804. That topology is denoted as $T_C$.

Starting from the seed node of the cached topology $T_C$, the logic traverses each node in the topology for template matches using the following data, as examples:
The resource type;
The resource type with specific properties;
The relationship between resources of the same type.

Set current node to the seed node of the cached topology $T_C$, STEP 1806.

If the current node of the cached topology $T_C$ is not null, which means that the cached topology is still being traversed, INQUIRY 1808, the logic checks to see if the current node resource type exists in the template topology $T_T$, INQUIRY 1810:

If Yes, it sets the current node of the template topology $T_T$, STEP 1812.

The logic then checks to see if the property values on the current node of the cached topology $T_C$ equals those specified on the current node of the template topology $T_T$, INQUIRY 1814. (No properties specified on the current node of the template topology $T_T$ resolves to Yes).

If Yes, it marks the current node of the cached topology $T_C$ and the matching properties, STEP 1816, and processing continues to STEP 1830.

If No, the logic checks to see if the resource type of the current node of the cached topology $T_C$ has a destination node of the same resource type, INQUIRY 1818 (i.e., a relationship exists between resources of the same type).

If Yes, it marks the current node of the cached topology $T_C$, the destination node of the cached topology $T_C$, STEP 1820, and iterates.

If No, the BR Administrator is presented with a dialog asking if they wish to extend the Redundancy Group definition template with the unmatched node and any property values, STEP 1822.

If the BR Administrator selects Yes, INQUIRY 1824, the current node of the cached topology $T_C$, and the selected property values of the current node of the cached topology $T_C$ node are added to the template topology $T_T$, STEP 1826, and the pattern matching techniques continues.

If the BR Administrator selects No, INQUIRY 1824, the pattern matching techniques continues.

When processing completes for the cached topology $T_C$, INQUIRY 1808, the pattern-matched marked set of nodes and properties are returned to the caller, STEP 1836 (FIG. 18B), so that they can be highlighted in the BR UI.

If during the execution of the technique, the BR Administrator had chosen to extend the existing Redundancy Group Segment definition template, INQUIRY 1838, the BR Templates Eclipse plugin presents the BR Administrator with a new dialog to name the RG Definition template, STEP 1840.

The BR Administrator provides a name for the template, STEP 1842.

The BR Template Eclipse plugin determines if a template definition already exists with that name in the BR template datastore, INQUIRY 1844.

If Yes, the BR Templates Eclipse plugin asks the user if they wish to overwrite the existing definition, INQUIRY 1846.

If yes, the BR Templates Eclipse plugin saves the template in the BR template datastore, STEP 1848, and processing completes.

If no, processing completes.

Returning to INQUIRY 1844, if the template does not already exist in the datastore, the BR Templates Eclipse plugin saves the template in the BR template datastore, STEP 1848, and processing completes.

3—Resource Pairing Definition Templates

The Resource Pairing Definition templates are patterns of well-known and well-understood pairs of IT resources and relationships between those resources and are used to, for instance:

Suggest possible pairing definitions during Recovery Segment definition and configuration;

Suggest possible pairing definitions for an existing Recovery Segment, where the resulting pairings and triggers for the pairings, take effect when applied.

The resources and relationships can be expressed in multiple ways, but may be represented as CIM compliant resources.

There is a resource graph reflecting the configuration of the IT resources, and that resource graph has relationships between these IT resources that form a DAG. The pattern represented by the Resource Pairing Definition template is applied to the resource graph to recommend or deliver a definition of a Resource Pairing. The programmatic process of applying the template searches the resource graph for patterns of well-known and well-understood pairs of IT resources and relationships between those resources during Recovery Segment definition or afterwards. The resulting definition recommendation can also be customized by, for example, adjusting preferences on the pairing constructs, and/or adding triggers for runtime environment applicability tests.

The content of the Resource Pairing Definition templates includes, for instance:

Pairs of resource types and relationship types connecting the pairs.

Operations on one resource and sequencing with respect to an operation on the other resource.

Failure or degradation impact of one resource on another.

Operation effect of one resource on another's state, or operation effect on the state of the resource.

Constraints to be enforced when executing a recovery for one resource, in terms of what is allowed to be done to another resource within the context of a Recovery Segment. For example:

When there is a shared resource among multiple Recovery Segments, it might be suggested that there may be a need for a constraint.

Requirements for co-location between resource pairs.

Indications of when a resource operation on one resource at a prepare or configuration time will have an effect later during recovery processing for the resource.

Examples of Resource Pairing Definition Templates

The following are examples of Resource Pairing Definition templates that may be offered as part of the use of Definition templates for Business Resilience configuration. It is not meant to be a complete list.

1. DB2®, start subsystem before CICS® start region.
2. WAS degradation when hosted OS degrades.
3. DB2®, start (and various types of start) transitions DB2® to operational.
4. Replication Session, initiate flashcopy will effect Replication Session, restore using flashcopy operation.

Modification to Existing Resource Pairing Definition Templates

Using the BR UI, customers can view existing resource pairing Definition templates and derive new pairing definition templates from any of the predefined templates provided by, for instance, IBM® (i.e., BR), hardware or software vendors to specify availability best practices for their own products and/or open-source providers.

The allowed template syntax is enforced during modification. In the implementation selected, some vendor provided templates (e.g., from IBM® or other vendors) are not allowed to be directly modified, rather these can be derived into other templates which can then be modified. Other implementations may allow direct modification of vendor provided templates. It is also recommended that customers follow a common naming convention to indicate what template is being derived from, so as to be able to easily find their customized templates when there are service updates to the vendor provided ones.

After the BR Administrator modifies a resource pairing definition template, they can search their environment's topology for matches of their template pattern. Each match is displayed in the Eclipse search view and when double clicked, opens an editor displaying the nodes comprising the match. The BR Administrator can then take the same actions on that selection that they could take upon any topology selection.

New Resource Pairing Definition Templates

New resource pairing Definition templates may be created by customers for their specific environment. The templates, whether shipped as part of BR, created and/or derived by customers, created by hardware and software vendors (to specify availability best practices for their own products), or provided by open-source providers, can then be executed with the pattern matching techniques in the BR UI space, and displayed from the BR UI. The templates are stored internally in the BR datastore and can be defined with the BR UI and the BR Templates Eclipse plugin.

A BR Administrator is able to define new templates by selecting the "New Template" action.

New templates are defined through identifying, for instance:

For Pairings, a resource type, a relationship type, another resource type, and a trigger condition. The allowable specifications is enforced, and are based on the syntax of each type of pairing information.

The available pairing templates display in the Templates view whenever a Recovery Segment editor is open and displaying. The BR Administrator can choose to apply templates to the resources and relationships within the Recovery Segment by right-clicking on the template and selecting the apply action.

The editor for defining a pairing template prompts the BR Administrator for the resource type, the relationship type, the ending resource type, and trigger condition. This information completes the data for a pairing template.

UI Steps, When Including Pairing Information Customization

The customer steps to configure BR would be, for instance, as follows, when incorporating the configuration/customization of any of resource pairing constructs:

1. Select RS Definition templates to apply.
2. Apply RS Definition templates and customize the topology. Iterate based on what is found and what needs to be customized.
3. Select the pairing information templates to apply:
   a. In one implementation, specific templates are shown for ordering, impact, constraints, operation effect, co-locations, and prep effect.
4. Apply the selected templates, and view what has been suggested based on application of the templates.
5. Modify/customize the information. Iterate based on what is presented for best practices and what is to be changed. These become unique instances of the pairing which are not automatically changed if the template from which the pairing was created is modified. Customers can find their customizations easily, if they follow suggested naming conventions for the derived templates.
6. Add new pairing definitions, if customer desires, which become instances of resource pairings, and internally represented to BR as an entry in the BRRD table.
7. Customer accepts definition.
8. Customer creates a trigger for the pairing, and then the RS resource is created.
9. Customer can then go on to initiating observation mode, defining policy, etc.

Applying Resource Pairing Definition Templates

One embodiment of the logic to apply resource pairing definition templates is described with reference to FIGS. 19A-19B. As one example, this logic is performed by the UI component and invoked by the BR Administrator from the BR Templates Eclipse plugin to apply an existing set of Resource Pairing Definition templates to a Recovery Segment. As mentioned above, the Recovery Segment may be in the process of being created via the usage of Recovery Segment definition templates, or may in fact have already been created. The pattern represented by the Resource Pairing Definition template is applied to the Recovery Segment to recommend or deliver a definition of a resource pairing. The resulting definition recommendation can also be customized.

The Resource Pairing Definition templates are persisted in the BR template datastore. Each template includes, for instance, the starting resource type, a relationship type, the ending resource type, and a trigger condition.

Figure 19A:
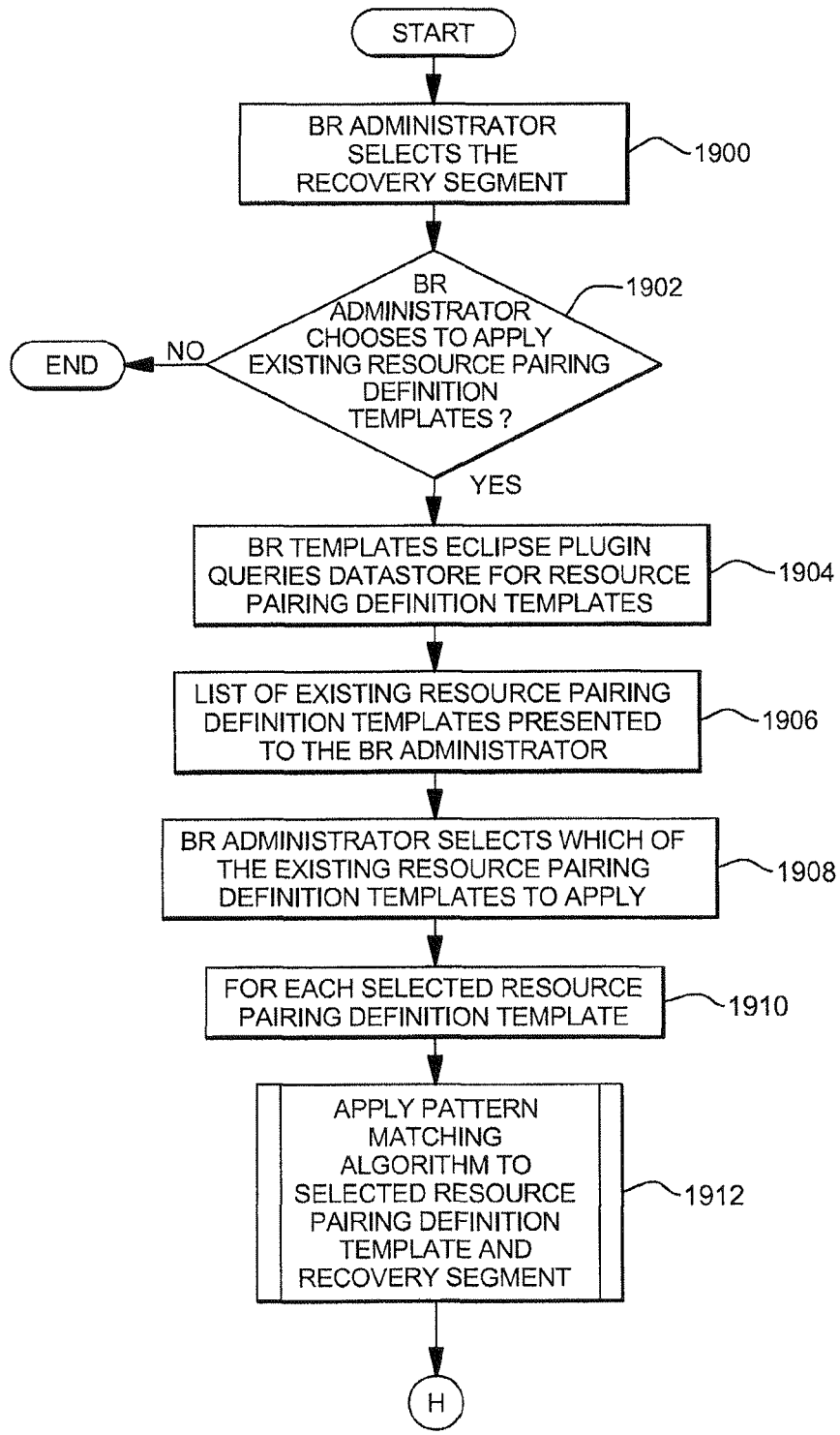
FIGS. 19A-19B depict one embodiment of the logic to apply resource pairing definition templates, in accordance with an aspect of the present invention.

Referring to FIG. 19A, the process for applying an existing Resource Pairing template is started by the BR Administrator by selecting the Recovery Segment using the BR UI, STEP 1900.

When a Recovery Segment is selected, the BR Administrator has the option to apply relevant Resource Pairing Definition templates in order to look for pattern matching, INQUIRY 1902. If the administrator does not select the option, processing terminates. Otherwise, processing continues.

The templates are categorized based on template type (e.g., definition, deployment, predefined, user-defined, etc.) in the BR UI to mitigate searching for large numbers of patterns when dealing with large Recovery Segments. A progress indicator also provides feedback to the customer. The BR Templates plugin queries the BR template datastore searching for Resource Pairing Definition templates, STEP 1904.

The BR Administrator is presented with a list of existing Resource Pairing Definition templates, STEP 1906.

At this point, the BR Administrator selects which of the existing templates to apply for pattern matching. They may choose specific Resource Pairing Definition templates or all of them, STEP 1908.

The pattern matching technique is applied to the selected Resource Pairing Definition templates, STEP 1910, and the Recovery Segment rendered from STEP 1900 above, STEP 1912. The pattern matching technique for the Resource Pairing Definition template is described below.

Figure 19B:
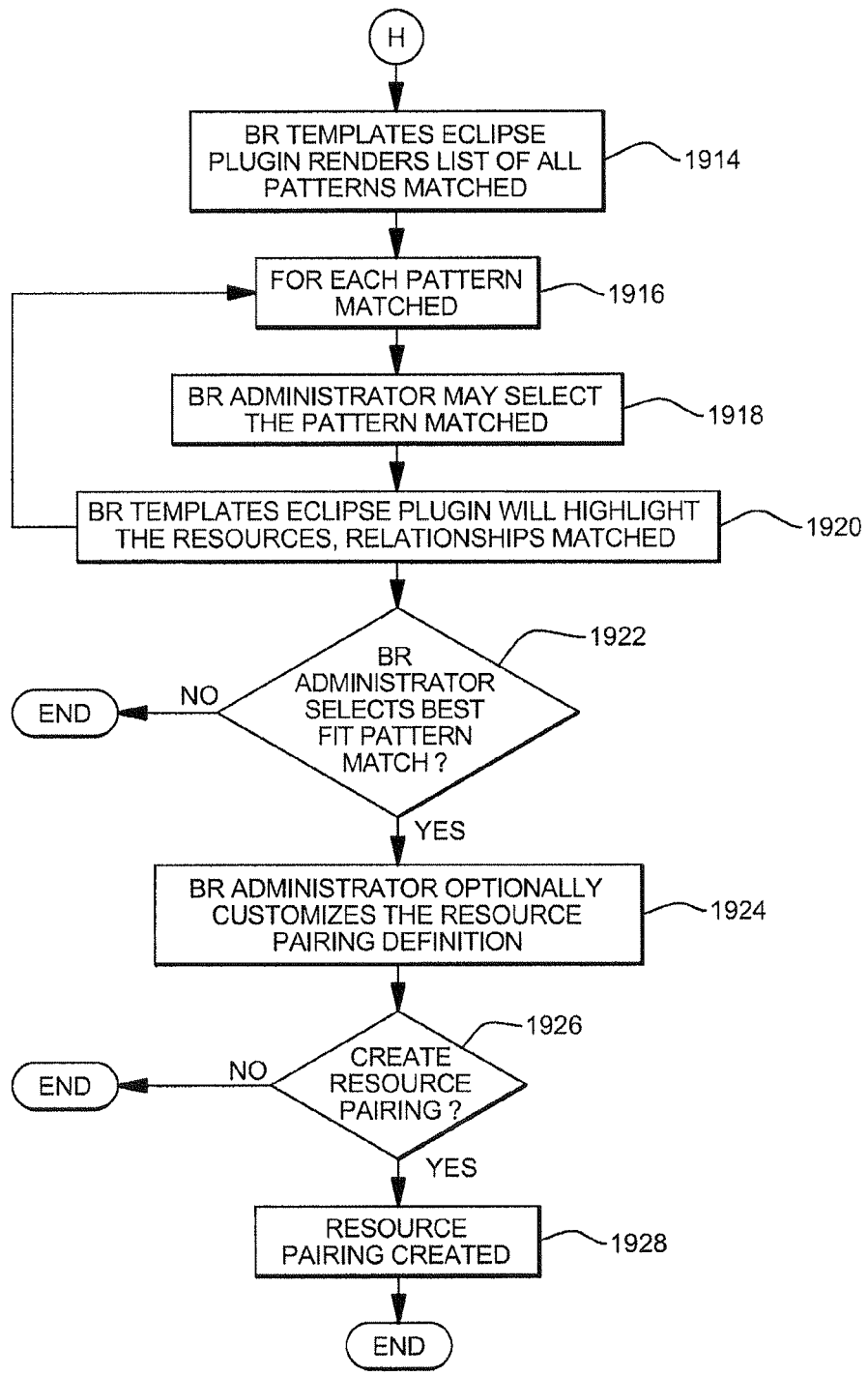

When the pattern matching technique is finished, the BR Administrator is presented with a list of the matched patterns, 1914 (FIG. 19B). The BR Administrator is then able to select a particular pattern that was matched from that list, STEPs 1916-1918, and the pairings that were matched are highlighted, STEP 1920. The process can iterate multiple times to ensure that the definition is satisfactory.

The BR Administrator may then select which definition is the best fit for their environment, STEP 1922, and optionally, customizes the Resource Pairing as desired, STEP 1924.

Finally, the BR Administrator chooses whether to create the Resource Pairing based on the Resource Pairing definition, INQUIRY 1926. If not, processing ends. Otherwise, the Resource Pairing is created (i.e., inserted/updated in the BRRD/BRMD tables of the BR datastore if the Recovery Segment already exists, or returned to the Recovery Segment definition process if the Recovery Segment is being defined), STEP 1928. Processing completes.

Resource Pairing Definition Template Pattern Matching

One embodiment of the logic for resource pairing definition template pattern matching is described with reference to FIG. 20. As one example, this logic is performed by the UI component and invoked after the selection of a Recovery Segment by the BR Administrator for which the pairing templates are to be matched against and after the selection of the set of templates for applying against that Recovery Segment. The use of a well-known traversal technique (e.g., depth-first search) for traversing the two graphs is assumed and not described in detail. Other implementations may use alternate graph traversal techniques. The Recovery Segment and the pairing template, although comprised of two resource nodes and a relationship between them, should both be considered to be graphs.

For illustration purposes, these terms are utilized herein:
  A cached Resource Segment graph denoted as $G_C$.
  A template graph denoted as $G_T$.

Figure 20:
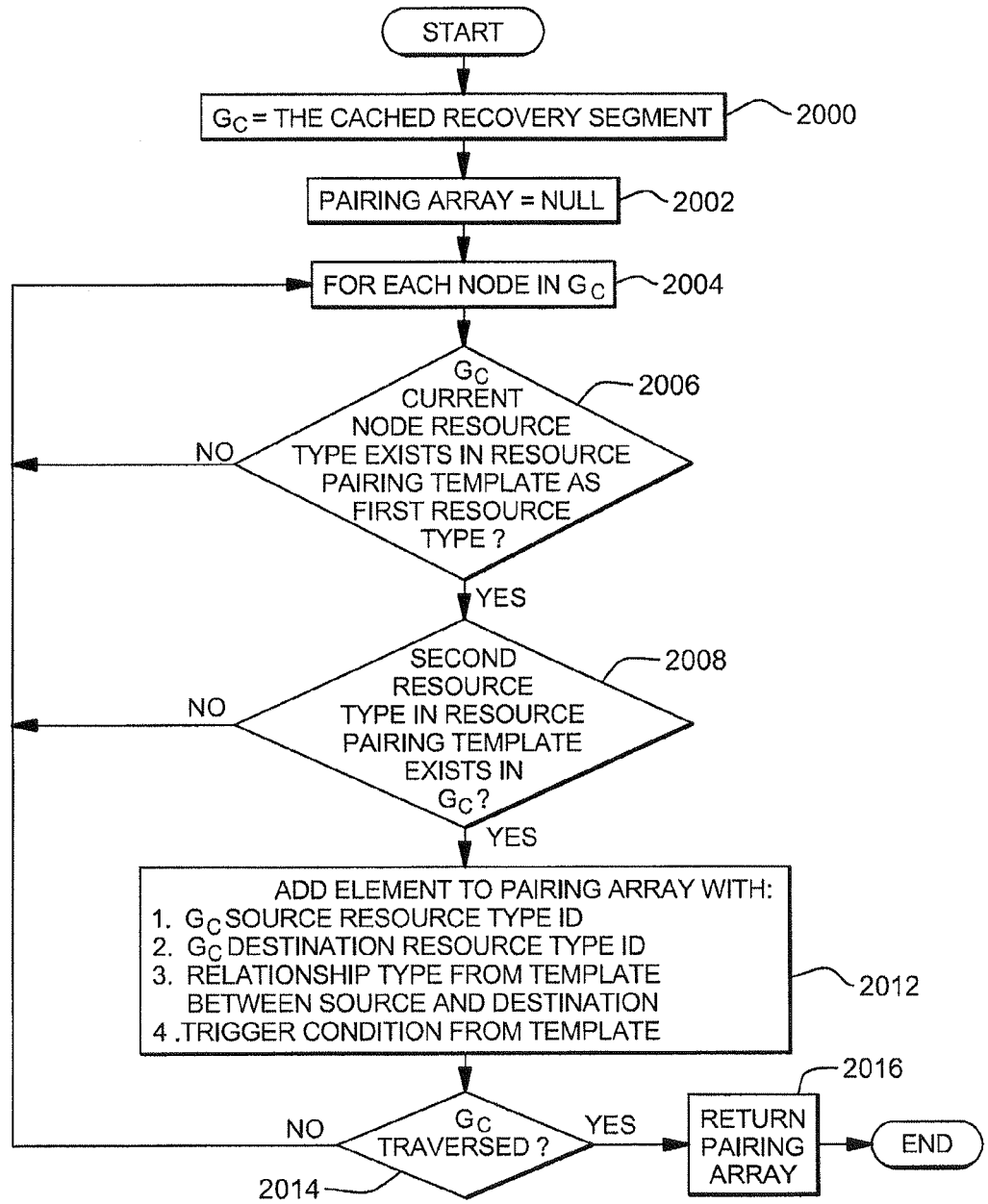
FIG. 20 depicts one embodiment of the logic for resource pairing definition template pattern matching, in accordance with an aspect of the present invention.

Referring to FIG. 20, the selected Recovery Segment graph $G_C$ is read into the cache, STEP 2000.

A Pairing Array is created and nulled, STEP 2002.

For each node in the Recovery Segment graph $G_C$, STEP 2004, a check is made to see if it exists as the first resource type in the Resource Pairing definition template, INQUIRY 2006.

If Yes, the logic determines if the second resource type in the Resource Pairing definition template exists the in Recovery Segment graph $G_C$, INQUIRY 2008.
  If Yes, it adds a new element to the Pairing Array, STEP 2012, which includes, for instance:
   1. The source resource in the Recovery Segment graph $G_C$.
   2. The destination resource in the Recovery Segment graph $G_C$.
   3. The relationship between the source and destination resource types from the template.
   4. The trigger condition from the template.
  When processing completes (i.e., the Recovery Segment graph $G_C$ has been traversed), INQUIRY 2014, the Pairing Array is returned, STEP 2016.
If the graph has not been traversed, INQUIRY 2014, or a false evaluation is reached from INQUIRIES 2006 or 2008, processing continues at STEP 2004.

4—Deployment Templates for Components of the IT Management System

Deployment templates for components of the IT Management System focus on determining the best fit hosting environments for the components (e.g., key IT availability components) during deployment time. In one example, they can provide best practices recommendations for placement of the Business Resilience Manager (BRM) when there are one or more RS(s) and one or more potential targets (OS and Web Application Server environments) available for the deployment. In this example, given the set of potential hosting environments for a BR Manager and the currently assigned hosting environment for a BR Manager, these templates:

1. Recommend the placement of other BR Managers.
2. Recommend the placement of Recovery Segment(s) to be managed by a BR Manager.
3. Recommend the placement of Recovery Segment(s) that are somehow related to other Recovery Segment(s) (e.g., a subset, a superset, or with shared resources).
4. Recommend, in one implementation, that the RS(s) that share resources should share a single BR Manager.
5. Recommend that a BR Manager and associated RS(s) should co-reside in the same hosting (e.g., Websphere) container.
6. Recommend that BR database tables associated with a BR Manager shall be managed by a DB subsystem co-located on the same OS image as the WAS (Web-based Application Servers) container for the BRM.
7. Recommend that the union of RS instances that are associated with a shared resource shall be co-located in the same WAS container.
8. Recommend that the union of RS subset and superset RS(s) will be co-located in the same WAS container.
9. Determine the placement recommendation of the Business Resilience Manager(s) based on comparing the required or desired performance and availability characteristics with those surfaced by the IT resource representations of the target Operating System Environments and other target hosting environments, such as Web-based Application Servers.

Examples of Deployment Templates for RS and BRM

The following are examples of Deployment templates for RS and BRM that may be offered as part of the use of deployment templates for a Business Resilience configuration. It is not meant to be a complete list.

1. BRM/RS with constituent resources primarily related to a single OS image:
   Pattern:
      a. Recognition of many (e.g., hundreds/thousands) of resources with relationships to a specific operating system resource instance;
      b. Limited sets (or zero) of resources in the RS definitions related to other operating system instances.
   Considerations:
      a. Since the RS is fairly homogeneous in this example with respect to platform, placing the RS (and shared/subset RS, along with BRM) with proximity to the resources being managed is a likely performance advantage.
      b. Assuming that the deployment of the RS and BRM(s) will also (over time) suggest a local deployment of the services representing the constituent resources, the memory footprint and CPU required can be compared with an average utilization.
   Placement recommendation:
      a. The recommendation in this case is to co-locate the BRM and RS with the resources that it is intended to manage, for performance benefit.

2. BRM/RS with constituent resources distributed across multiple OSs:
   Pattern:
      a. Recognition of resources with relationships to a set of operating system resource instances that are heterogeneous, not all of which participate in a homogeneous cluster.
      b. Low concentration of resources associated with a given operating system type, and low concentration associated with a small number of operating system images.
   Considerations:
      a. The RS is heterogeneous with regard to the association of the resources managed to platforms; no clear operating system image choice.
      b. Evaluate the storage elements in the RS, and determine the operating system locale of interest for the storage elements.
      c. Evaluate the middleware elements in the RS and determine the operating system locale of interest for DB2 and CICS, if present.
   Placement Recommendation:
      a. The recommendation in this case is to deploy the RS, shared RS, and BRM on the operating system image that has the locale of interest to the key middleware that is to be managed, or to storage elements that are to be managed.

Modification to Existing Deployment Templates for Components of the IT Management System Again, using the BR implementation as one example, customers use the BR UI to view existing deployment templates for RS and BRM and derive new deployment templates for RS and BRM from any of the predefined templates provided by, for instance, IBM® (i.e., BR), hardware or software vendors to specify availability best practices for their own products, and/or open-source providers.

The allowed template syntax is enforced during modification. In the implementation selected, some vendor provided templates (e.g., from IBM® or other vendors) are not allowed to be directly modified, rather these can be derived into other templates which can then be modified. Other implementations may allow direct modification of vendor provided templates. It is also recommended that customers follow a common naming convention to indicate what template is being derived from, so as to be able to easily find their customized templates when there are service updates to the vendor provided ones.

After the BR Administrator modifies a deployment template for RS and BRM, they can search their environment's topology for matches of their template pattern. Each match is displayed in the Eclipse search view and when double clicked, opens an editor displaying the nodes comprising the match. The BR Administrator can then take the same actions on that selection that they could take upon any topology selection.

New Deployment Templates for RS and BRM

New deployment templates for RS and BRM may be created by customers for their specific environment. The templates, whether shipped as part of BR, created and/or derived by customers, created by hardware and software vendors (to specify availability best practices for their own products), or provided by open-source providers, can then be executed with the pattern matching techniques in the BR UI space, and displayed from the BR UI. The templates are stored internally in the BR datastore and can be defined with the BR UI and the BR Templates Eclipse plugin.

A BR Administrator is able to define new templates by selecting the "New Template" action. Deployment templates for RS and BRM are defined through identifying, for instance:

The target OS and Web Application Server environments with specific characteristics, or properties, or relationships, along with criteria for the search relating to types/variety of resources managed by RS or across a BRM.

Alternatively, the BR Administrator may select an existing Recovery Segment and the BR UI will display the types/variety of the resources managed by that RS.

Deployment Information Description

For performance reasons, during runtime failures and recovery processes, BR maintains a topology of the hosting environment for each of the BR owned resources and the resources for which it is responsible for monitoring and managing. That information along with the deployment information about the location of each BR Asynchronous Distributor is maintained in a table in the BR database called Deployment_Information.

Deployment Information Implementation

In one implementation, the deployment information function is implemented as a table in the Business Resilience datastore that physically resides in the BR environment. That database is created at installation time, and the deployment information table is created and initialized (if necessary) at that time. The deployment information table is not associated with any particular BR resource, and is thus, not used to persist any resource properties. The typical access mechanism is via, for instance, JDBC calls from the BR UI client(s) and the BR owned resources (e.g., RS and BRM) using JDBC type 4 drivers.

One example of a Depolyment_Information table is described with reference to FIG. 21. As one example, a Deployment_Information table 2100 includes the following information:

The deployment templates are persisted in the BR template datastore. Each deployment template includes, for example:
   A set of resource types representing Recovery Segments.
   A set of resource types representing resources to be managed by Recovery Segments.
   A set of resource types representing BR Managers.
   Properties associated with any of these resource types.
   Relationships between these resource types.
   The target OS and Web Application Serving environments (e.g., entries in the Depolyment_Information table of the BR datastore).
   Criteria (expressed as rules) for the search relating to types/variety of resources managed by RS or across a BRM.

Figure 22A:
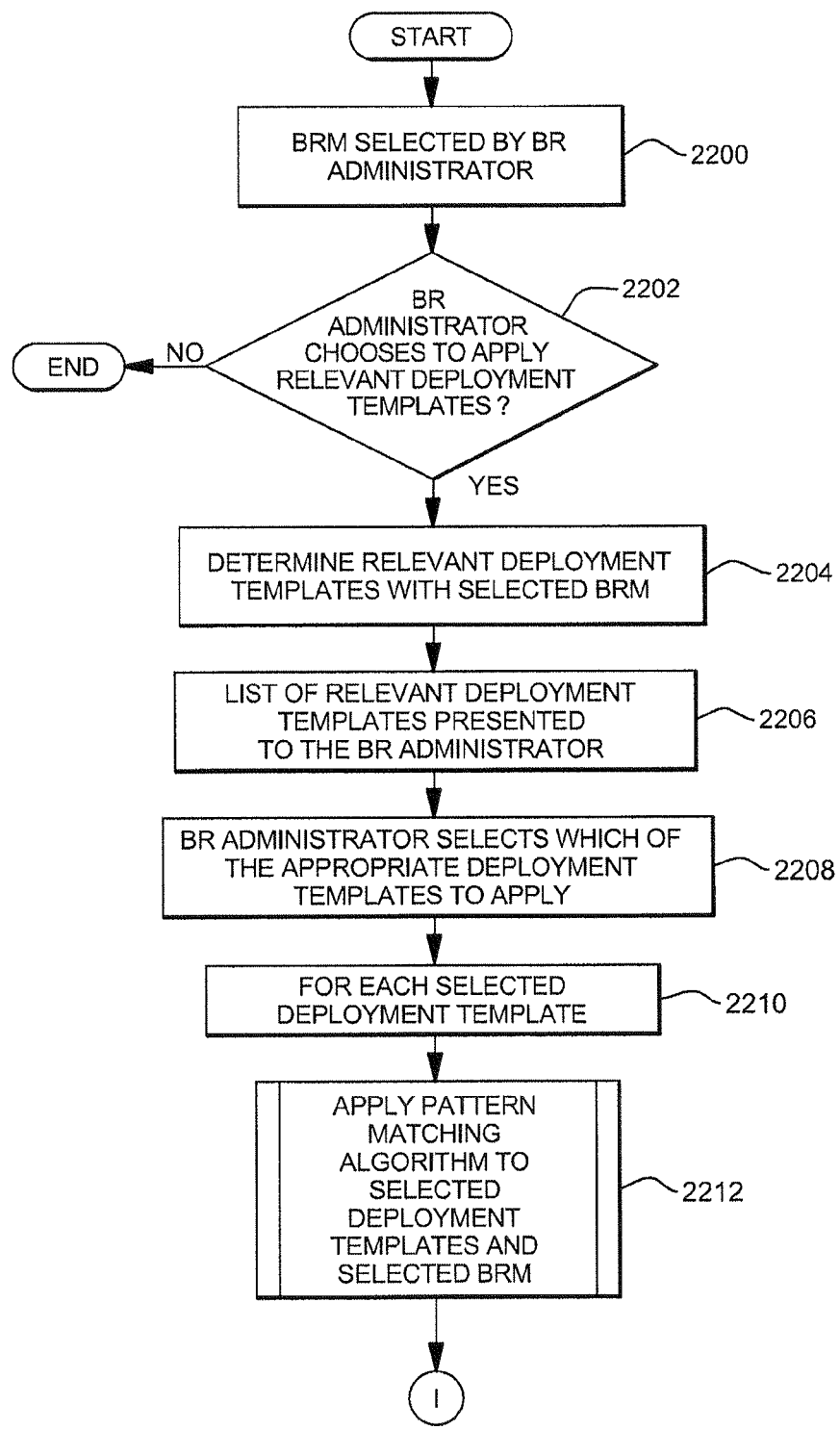
FIGS. 22A-22B depict one embodiment of the logic to apply deployment templates for RS and BRM, in accordance with an aspect of the present invention.

Referring to FIG. 22A, the process for applying an existing deployment template is started by the BR Administrator by selecting a specific BRM using the BR UI, STEP 2200.

When a BRM is selected, the BR Administrator has the option to apply relevant deployment templates in order to look for pattern matching, INQUIRY 2202. If the administrator does not so choose, processing ends. Otherwise, the relevant templates are determined, as described below, STEP 2204.

The BR Administrator is presented with a list of the relevant deployment templates, STEP 2206.

At this point, the BR Administrator selects which of the relevant templates to apply for pattern matching. They may choose specific deployment templates or all of them, STEP 2208.

The pattern matching technique is applied to the selected deployment templates, STEP 2210, and the BRM selected from STEP 2200 above, STEP 2212. The pattern matching technique for Deployment templates is described above.

Figure 22B:
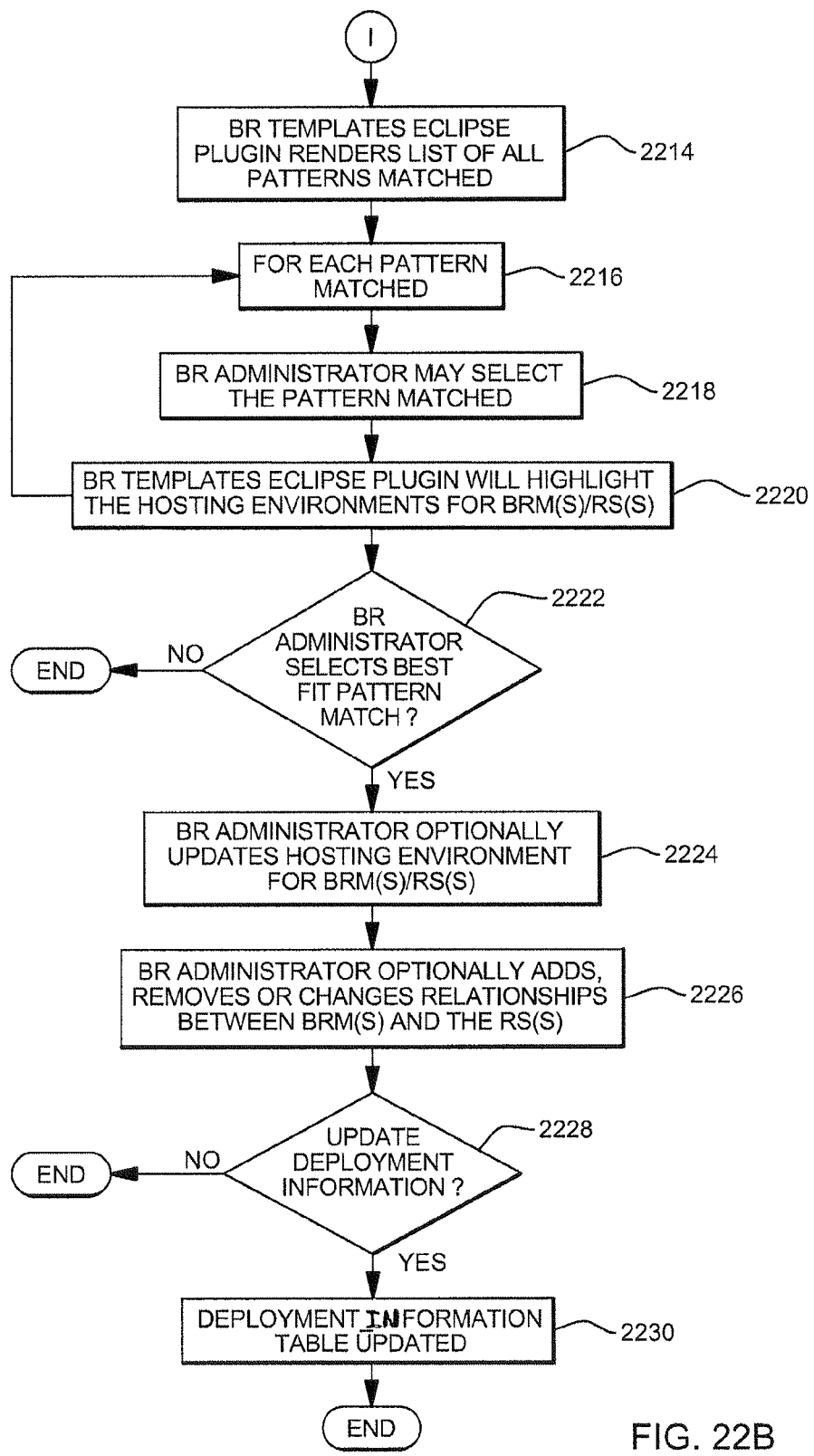

When the pattern matching technique is finished, the BR Administrator is presented with a list of the patterns matched, STEP 2214 (FIG. 22B). The BR Administrator is then able to select a particular pattern that was matched from that list,

| Data Field | Data Type | Description | Keys | Index |
|---|---|---|---|---|
| DEPLOYMENT_ID | Integer | Generated integer key for uniqueness via a DB2 sequence. Note all primary keys in the BR database will be a generated integer for compatibility with other non-DB2 databases. | Primary | |
| OS | Varchar(1024) | Hosting operating system | | |
| WAS | Varchar(1024) | Hosting WebSphere container | | |
| BRAD | Varchar(1024) | BR Asynchronous Distributor | | |
| SERVER | Varchar(1024) | Hosting server | | |
| TS_UPDATE | Timestamp | Timestamp of initial create or last update and defaults to current timestamp | | |

Applying Deployment Templates for RS and BRM

One embodiment of the logic to apply deployment templates for RS and BRM is described with reference to FIGS. 22A-22B. As one example, this logic is performed by the UI component and invoked by the BR Administrator from the BR Templates Eclipse plugin to apply existing Deployment templates to a selected BRM. The resulting deployment information recommendation can then be customized by, for instance:

Updating the deployment information for applicable resource representations (in this case, BRM and RS resources).

STEPs 2216, 2218, and the resources and relationships that were matched are highlighted, STEP 2220.

The BR Administrator may then select which definition is the best fit for their environment, INQUIRY 2222, and optionally, customizes the BRM/RS hosting environment as desired by, for instance:

Updating BRM(s)/RS(s) hosting environments, STEP 2224; and/or
   Updating relationships between BRM(s) and RS(s), STEP 2226.

Finally, the BR Administrator chooses whether to update the deployment information for the BRM(s)/RS(s), INQUIRY 2228. If yes, the Depolyment_Information table is updated, STEP 2230, and the processing completes. If not, processing completes.

Determining Relevant Deployment Templates for a Selected BRM

Figure 23:
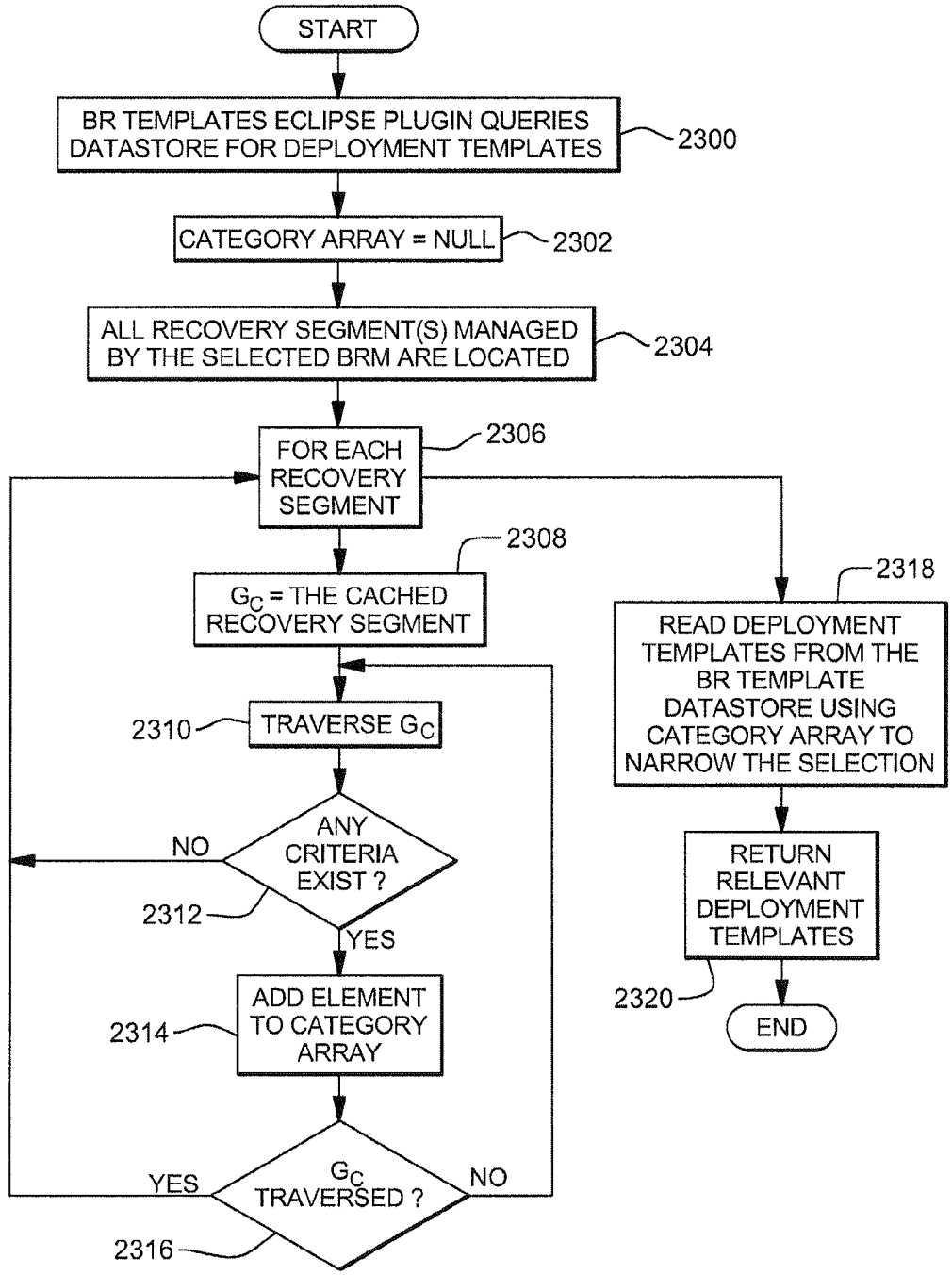
FIG. 23 depicts one embodiment of the logic to determine relevant deployment templates for a selected BRM, in accordance with an aspect of the present invention.

One embodiment of the logic to determine relevant deployment templates for a selected BRM is described with reference to FIG. 23. As one example, this logic is performed by the UI component and invoked by the BR Administrator from the BR Templates Eclipse plugin to display the relevant Deployment templates for a selected BRM. The resulting deployment templates can then be selected to apply the pattern matching technique, as described herein. The usage of a well-known traversal technique (e.g., depth-first search) for traversing the Recovery Segment graphs is assumed. Other implementations may use alternate graph traversal techniques.

For illustration purposes, these terms are utilized herein:

A cached Resource Segment graph denoted as $G_C$.

The templates are categorized based on template type (e.g., definition, deployment, predefined, user-defined, etc.) in the BR UI to mitigate searching for large numbers of patterns when dealing with large Recovery Segments. A progress indicator also provides feedback to the customer. Referring to FIG. 23, the BR Templates plugin queries the BR template datastore searching for Deployment templates for RS and BRM, STEP 2300.

A Category Array is created and nulled, STEP 2302.

Recovery Segments managed by the selected BRM are located, STEP 2304. For each Recovery Segment, STEP 2306:

Recovery Segment graph $G_C$ is read into a cache, STEP 2308.

The Recovery Segment graph $G_C$ is categorized based on various criteria for which a deployment template may have been defined, STEP 2310. For example:

Number of resource types contained in the Recovery Segment;

Number of each instance of the resource type contained in the Recovery Segment; and/or Number of resources shared with other Recovery Segments.

If any of the various criteria for which a deployment template may have been defined exists, INQUIRY 2312, a new element is added to the Category Array, STEP 2314, and processing continues at INQUIRY 2316. If no criteria exists, processing continues at STEP 2306.

This process iterates until all the Recovery Segments graphs $G_C$ have been traversed, INQUIRY 2316.

When all the Recovery Segments have been processed, STEP 2306, the BR Templates plugin again queries, the BR template datastore searching for all Deployment templates for RS and BRM, but using the Category Array to additionally narrow the scope of the search, STEP 2318. The resulting set of deployment templates are returned to the caller as relevant, STEP 2320.

Deployment Templates for RS and BRM Pattern Matching Algorithm

Figure 24:
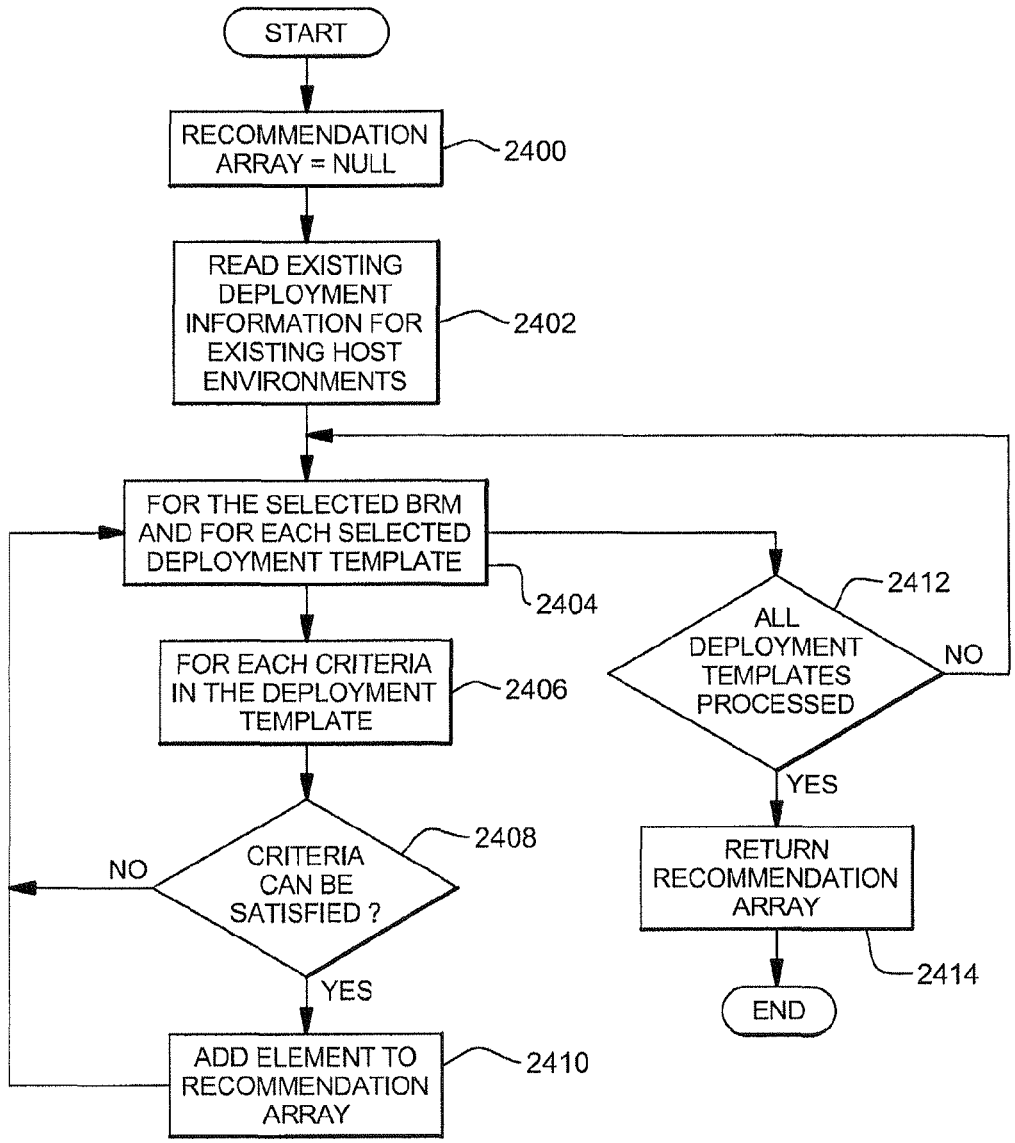
FIG. 24 depicts one embodiment of the logic for deployment templates for RS and BRM pattern matching, in accordance with an aspect of the present invention.

One embodiment of the logic to deploy templates for RS and BRM pattern matching is described with reference to FIG. 24. As one example, this logic is performed by the UI component and invoked after the selection of a BRM by the BR Administrator and the selection of the set of templates for applying against that BRM.

Since each deployment template may include a number of criteria, the deployment recommendations from the pattern matching technique are to be non-conflicting for the placement of the BRM(s) and the RS(s). Depending on the customer's environment and the criteria in the templates, this may not always be possible. Thus, a Recommendation Array is used to indicate the deployment information of the pertinent resources, plus the criterion that has programmatically satisfied that it participate in that recommendation, so that the customer can be the final arbiter. Referring to FIG. 24, a Recommendation Array is created and nulled, STEP 2400.

The known deployment information is read from the DB2 table, STEP 2402.

For the selected BRM and each selected deployment template, STEP 2404.

For each criteria in the deployment template, STEP 2406.

Determine if the criteria can be satisfied with the current deployment information (but is not already configured as such—so as not to recommend a deployment that has already been configured), INQUIRY 2408.

If Yes, add an element to the Recommendation Array, STEP 2410. Each element includes, for instance:

Textual indication of the criteria passed (for display by the BR UI).

Deployment placement recommendation(s) for various BRM and RS resources.

Relationship recommendation(s) between various BRM and RS resources.

If No, INQUIRY 2408, continue to iterate across the criteria and all selected Deployment templates, STEPs 2404 and 2406.

This process iterates until all the selected Definition templates have been processed, INQUIRY 2412, at which time the Recommendation Array is returned, STEP 2414.

Described in detail herein is a capability for defining and using templates to facilitate configuring of IT environments.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 25:
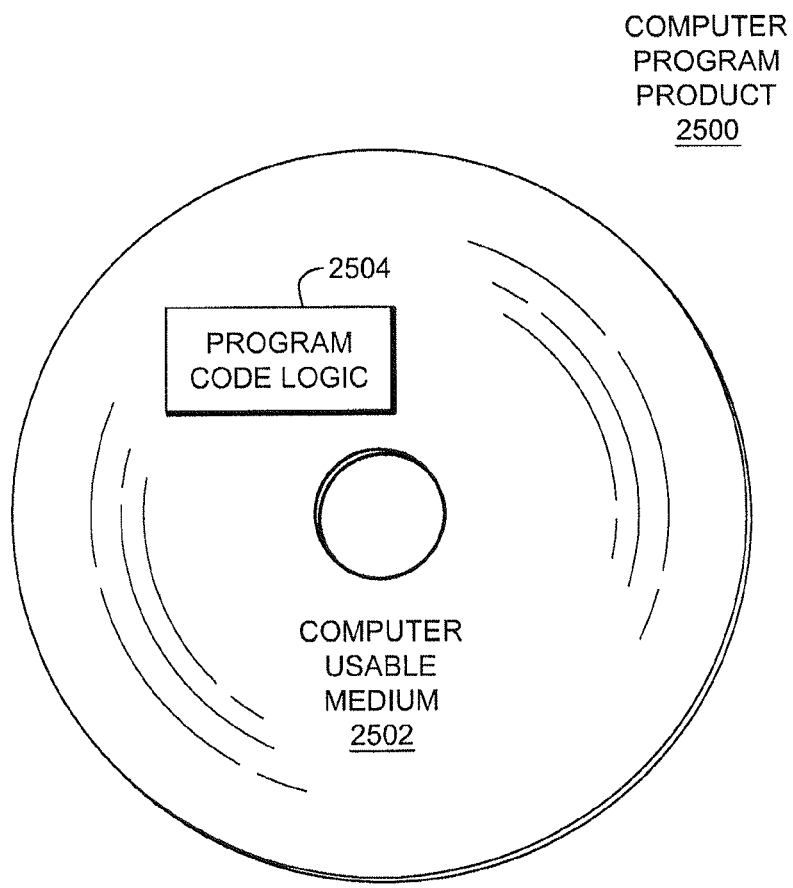
FIG. 25 depicts one embodiment of a computer program product incorporating one or more aspects of the present invention.

One example of an article of manufacture or a computer program product incorporating one or more aspects of the present invention is described with reference to FIG. 25. A computer program product 2500 includes, for instance, one or more computer usable media 2502 to store computer readable program code means or logic 2504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for defining templates that represent patterns of resources and relationships of an IT environment and applying those templates to automatically generate recommendations of programmatic representations of artifacts of the IT environment. As examples, the artifacts include, a RS, a RG, a BRM deployment configuration and/or a resource pairing represented by a BRRD.

As used herein, the phrase "obtaining a template" includes, but is not limited to, defining a template (e.g., from scratch), defining a template as a result of modifying a vendor or otherwise provided template, receiving a template from a vendor or otherwise, retrieving a template (e.g., an open source provided template), being provided a template, having a template, creating a template, etc.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating configuration of an information technology (IT) environment, the computer-implemented method comprising:
   obtaining, by a processor, a template for the IT environment, said template representing a pattern of resource types and relationship types between those resource types;
   obtaining, by the processor, a resource graph representing a customer's topology of the IT environment, wherein the resource graph has a plurality of nodes including one or more source nodes and one or more destination nodes:
   forming a management artifact of the IT environment, the formed management artifact comprising at least one of a group of resources and one or more relationships between resources of the group of resources, the forming comprising applying the pattern of the template to automatically generate by the processor a recommendation as to one or more resources or one or more relationships to be included in the management artifact, wherein the applying comprises:
      searching, by the processor, the template to determine whether a resource type of a current node of the plurality of nodes exists in the pattern of the template;
      evaluating by the processor, when the resource type of the current node does not exist in the template, another of the plurality of nodes of the customer's topology for matching the resource type with the template until there are no more nodes of the plurality of nodes to evaluate;
      traversing by the processor, when the resource type of the current node exists in the template, relationships of the current node to determine whether there are matches between the template and the customer's topology, wherein the matches include one or more of: a resource type of a source node, a resource type of a destination node, a relationship type between source and destination nodes, property values on a source node, or property values on a destination node;
      based on there being one or more matches, marking the one or more matches in the customer's topology as matched; and
      when at least one match does not exist in the pattern of the template, providing a user with an option to extend a definition of the template to include the unmatched relationship and node; and
   providing a result of the searching, the result to be used in determining whether one or more instances of one or more resources or one or more relationships that match the pattern are to be included in the management artifact; and
   employing the formed management artifact to manage the IT environment to a quantifiable management goal.

2. The computer-implemented method of claim 1, wherein the management artifact comprises a Recovery Segment.

3. The computer-implemented method of claim 1, wherein the management artifact comprises a Redundancy Group.

4. The computer-implemented method of claim 1, wherein the template comprises a definition template.

5. The computer-implemented method of claim 4, wherein the definition template provides direction of how to define the management artifact.

6. The computer-implemented method of claim 1, wherein the obtaining the template comprises defining a plurality of templates for the IT environment, each template representing a pattern of resource types and resource relationship types, and wherein the plurality of templates comprise at least one of one or more definition templates or one or more deployment templates.

7. The computer-implemented method of claim 1, further comprising modifying the template.

8. The computer-implemented method of claim 1, further comprising associating with the template one or more characteristics of the management artifact, wherein the one or more characteristics comprise property value pairs for resources or trigger values for relationships.

9. The computer-implemented method of claim 1, wherein the pattern represents a best practice associated with the management artifact.

10. The computer-implemented method of claim 1, wherein the obtaining the template comprises at least one of:
    receiving from a vendor the template representing best practices;
    defining the template;
    defining the template as a result of modifying a vendor provided template; or
    retrieving an open source provided template.

11. The computer-implemented method of claim 1, wherein the obtaining the template comprises:
    searching a data store of templates for a list of one or more templates that meets one or more predefined criteria associated with the management artifact; and
    selecting from the list the template to be applied.

12. The computer-implemented method of claim 11, further comprising modifying the selected template, and wherein the modified template is the template to be applied.

13. A computer system of facilitating configuration of an information technology (IT) environment, the computer system comprising:
    a memory having a template for the IT environment, said template representing a pattern of resource types and relationship types between those resource types; and
    a processor in communications with the memory, wherein the computer system is configured to perform a method, the method comprising:
       obtaining a resource graph representing a customer's topology of the IT environment, wherein the resource graph has a plurality of nodes including one or more source nodes and one or more destination nodes;
       forming a management artifact of the IT environment, the formed management artifact comprising at least one of a group of resources and one or more relationships between resources of the group of resources, the forming comprising applying the pattern of the template to automatically generate by the processor a recommendation as to one or more resources or one or more relationships to be included in the management artifact, wherein the applying comprises:
          searching, by the processor, the template to determine whether a resource type of a current node of the plurality of nodes exists in the pattern of the template;
          evaluating by the processor, when the resource type of the current node does not exist in the template, another of the plurality of nodes of the customer's topology for matching the resource type with the template until there are no more nodes of the plurality of nodes to evaluate;

traversing by the processor, when the resource type of the current node exists in the template, relationships of the current node to determine whether there are matches between the template and the customer's topology, wherein the matches include one or more of: a resource type of a source node, a resource type of a destination node, a relationship type between source and destination nodes, property values on a source node, or property values on a destination node;

based on there being one or more matches, marking the one or more matches in the customer's topology as matched; and when at least one match does not exist in the pattern of the template, providing a user with an option to extend a definition of the template to include the unmatched relationship and node; and providing a result of the searching, the result to be used in determining whether one or more instances of one or more resources or one or more relationships that match the pattern are to be included in the management artifact; and employing the formed management artifact to manage the IT environment to a quantifiable management goal.

14. The computer system of claim 13, wherein the pattern represents a best practice associated with the management artifact to be generated.

15. The computer system of claim 13, wherein the template comprises a definition template.

16. The computer system of claim 13, wherein the method further comprises obtaining the template, the obtaining the template comprising at least one of:

receiving from a vendor the template representing best practices;

defining the template;

defining the template as a result of modifying a vendor provided template; or retrieving an open source provided template.

17. A computer program product for facilitating configuration of an information technology (IT) environment, the computer program product comprising:

a non-transitory computer readable storage medium readable by a processor and storing instructions for execution by the processor for performing a method comprising:

obtaining a template for the IT environment, said template representing a pattern of resource types and relationship types between those resource types; and obtaining a resource graph representing a customer's topology of the IT environment, wherein the resource graph has a plurality of nodes including one or more source nodes and one or more destination nodes;

forming a management artifact of the IT environment, the formed management artifact comprising at least one of a group of resources and one or more relationships between resources of the group of resources, the forming comprising applying the pattern of the template to automatically generate by the processor a recommendation as to one or more resources or one or more relationships to be included in the management artifact, wherein the applying comprises:

searching, by the processor, the template to determine whether a resource type of a current node of the plurality of nodes exists in the pattern of the template;

evaluating by the processor, when the resource type of the current node does not exist in the template, another of the plurality of nodes of the customer's topology for matching the resource type with the template until there are no more nodes of the plurality of nodes to evaluate;

traversing by the processor, when the resource type of the current node exists in the template, relationships of the current node to determine whether there are matches between the template and the customer's topology, wherein the matches include one or more of: a resource type of a source node, a resource type of a destination node, a relationship type between source and destination nodes, property values on a source node, or property values on a destination node;

based on there being one or more matches, marking the one or more matches in the customer's topology as matched; and when at least one match does not exist in the pattern of the template, providing a user with an option to extend a definition of the template to include the unmatched relationship and node; and providing a result of the searching, the result to be used in determining whether one or more instances of one or more resources or one or more relationships that match the pattern are to be included in the management artifact; and employing the formed management artifact to manage the IT environment to a quantifiable management goal.

18. The computer program product of claim 17, wherein the management artifact comprises one of a Recovery Segment or a Redundancy Group.

19. The computer program product of claim 17, wherein the obtaining the template comprises:

searching a data store of templates for a list of one or more templates that meets one or more predefined criteria associated with the artifact; and selecting from the list the template to be applied.

20. The computer program product of claim 17, wherein the obtaining the template comprises at least one of:

receiving from a vendor the template representing best practices;

defining the template;

defining the template as a result of modifying a vendor provided template; or retrieving an open source provided template.

* * * * *